United States Patent [19]
Guerreri

[11] Patent Number: 5,706,273
[45] Date of Patent: Jan. 6, 1998

[54] LIQUID REGISTRATION AND CONTROL SYSTEM HAVING NETWORKED FUNCTIONAL MODULES

[75] Inventor: Steve Guerreri, Herndon, Va.

[73] Assignee: Electronic Warfare Associates, Inc., Herndon, Va.

[21] Appl. No.: 660,835

[22] Filed: Jun. 10, 1996

Related U.S. Application Data

[63] Continuation of Ser. No. 235,854, Apr. 29, 1994, abandoned.

[51] Int. Cl.$^6$ .................................................. G06F 19/00
[52] U.S. Cl. ...................... 364/510; 364/465; 73/861.03
[58] Field of Search .................................. 364/509, 510, 364/478, 479, 465; 73/3, 861, 861.01, 861.02, 861.03, 195, 197, 204.14, 204.18, 204.19, 272 A, 861.77, 861.78; 340/870.02, 870.04, 870.18, 870.19, 870.23, 870.24; 222/54, 71, 23, 55, 424; 137/87.01, 87.03, 101.31, 106, 141, 493, 551; 141/94

[56] References Cited

U.S. PATENT DOCUMENTS

| | | | |
|---|---|---|---|
| 3,650,303 | 3/1972 | Chambers et al. . | |
| 3,814,148 | 6/1974 | Wostl . | |
| 3,825,045 | 7/1974 | Bloomquist | 141/198 |
| 3,830,090 | 8/1974 | Hersch et al. . | |
| 4,238,825 | 12/1980 | Geery . | |
| 4,247,899 | 1/1981 | Schiller et al. | 364/465 |
| 4,313,168 | 1/1982 | Stephens et al. | 364/465 |
| 4,386,520 | 6/1983 | Nagaishi | 73/118 |
| 4,395,627 | 7/1983 | Barker et al. | 340/825.35 X |
| 4,410,949 | 10/1983 | Huellinghorst et al. | 364/465 |
| 4,581,946 | 4/1986 | Kanayama . | |
| 4,596,442 | 6/1986 | Anderson et al. | 350/96.2 |
| 4,615,390 | 10/1986 | Lucas et al. | 166/250 |
| 4,720,800 | 1/1988 | Suzuki et al. . | |
| 4,723,208 | 2/1988 | Chadima, Jr. et al. . | |
| 4,831,866 | 5/1989 | Forkert et al. | 364/571.02 X |
| 4,934,419 | 6/1990 | Lamont et al. . | |
| 4,969,365 | 11/1990 | Strigård et al. . | |
| 4,996,869 | 3/1991 | Cohrs et al. | 364/571.05 X |
| 5,003,810 | 4/1991 | Jepson et al. . | |
| 5,014,211 | 5/1991 | Turner et al. . | |
| 5,024,347 | 6/1991 | Baldwin . | |
| 5,050,094 | 9/1991 | Kitano | 364/510 |
| 5,051,920 | 9/1991 | Reams et al. | 364/509 |
| 5,154,314 | 10/1992 | Van Wormer . | |
| 5,447,062 | 9/1995 | Kopl et al. | 73/861.78 X |

FOREIGN PATENT DOCUMENTS

| | | |
|---|---|---|
| 2 102 995 | 2/1983 | United Kingdom . |
| WO 90/16033 | 6/1990 | WIPO . |

Primary Examiner—Emanuel T. Voeltz
Assistant Examiner—M. Kemper
Attorney, Agent, or Firm—Cushman, Darby & Cushman IP Group of Pillsbury Madison & Sutro LLP

[57] ABSTRACT

A liquid registration and control system (30) has an intrinsically safe (IS) fiber optic network (56) for the transmission of digital data between various modules (42, 54, 58, 146) in the system (30). The system (30) modules (42, 54, 58, 146) are dedicated to various liquid delivery functions and operational capabilities and send messages to each other over the network (56).

14 Claims, 26 Drawing Sheets

LIQUID REGISTRATION AND CONTROL SYSTEM HAVING NETWORKED FUNCTIONAL MODULES

This is a continuation of application Ser. No. 08/235,854, filed on Aug. 29, 1994, which was abandoned.

BACKGROUND OF THE INVENTION

1. Technical Field

The present invention relates to the control and registration of liquid materials in industrial applications and to the dispensing of products in fluid form; more particularly, the invention relates to the dispensing of products in fluid form from a truck or similar vehicle.

2. Background Art

Fluid-flow delivery systems for handling liquids such as fuel oil delivery and for other similar applications come in a variety of configurations to handle a wide range of flow requirements and generally contain a device that measures fluid flow in real time. The flow measurement must then be displayed on some type of registration device to show the operator how much fluid has passed through the meter. Most prior art systems have employed mechanical registers. Systems of this type are relatively bulky and expensive to manufacture. Further, their use of precision moving parts tends to make them rather failure-prone.

A number of prior art systems have proposed electronic liquid registration and control systems used in the specific context of fuel delivery systems. For example, U.S. Pat. No. 4,313,168 to Stephens et al. describes an integrated system for delivering fluids such as home heating oil. A delivery truck is provided with a calculator which controls delivery of fuel to a customer. A truck driver inserts a data capsule preloaded with information for that day's deliveries into the calculator. Deliveries are recorded in the data capsule, billing information is outputted to a printer, and the data capsule is returned to a central site at the end of the day. Fuel delivery is compensated for temperature and other environmental factors. The calculator is also used to control flow of fuel to the customer's receptacle.

U.S. Pat. No. 5,051,920 to Reams et al. describes a different type of liquid registration and control system, namely, a system for collecting milk from farmers' storage tanks. The system includes a base unit for centralized processing and a field unit. Milk collection information processed by the field unit is stored on RAM cards. The system has an activity log printer for recording system operations and a receipt printer for printing bills.

U.S. Pat. No. 3,650,303 to Chambers et al. describes another liquid handling system, a system for automated gasoline fillups of commuters' cars. The system includes a truck-mounted servicing unit which travels through a parking lot and fills up cars with a hose while metering and recording the amount of fuel delivered with a printer. The hose includes an identity device which provides a unique indication of the car's identity for recordkeeping purposes.

U.S. Pat. No. 3,814,148 to Wostl describes an improvement on the identification means in the Chambers et al. system. Wostl also discloses the use of intrinsically safe components and the use of the printer to print bills for customers.

U.S. Pat. No. 4,934,419 to Lamont et al. describes a fuel-delivery system in which a radiation transmitter in a vehicle fuel tank transmits vehicle-identification data to the input end of an optical fiber located in the fuel-delivery nozzle. The identification system is capable of transmitting the vehicle identifier as well as odometer, diagnostic, and fuel consumption information.

U.S. Pat. No. 5,154,314 to Van Wormer describes a computerized system for dispensing liquid products such as automobile cleaning and maintenance fluids to user receiving tanks. The system has a delivery vehicle which loads liquid products into its tanks at a central site and dispenses the products at a customer's storage facility. When a connection is established at a customer site, data specific to the customer's facilities is transmitted to the vehicle computer over power lines. A printer is available for hardcopy output of information. A telephone modem facility allows the central site to interrogate customer facilities to schedule supply trips.

While the above prior art systems represent a significant advancement in the art over the older mechanical systems, their unitary design and commensurate lack of flexibility can limit their usefulness in the field. That is, once a user acquired a system having certain of the above-mentioned capabilities, the system's functionality could not be modified later to evolving user and customer needs.

DISCLOSURE OF THE INVENTION

It is an object of this invention to provide a liquid control and registration system that permits rapid and simplified expansion of its functional capabilities.

It is a further object of this invention to provide a modular liquid control and registration system in which defective modules can be quickly and easily detected and replaced.

It is yet another object of this invention to provide an intrinsically safe modular liquid control and registration system which is substantially immune to radio frequency and other electromagnetic interference.

It is still another object of the present invention to provide a liquid control and registration system in which compensation factors related to dispensed liquid corrections are stored in a memory-efficient manner.

The above objects are achieved by providing a liquid control and registration system which has an intrinsically safe (IS) fiber optic network for the transmission of digital data between the various modules in the system. A preferred embodiment of this invention is designed for use in the petroleum industry (particularly the delivery of fuel oil by truck); however, a wide variety of other applications will be readily apparent to one of ordinary skill in the art. The system may be used in virtually any industrial application having a need to accurately control large amounts of liquid. For example, the invention also would be particularly useful in manufacturing paint, foodstuffs, pesticides and other chemical solutions, and the like.

A liquid control and registration system according to the present invention comprises several separate components interconnected by a serial data bus. The system components are of modular design to allow maximum flexibility in configuring them into individual systems. The simplest system requires only two components: a metering module and a counter module. As a user's needs increase, the system capability may be expanded by adding additional modules to the two existing modules. Six specific system embodiments are illustrated herein; however, a wide variety of additional configurations will become apparent to one of ordinary skill in the art.

The major interface for the system is the common serial data bus which interconnects most of the modules in a ring or loop configuration. Data is sent from one module to another on this bus. Each module has two identical bus connectors which allow the "daisy-chaining" of several modules in a string. The order of interconnection is immaterial to the proper functioning of the system. The serial bus is relatively immune to electrical interference from, for example, vehicle electrical systems as well as RF interference from the vehicle's two-way communications radio when the system is implemented in a mobile configuration.

When used in fuel delivery applications, the system must be built to IS standards due to the petroleum industry protections against safety hazards. An intrinsically safe system meets stringent requirements to ensure that the electronic devices employed cannot ignite a spark or create sufficient thermal energy to cause an explosion in a particular atmosphere, such as one that is laden with petroleum fumes. The circuit boards and related electronics must meet IS requirements even if up to three faults are introduced into the equipment. By making the system entirely intrinsically safe, the use of explosion-proof enclosures or conduit can be avoided.

As noted above, the present invention is built modularly. A user may implement the core registration system that display, as a basic function, the quantity of liquid delivered. At the other end of the modularity spectrum, a complete system according to the present invention allows the operator to enter a preset delivery amount and have the system automatically shut the valves when that amount has been delivered.

In addition to the basic liquid flow control capabilities, the modular system is also capable of providing a wide array of auxiliary functions. For example, the system may also include an Electronic Temperature-Volume Compensation (ETVC) capability to compensate liquid delivery figures for thermal expansion in accordance with industry-accepted standards published by the American Petroleum Institute (API) when the system is used in fuel delivery applications.

Further, a user may enter a variety of tax rate structures, billing data, and customer information from a lap pad in a vehicle cab when the system is implemented in a mobile configuration. The system may also have a RAM card for uploading/downloading customer and delivery information, a printer, and a radio link that keeps the system in touch with the accounting systems at the office. The radio link enables the drivers to send information to the office after each delivery rather than having all of the trucks download their information on RAM cards at the end of the day.

BRIEF DESCRIPTION OF THE DRAWING

These and other objects and advantages of this invention will become apparent and more readily appreciated from the following description of the presently preferred exemplary embodiments, taken in conjunction with the accompanying drawings, of which:

FIG. 23 is a sample correction factor bitstream table used in the present invention.

FIG. 24 is a diagram of the messaging format used between modules in the present invention.

BEST MODE FOR CARRYING OUT THE INVENTION

A liquid registration and control system according to the present invention will now be described with reference to various embodiments providing progressive greater levels of functionality.

Figure 1:
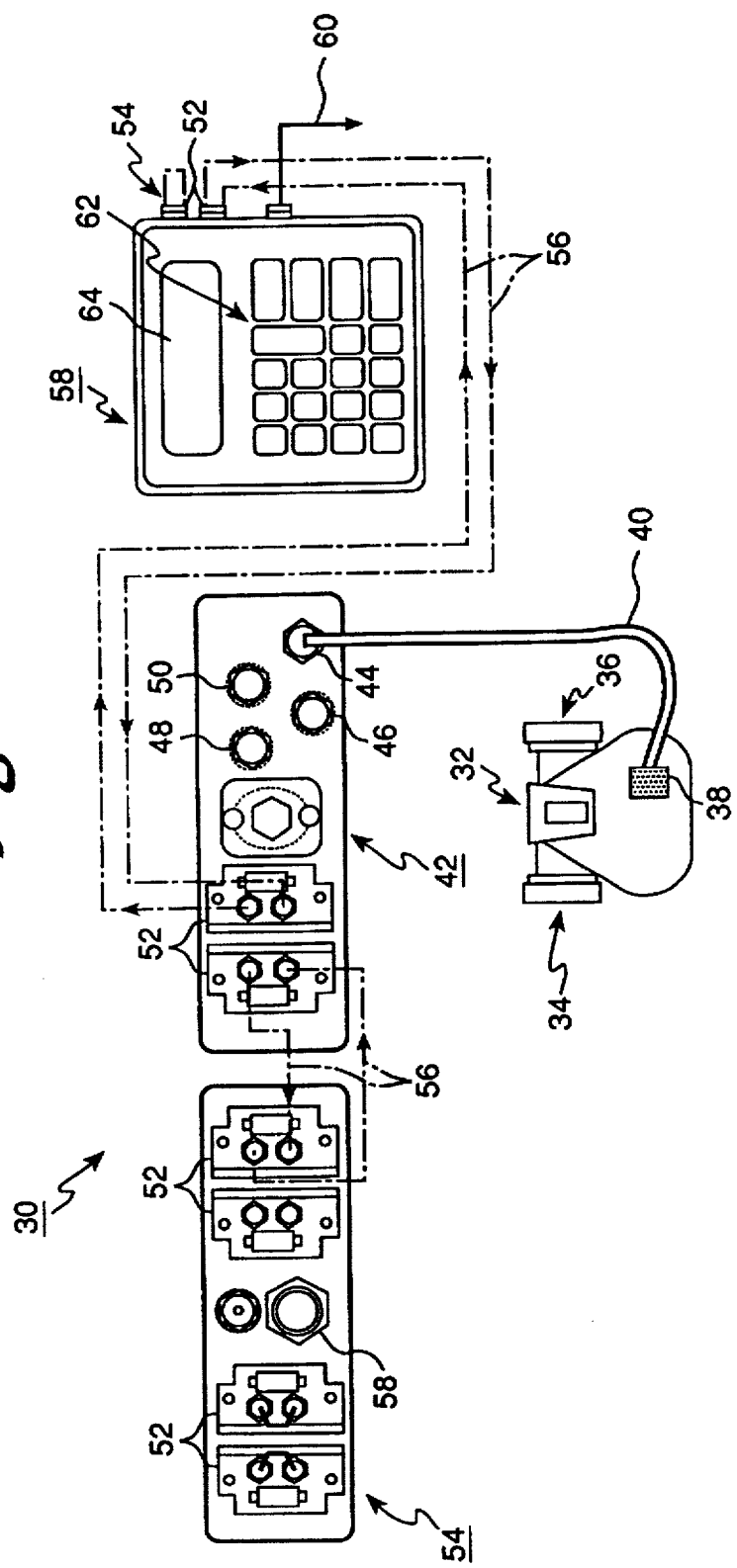
FIG. 1 is a system diagram of a first embodiment of the present invention which performs a registration function only and requires manual operation of the liquid control valve.

The first embodiment of the invention that will be described is the basic electronic counter configuration shown in FIG. 1. This system provides all of the functionality associated with the above-mentioned prior art mechanical systems without the associated disadvantages. As can be seen in FIG. 1, the basic counter configuration 20 includes Solid State Pulser 38, Meter Dedicated Processor 42, Local Control Console 58, and DC Power Supply 54.

In this system, a Solid State Pulser 38 is mounted on a meter body 32 between a liquid inlet port 34 and a liquid outlet port 36. Liquid enters the inlet port 34 and causes the Solid State Pulser 38 to produce pulses indicative of liquid flow through the meter body 32. These pulses are conveyed to the Meter Dedicated Processor 42 by a pulser cable 40. The pulser 38 may comprise one sensor for producing pulses indicating any flow within the meter body 32; alternatively, it may have two sensors spaced apart to provide directional flow capability in a manner well-known in the art.

Figure 2:
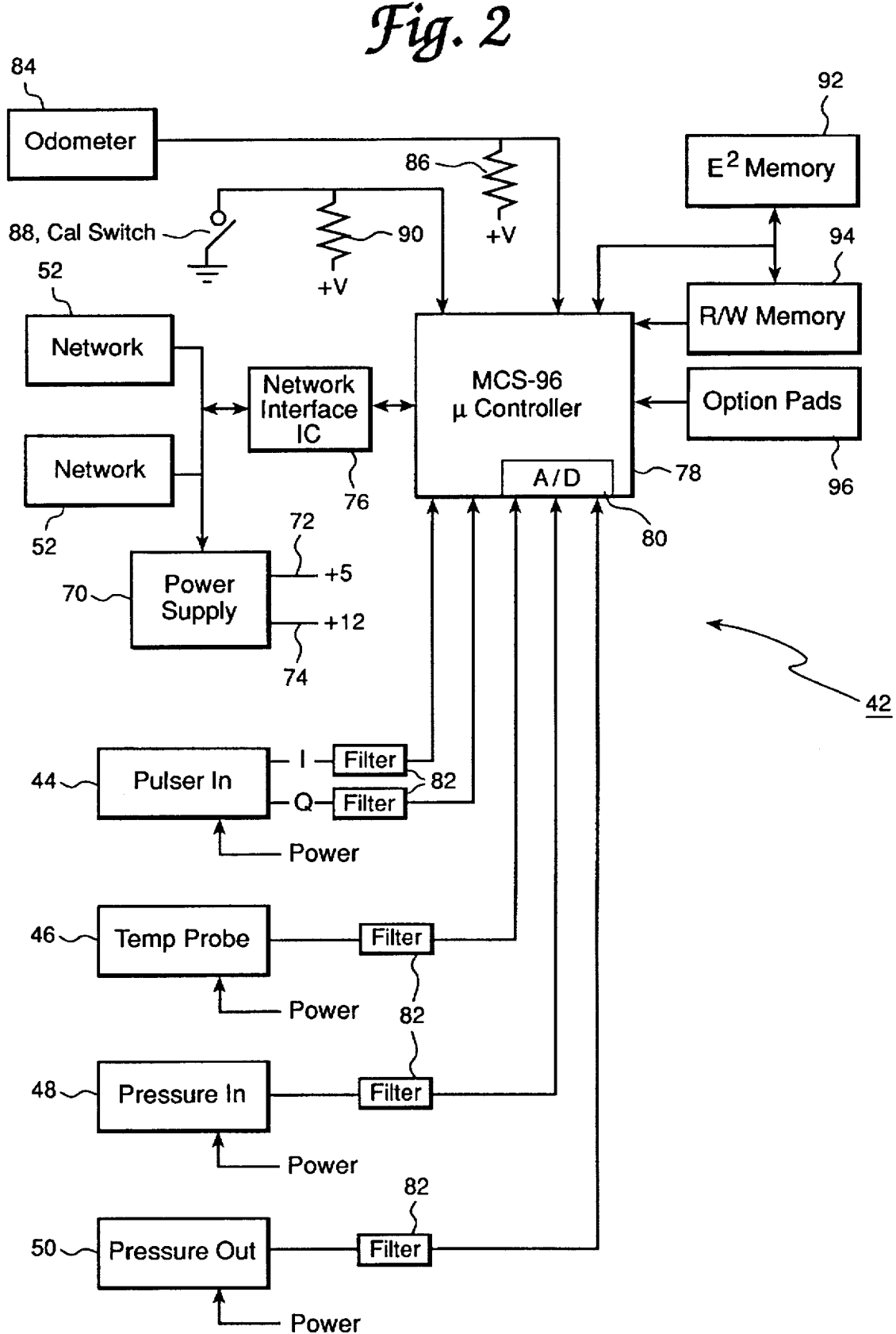
FIG. 2 is a block diagram of a Meter Dedicated Processor according to the present invention.
Figure 3:
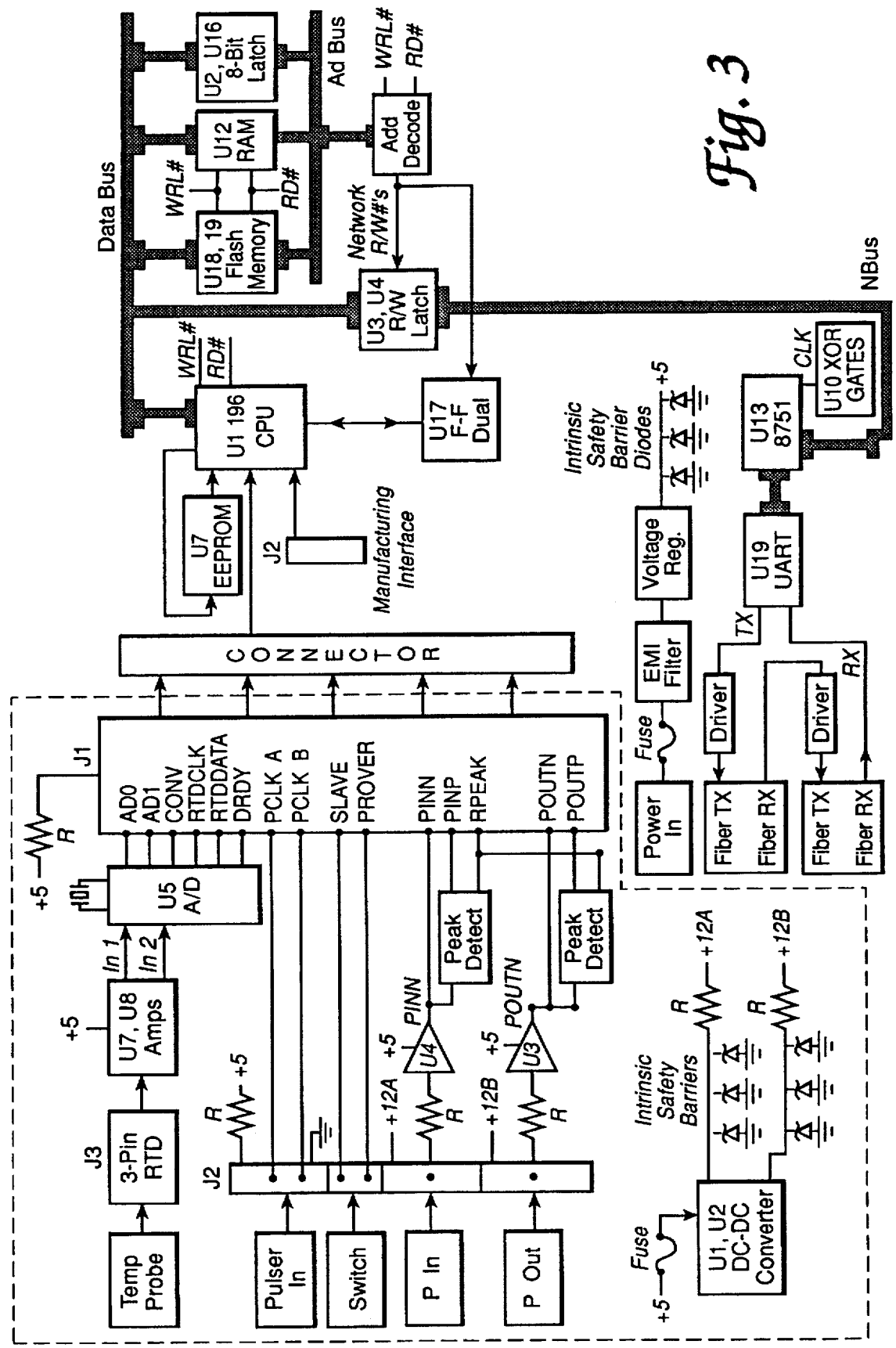
FIG. 3 is a component level diagram of a Meter Dedicated Processor of FIG. 2 according to the present invention.

As can be seen in greater detail in FIGS. 2 and 3, the Meter Dedicated Processor 42 counts pulses from Solid State Pulser 38, corrects this reading with meter scaling factors more fully described below, and transmits this data over a serial bus 56 to a Local Control Console 58. The Meter Dedicated Processor 42 also has an input 46 for a liquid temperature sensor, an input 48 for a flow pressure sensor, odometer 84, and an output 50 for flow pressure. If sensors have been connected to these inputs, the Meter Dedicated Processor 42 can measure and provide information on liquid temperature and flow pressure in addition to the basic liquid volume information.

Preferably, the Meter Dedicated Processor 42 converts voltage levels received at temperature sensor input 46 to digital representations of the liquid temperature and corrects the liquid volume reading with values from an expansion table stored in the Meter Dedicated Processor 42. Pressure values from input 48 are preferably converted to digital form and stored in memory for later processing, as is the mileage reading from the odometer input.

The system software for this embodiment of the present invention will now be described in detail. Reference may also be made to APPENDIX A, which is a C language source code listing for many of the routines described herein.

Figure 19:
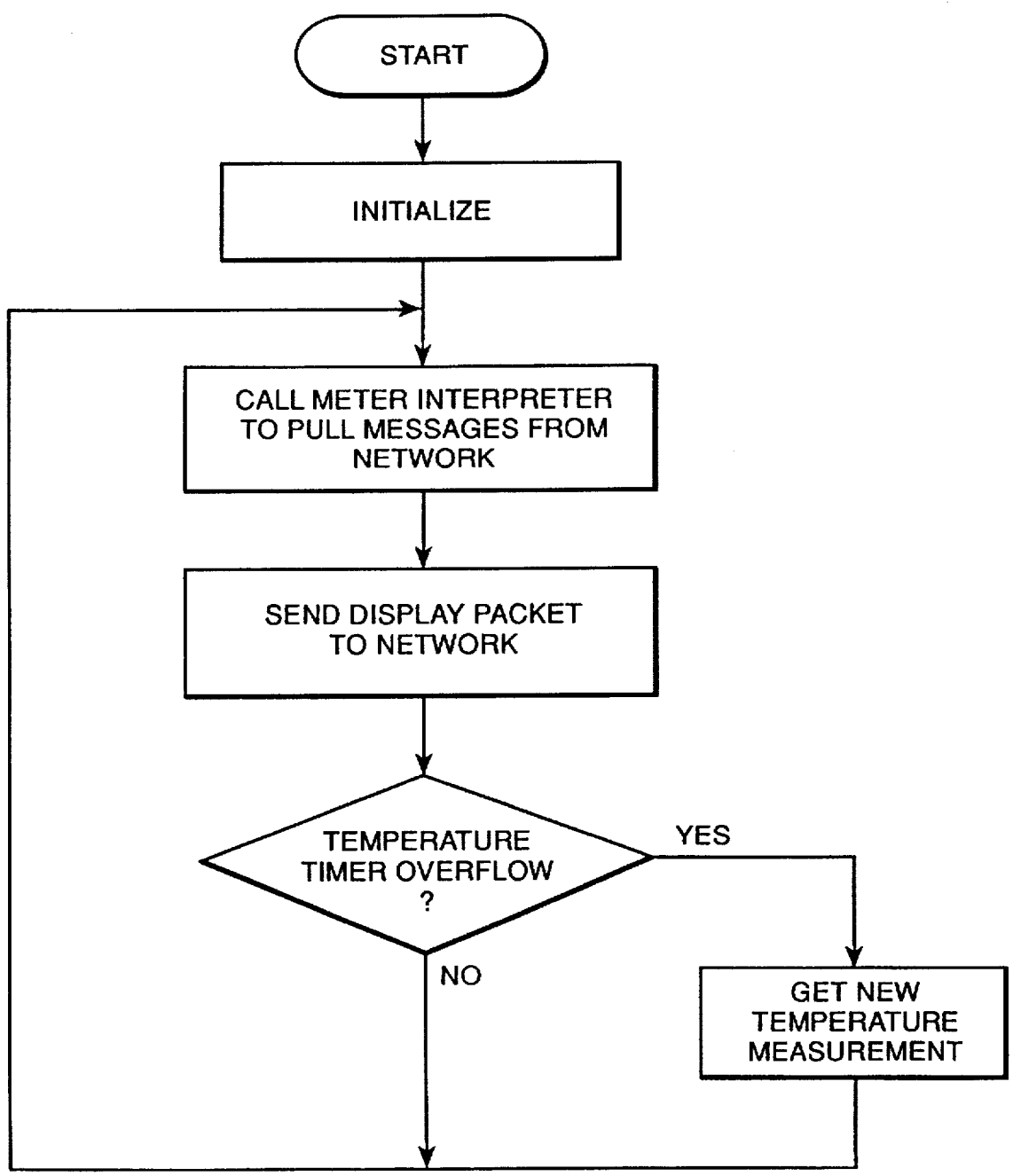
FIG. 19 is a flowchart showing the operation of the Meter Dedicated Processor software.
Figure 20A:
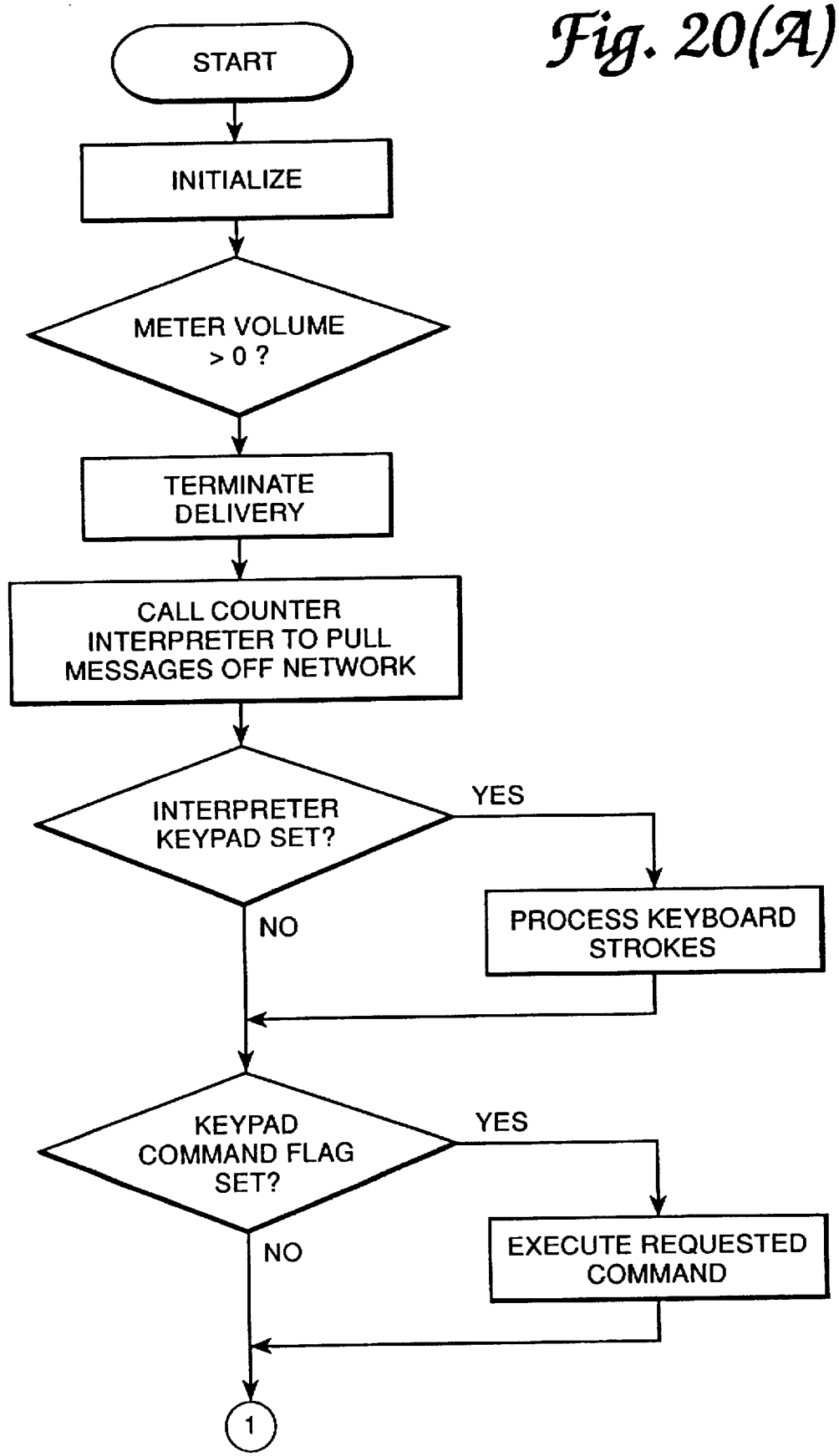
FIGS. 20A-20F is a flowchart showing the operation of the Local Control Console software.
Figure 20B:
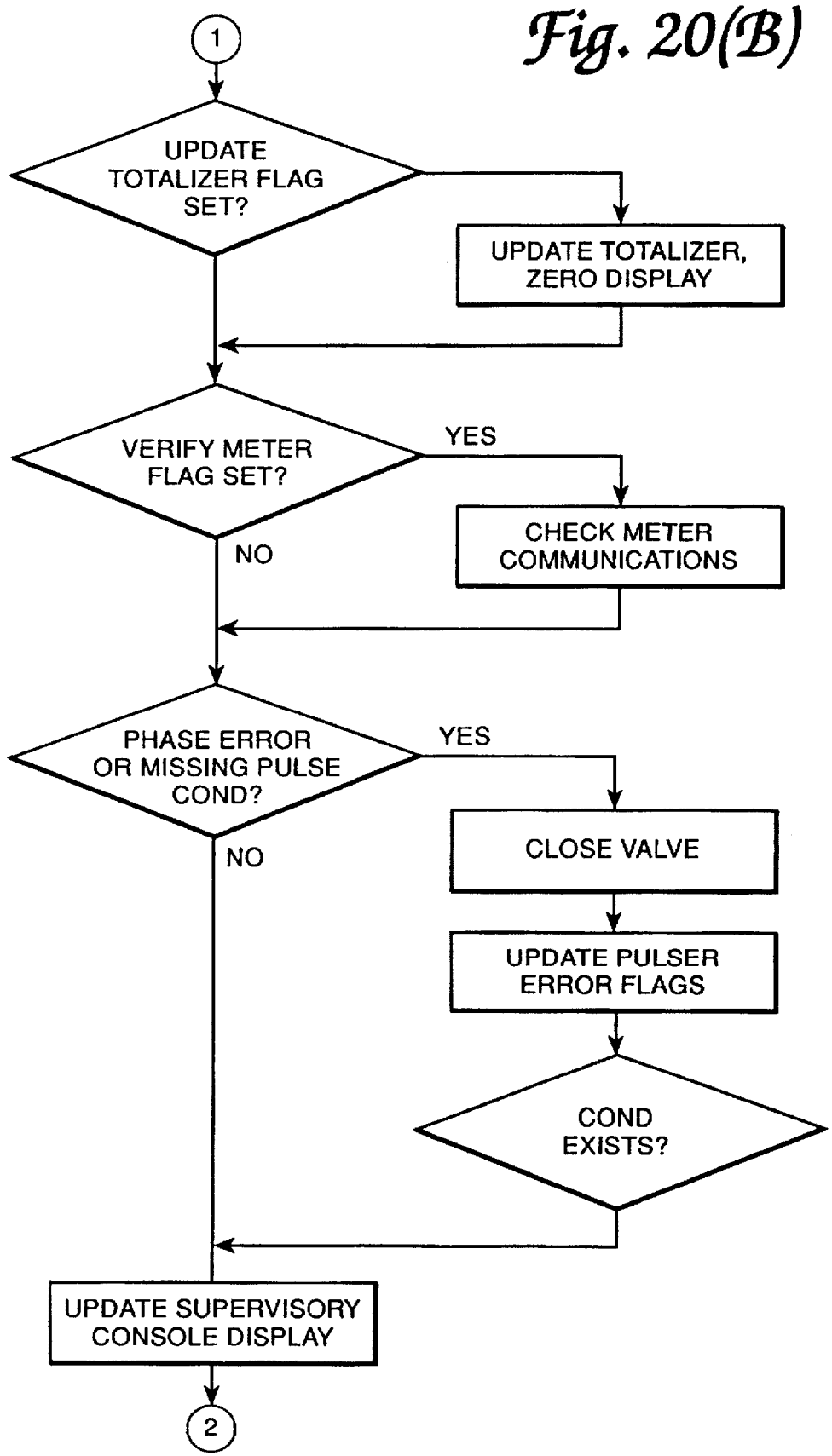
Figure 20C:
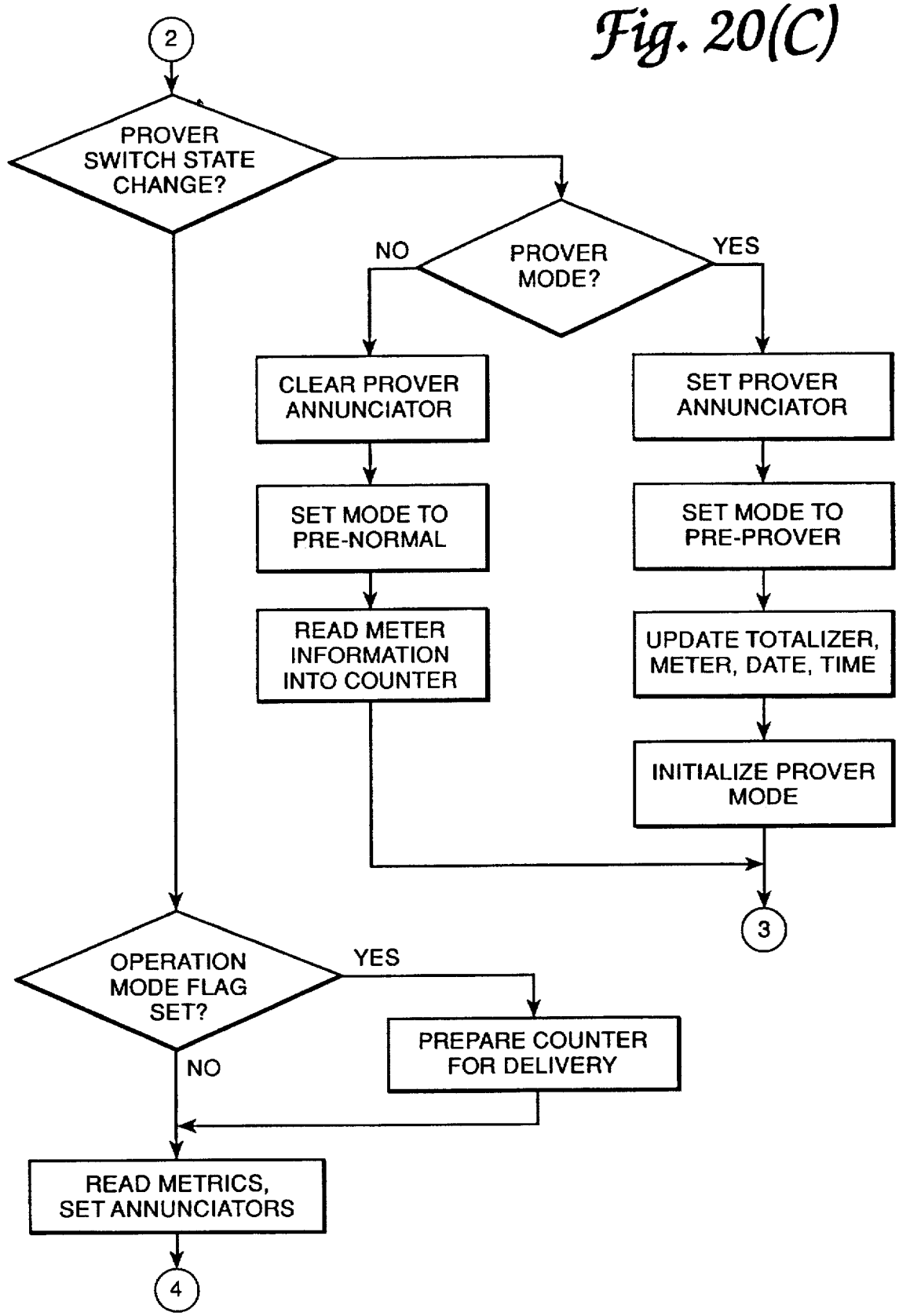
Figure 20D:
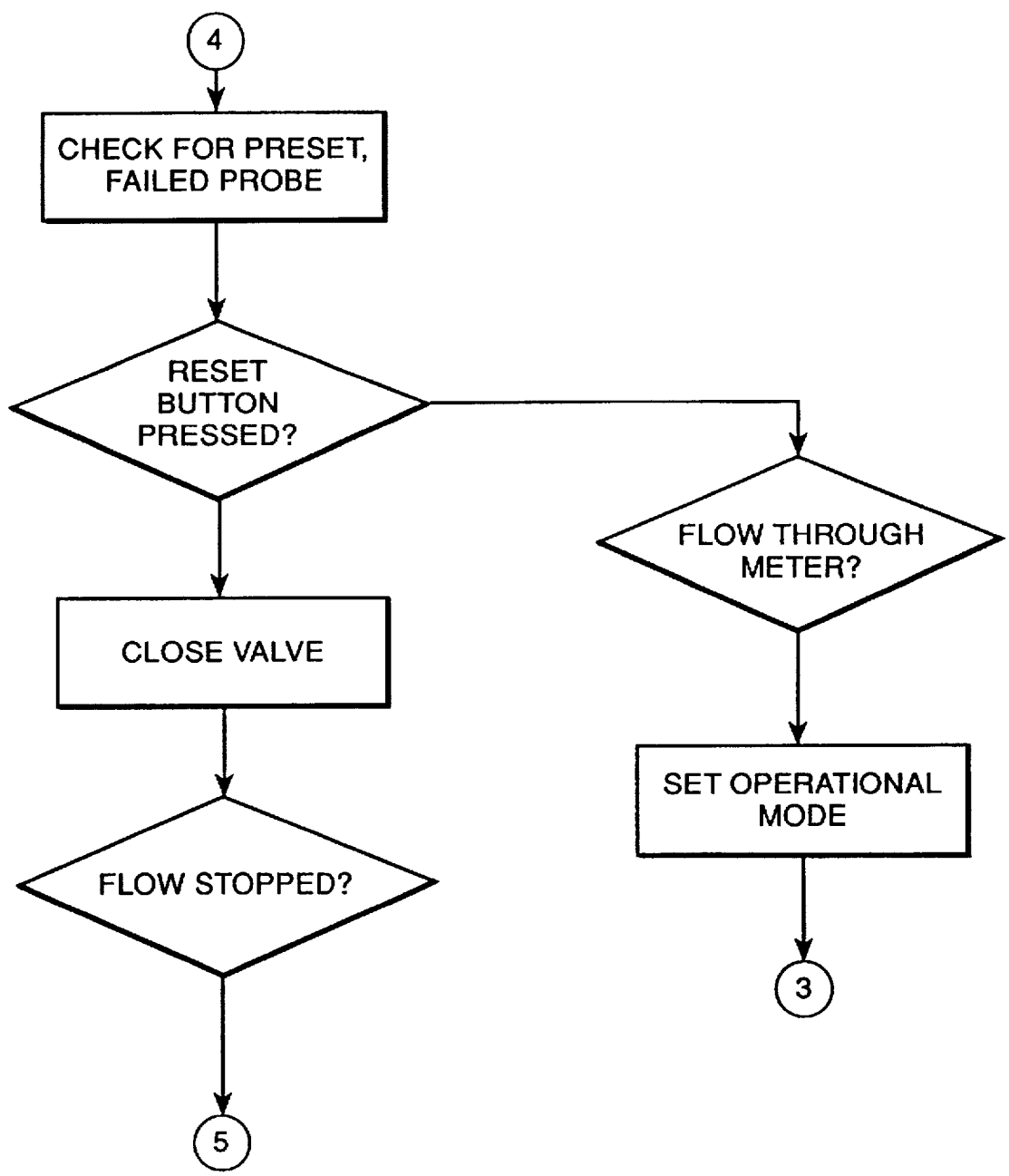
Figure 20E:
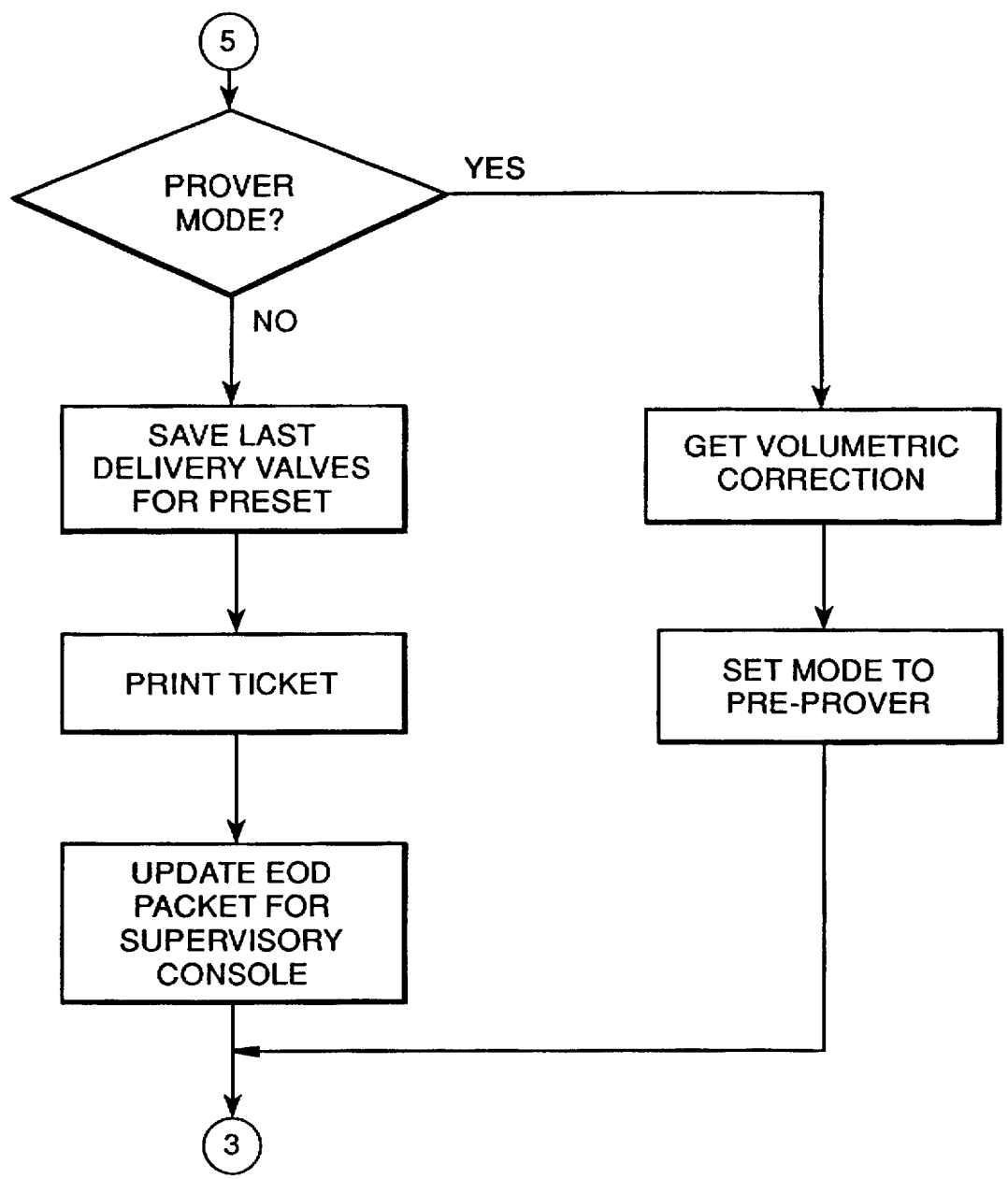
Figure 20F:
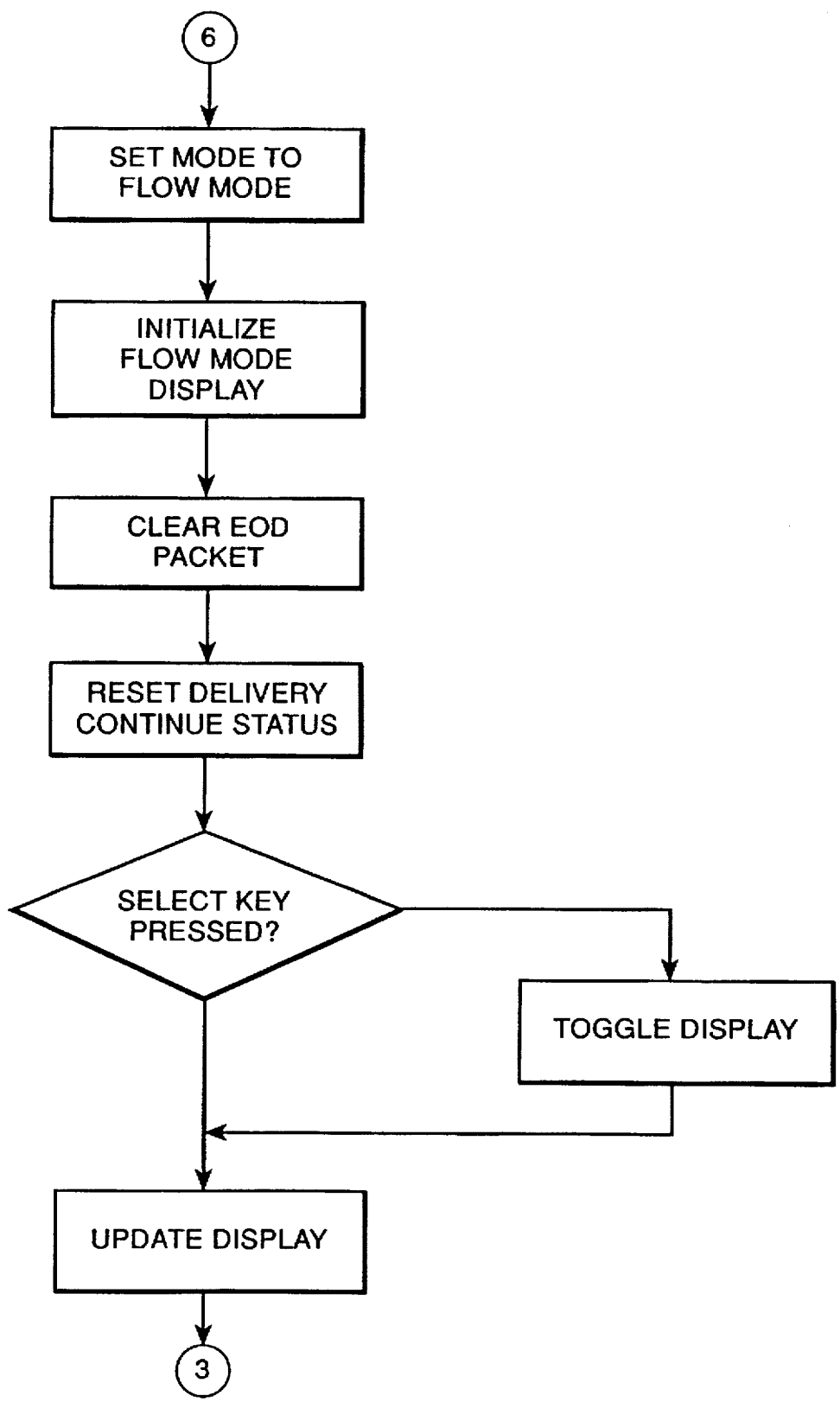

A flowchart for the software routines used by Meter Dedicated Processor 42 is shown in FIG. 19. The Counter is the means by which the user gets user-entered input into the system. The main loop of the counter operates on a signal/action basis. The various signals are provided by the keypad 62 and the supervisory console on the network.

During the span of the counter's operation, the value seen for the current delivery is always what is currently being sent by the meter. No operations are performed to smooth out the display. The display updates the delivery value as fast as it can obtain it off of the network.

Each pass through the main loop of the counter results in a check of the temperature compensation device, if it is enabled. This test on a failure will result in an error message being displayed and delivery of fluid inhibited. If the temperature probe is replaced with a functional probe then the message will go away and normal operation can commence. If the temperature probe is not replaced, then the reset key can be pressed and the counter will disable the temperature compensation and allow for a gross delivery to continue.

Each pass through the main loop of the counter also results in a test of the pulser for an error condition. If an error condition is detected then a corresponding message will be displayed and delivery will cease.

Several software routines are used by the Meter Dedicated Processor 42 during its operation. One of these is the Non-Quadrature Pulse Detection Routine. This routine detects an incoming pulse from the Solid State Pulser 38 and increments an internal counter that is later accessed in liquid volume delivery computations.

Another routine used for calibration of the Meter Dedicated Processor 42 is a Quadrature Pulse Detection Routine. This routine detects an incoming pulse from the Solid State Pulser 38, determines if the pulse indicates forward or reverse liquid flow, and then increments or decrements the liquid volume counter accordingly.

Ancillary to the Quadrature and NonQuadrature Pulse Detection Routines are the Missing Pulse Detection and Spurious Pulse Detection Routines. These functions analyze pulse trains from Solid State Pulser 38 to determine if a pulse has been missed or a spurious pulse has occurred, respectively.

The Pulser functions are the heart of the Meter Dedicated Processor 42. These functions will bring in a quadrature pulser input and perform the following operations with respect to that input. The Pulser functions first determine if there is an actual pulse or a low power indicator. If the low power indicator is activated then the system is about to lose power completely and no operations should be performed. Also, at this time the pulser module would proceed to step SHUTDOWN. If the low power indicator is high then the system is powered and can continue with next steps in the procedure.

The Pulser module then checks for missing pulses. If the missing pulse limit is exceeded then the error flag is set. The module then calculates the current absolute flow rate, checks for a missing phase on pulser, and if the phase is missing, then the error flag is set.

After this, the system sets the current average flow rate and determines the base gross pulse volume for the current absolute flow rate. This value is obtained from a lookup table of linear interpolated values as will be described in more detail below.

Next, the system calculates the current net volume. This calculation is done for every pulse that comes into the meter. If temperature compensation is not enabled then the volume correction factor is equal to 1.0. If the temperature compensation is enabled then the value could be something other than 1.0.

The system then determines the direction of pulser input. If the pulser is moving in a forward direction then the base pulse gross volume is added to the current gross volume delivered. If the pulser is moving in the reverse direction then the base pulse gross volume is subtracted from the current gross volume delivered. The same operation is performed for the net volume also.

Finally, the current volumes are placed into a display buffer for sending to the counter device for display purposes.

The Pulser module has several inputs. First, the A_PHASE input comes in on a non-maskable interrupt. This is done in this manner such that the pulses could be counted on a per pulse basis. This is possible since the non-maskable interrupt can cause an interrupt in any part of the system at any time.

The B_PHASE input comes in on a HSI interrupt. This phase is used in the detection of missing pulses and the detection of a missing phase.

Finally, the LOW_POWER input is a flag that comes in on PORT 0.6. This flag also generates a non-maskable interrupt.

The Pulser module also has several timers used in its operations. For example, the TIMER_2_OVERFLOW is used to generate an intra-pulse timing which is used to determine the current rate of flow.

The Meter Dedicated Processor 42 also includes a Volume Correction Routine. This routine is used only when the system's Electronic Temperature Volume Compensation (ETVC) option is enabled. The routine inputs the current temperature of the liquid from temperature sensor 46 input and provides it to a volume correction routine described below. Should the temperature probe be inoperable due to a short or open circuit, the routine can also shut down the entire system.

Pulses from the pulse train conditioned by the Pulse Detection Routines are processed by the Volume Correction Routine. This routine uses the rate of flow as represented by pulses from the Solid State Pulser 38 and the liquid temperature signal from temperature sensor input 46 to compute a volume corrected flow rate. The volume correction factors used to compute the corrected flow rate conform to American Petroleum Institute standards and will be described more fully below in connection with Local Control Console 58.

The Volume Correction Routine is used in conjunction with a Temperature Module which contains an assortment of routines used to place the temperature functions into particular states. These routines provide a number of operations. For example, they tell the Temperature Module that it should exist in the system. This allows for a system to be configured for no temperature probe in which case the other temperature operations would have no effect. Also, they enable and disable the temperature probe. This function provides a means to enable the temperature compensation and disable the temperature compensation only if the probe exists in the system. If the probe is enabled and it exists in the system then the current volume generated by the pulser input is compensated by a temperature volume correction factor. This function also detects whether a probe has gone failed (i.e., being opened or shorted) and will send the appropriate error to the counter.

The Meter Dedicated Processor 42 also has a Serial Interface Routine which controls the serial line that is connected to the Meter Dedicated Processor 42, decodes intercepted messages and passes them along to the serial command process described more fully below. This function will be activated whenever a serial port interrupt occurs, thus indicating communications activity on the system serial bus. Serial bus communications will be described more fully below.

The Meter Dedicated Processor 42 also includes a Send Message Routine which is used when the Meter Dedicated Processor 42 wants to send a message over the system serial bus 56 to another processor. It will compute all the necessary error correction checksums and other necessary protocol-related functions.

Related to the Send Message Routine is the Receive Message Routine, which monitors the system serial bus 56 for incoming messages addressed to the Meter Dedicated Processor 42 and turn the intercepted messages over to the system command processor routine (described below) for action.

The Meter Dedicated Processor 42 also has a Stop Delivery Routine that is active only when the Meter Dedicated Processor 42 is used in conjunction with a Valve Control Module 128 described more fully below. The Stop Delivery Routine instructs the Valve Control Module 128 to terminate flow of liquid through the valve 39 if a large number of missing or spurious pulses are detected, thus indicating a problem in the system.

Another routine, the Pressure Monitor Routine, is active only when the Valve Control Module 128 is used and a pressure sensor is connected to pressure sensor input 48. This function inputs the current pressure reading and takes various actions based on that reading such as recording maximums and valve shutdown when low pressure is detected.

Finally, the System Command Processor Routine analyzes the system serial line messages for requests and information and initiates other meter routines as necessary.

The Meter Dedicated Processor has four basic modes of operation. The first mode is the Calibration Mode. This mode supports the calculations necessary to develop initial proving factors for the meter. Another mode supported by the Meter Dedicated Processor 42 is a Proving Mode, which is used to perform accuracy checks for Weights and Measures requirements. The Proving Mode is used to ensure the accuracy of Meter Dedicated Processor 42 as described below.

All liquid-flow meters have some error associated with the movement of liquid through their internal cavity. For example, a typical meter manufactured by the Liquid Controls Corporation of North Chicago, Ill. is generally calibrated at 200 gals/min. If the measurement is at 160 gals/min, the meter will be substantially correct, but at 60 gals/min, the error is 0.015% or 0.009 gals/minutes.

To compensate for the meter's inherent error at all points in the range of flows it will be used to measure (i.e., to "prove" the meter), a ninth order polynomial interpolation is used to describe the error curve of the meter. The volume flow value is then corrected on a per pulse basis; that is, the inter-pulse or instantaneous rate of flow for the incremental volume flowing between pulses is measured and the meter volume flow correction provided by the interpolation polynomial is added to it. Since this process is performed on a pulse-by-pulse basis, it is largely immune to fluctuations in the liquid flow rate.

Two other modes used in the Meter Dedicated Processor 42 are the Operational Mode and the Testing Mode. The Operational Mode is the normal run mode for the processor 42 after it has been calibrated and proven. The Testing Mode allows service technicians to view system parameters and perform internal diagnostics without changing the preset system values.

In addition to the above-described routines, the testing mode also makes use of a Run Diagnostics Routine when requested by the operator. Examples of diagnostic functions that may be performed by the run diagnostics routine are memory checking, viewing system parameters, and causing meter functions to activate.

Figure 4:
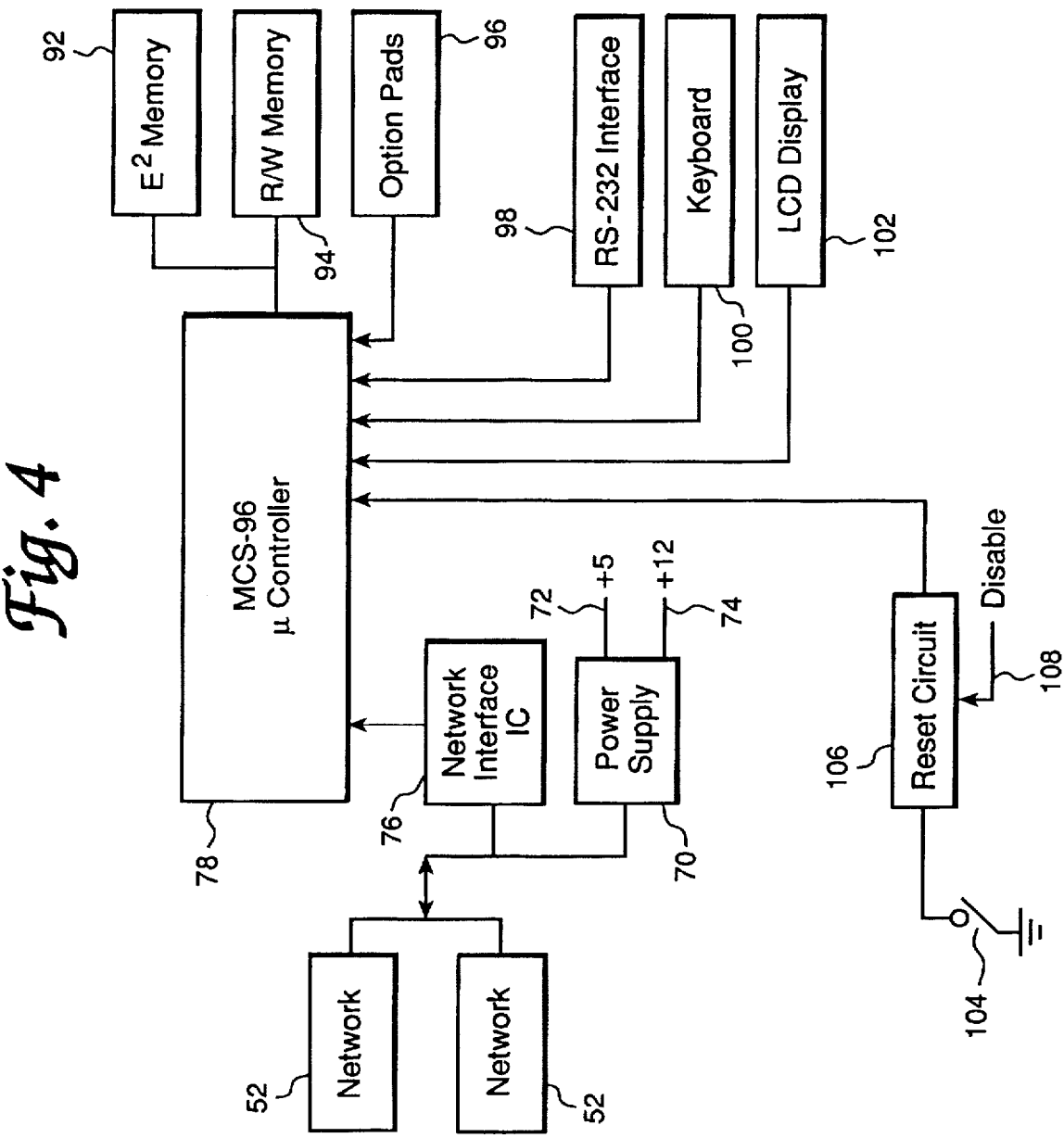
FIG. 4 is a block diagram of a Local Control Console according to the present invention.
Figure 5:
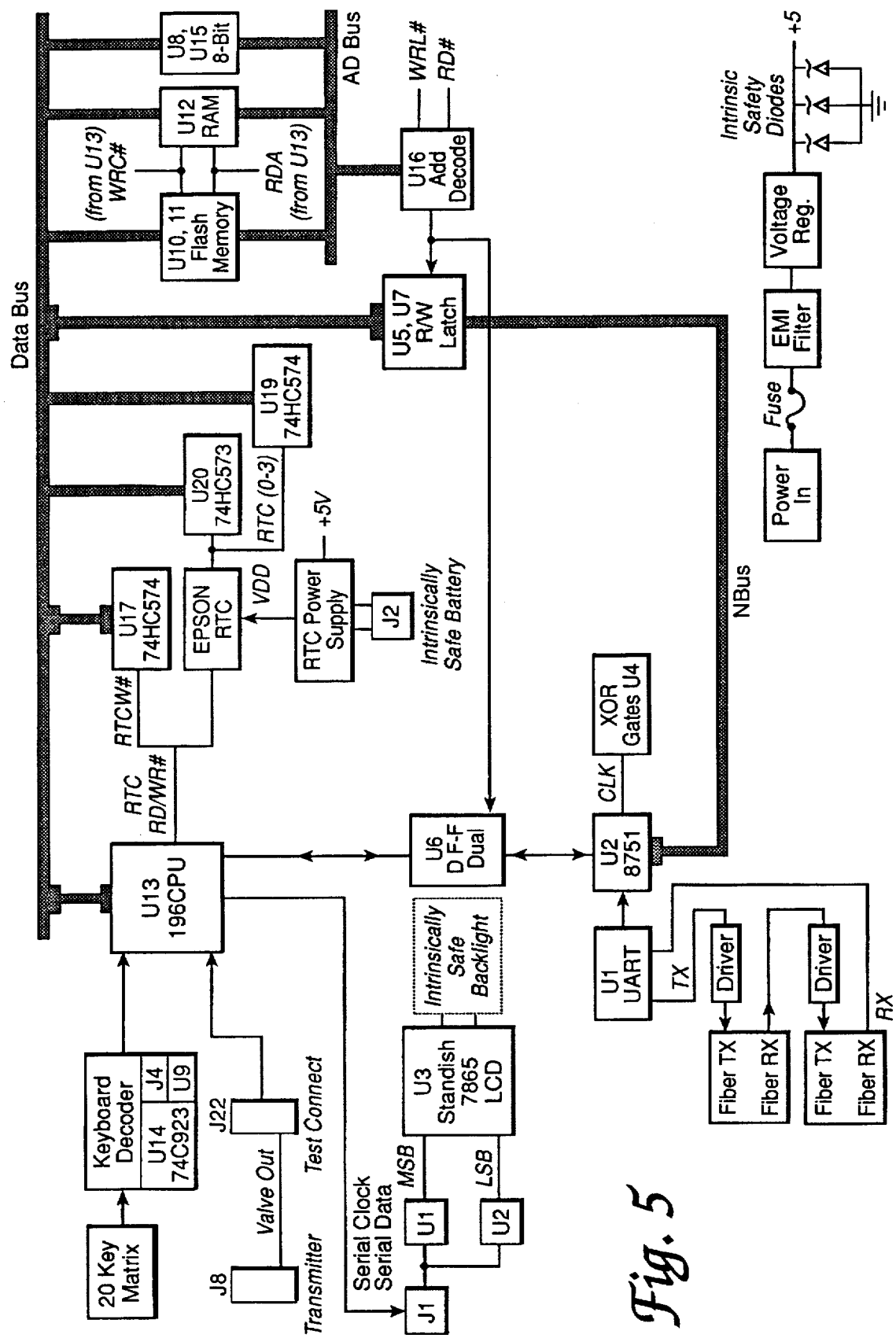
FIG. 5 is a component level diagram of a Local Control Console according to the present invention.

The operation of the Local Control Console 58, shown in greater detail in FIGS. 4 and 5, will now be described in greater detail.

A primary function of Local Control Console 58 is to display information to the system operator. If optional sensors have been installed and the software has been activated, liquid temperature, pressures, and odometer mileage can be read from the meter dedicated processor 42 and displayed on liquid crystal display (LCD) 64. LCD 64 is a liquid crystal display having ten 0.7 inch digits and five decimal points as well as annunciators for GALLONS, LITERS, PROVER, TOTALIZER, and a symbol for low battery.

The Local Control Console 58 is capable of displaying the total of the current liquid delivery as well as the cumulative total of all liquid ever delivered. The current delivery and the cumulative amount can be displayed on LCD 64 at different times at the operator's discretion by entering an appropriate command through a Select Display button (unnumbered) on keyboard 62. This button toggles the display between the cumulative and delivered amounts. The display reverts from the cumulative to the delivered amount after 15 seconds.

The current delivery total can be reset with a command from keyboard 62. Upon reset of the total delivery, the counter activates all display segments and annunciators for one-half second, deactivates all display segments and annunciators for one-half second, and displays all zeros until delivery has begun. Once delivery has begun, the display figures increment to reflect liquid delivery until the end of the delivery. The display holds the total delivered for 15 minutes after the completion of delivery unless the Local Control Console 58 is reset during that time. The reset function is inoperative during delivery.

A flowchart for the software routines used by Local Control Console 58 is shown in FIG. 20. Several software routines are used by the Local Control Console 58 during its operation. One of these is the Volume Correction Factor Generation Routine. To understand the Volume Correction Factor Generation Routine, it is important to be familiar with the expansive properties of liquids, particularly petroleum products. The temperature of a liquid will cause the volume of the liquid to expand or contract. For example, 1.0 cubic feet, or approximately 7.48 gallons, of a petroleum product other than crude oil of density 700.0 will occupy 0.9527 cubic feet at 50° C., 1.000 cubic feet at 15° C. and 1.0199 cubic feet at 0° C. To ensure accurate measurement of such petroleum products over a wide range of temperatures, adjustment tables are published by the American Petroleum Institute (API) and are known as the API tables. There are ten volumes with a mathematical approximation method published in volume X.

A meter will measure the absolute volume, or "gross" volume, of a liquid that passes through its internal cavity. By monitoring the temperature of the fuel, applying the API correction factor, the theoretical volume of the liquid at an agreed upon normalization point can be determined. This volume is called the "net" volume.

The accepted (or legally required) normalization points are 15° C., 60° F. and 70° F. API tables exist for different products and at different densities for the correction factors. For example, in Canada, all deliveries that are corrected must be corrected to 15° C. and the temperature probe must meet documented specifications. That is, they must be accurate to within 0.25° C.

The temperature range of most API tables are from –40° C. to 95° C., though some Fahrenheit tables go as high as 300° F., and the centigrade table entries are in increments of 0.25° C. Thus, there are (95—40)=135 * 4, or 540 table entries for one table density.

Given that it takes usually 4 bytes of computer memory to store a single precision floating point number, one table density entry would require a minimum of 540 * 4 bytes, or 2160 bytes of memory.

To reduce the amount of memory required to store volume correction factors, a novel compression technique is used. First, a user enters the density and table that he or she wants. The table is generated from a mathematical procedure defined in Volume X of the API tables and is then compressed.

Figure 21:
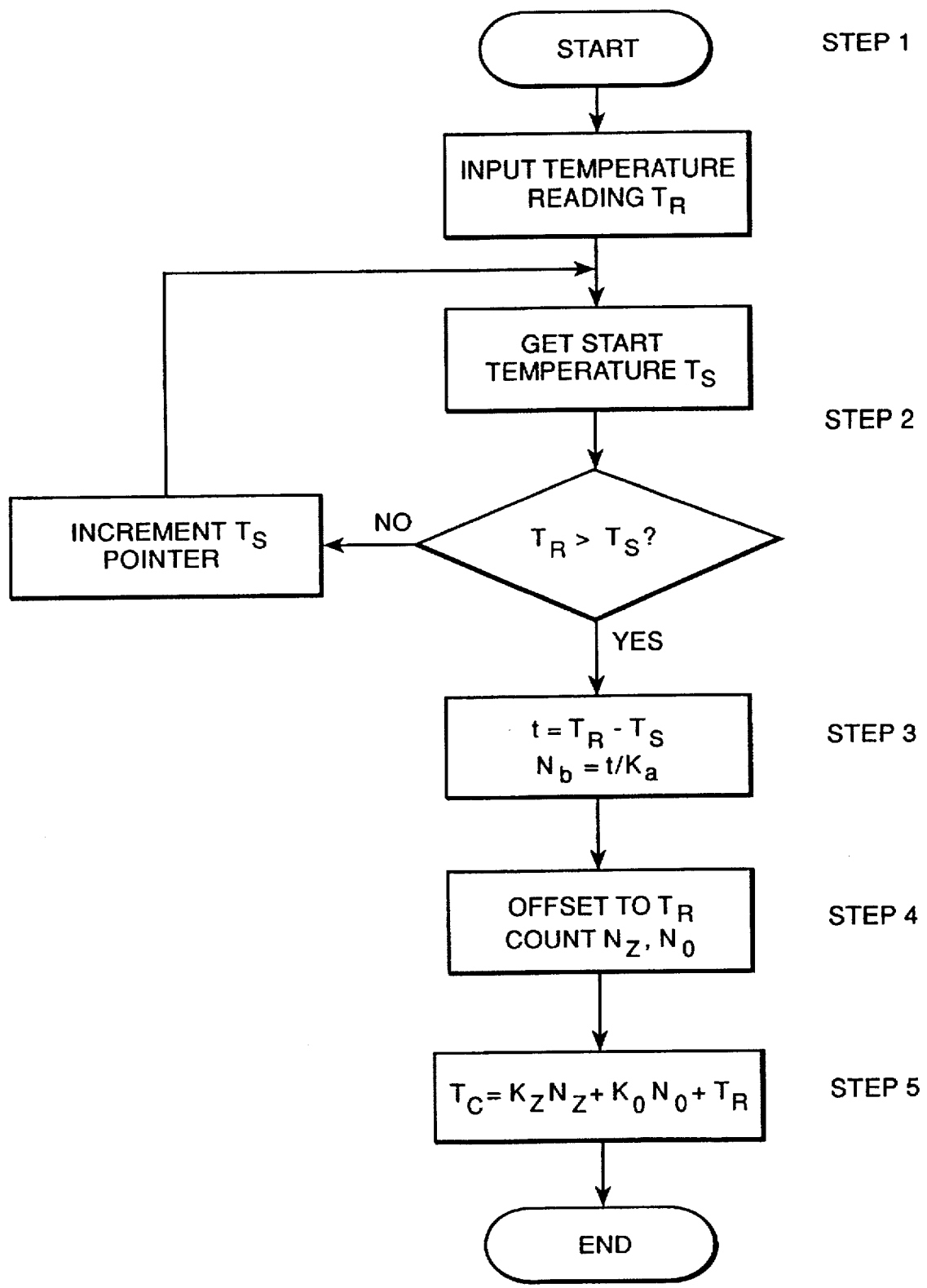
FIG. 21 is a flowchart showing the operation of the volume correction factor compression routine according to the present invention.
Figure 22:
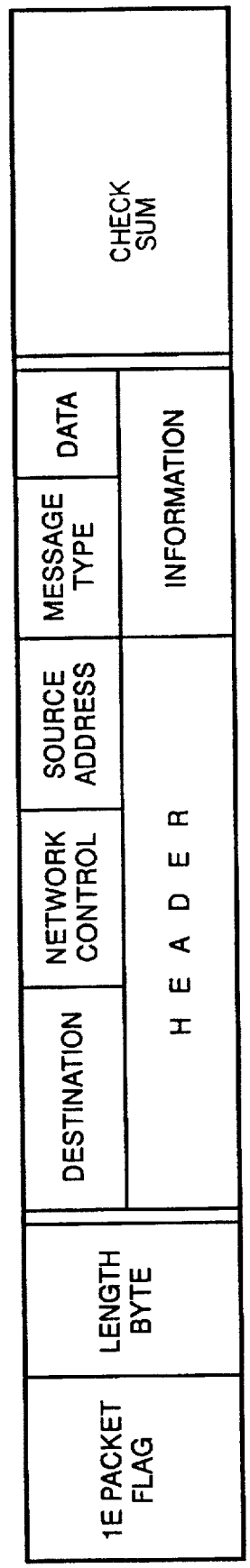
FIG. 22 is a sample volume correction factor table used in the present invention.

The volume correction factor compression technique will now be described in more detail with reference to FIGS. 22–24. FIG. 21 is a flowchart describing the compression technique. FIG. 22 is an example of Resistively Temperature Dependent (RTD) temperature probe data that is compressed, and FIG. 23 is API Table 54B at a density of 700.0. First, in Step 1 the routine takes a given temperature reading and in Steps 2 it searches through index tables until it finds a table entry greater than the starting temperature in the index table. Then, in Step 3 the routine subtracts the given table's starting temperature from the temperature reading and divides this difference by the table increment (in the case of FIG. 22, an increment of 0.1° C.), thus yielding the number of bits to process in the stored bit stream. In Step 4, the bit stream corresponding to the starting table entry noted above is offset by the given number of bits and the numbers of zeroes and ones encountered during the offset process are noted. In Step 5, each of these numbers is multiplied by a corresponding correction factor and added to the volume correction factor identified in Step 1 to yield the corrected volume correction factor at the specified temperature.

By using the compression technique, the system allows the user to set up the Meter Dedicated Processor for multiple products or for different densities of the same product. Thus, the operator does not have to do an elaborate process to switch between products or densities during a working day.

The Local Control Console 58 also has a Serial Interface Routine which controls the serial line that is connected to the Meter Dedicated Processor 42, decodes intercepted messages and passes them along to the serial command process described more fully below. This function will be activated whenever a serial port interrupt occurs, thus indicating communications activity on the system serial bus. Serial bus communications will be described more fully below.

The Local Control Console 58 also includes a Send Message Routine which is used when the Meter Dedicated Processor 42 wants to send a message over the system serial bus 56 to another processor. It will compute all the necessary error correction checksums and other necessary protocol-related functions.

Related to the Send Message Routine is the Receive Message Routine, which monitors the system serial bus 56 for incoming messages addressed to the Local Control Console 58 and turns the intercepted messages over to the system command processor routine (described below) for action.

Finally, the System Command Processor Routine analyzes the system serial line messages for requests and information and initiates other meter routines as necessary.

The Local Control Console 58 has four basic modes of operation. The first mode is the Calibration Mode. This mode supports the calculations necessary to develop initial proving factors for the meter. Another mode supported by the Local Control Console 58 is a Proving Mode, which is used to perform accuracy checks for Weights and Measures requirements. The Proving Mode is used to ensure the accuracy of Meter Dedicated Processor 42 as described above.

Two other modes used in the Meter Dedicated Processor 42 are the Operational Mode and the Testing Mode. The Operational Mode is the normal run mode for the processor after it has been calibrated and proven. The Testing Mode allows service technicians to view system parameters and perform internal diagnostics without changing the preset system values.

In addition to the above-described routines, the testing mode also makes use of a Run Diagnostics Routine when requested by the operator. Examples of diagnostic functions that may be performed by the run diagnostics routine are memory checking, viewing system parameters, and causing meter functions to activate.

The Local Control Console 58 also has a Pass Through Routine which will pass any message that is received, through itself, into the system serial link. This function permits more flexible diagnostics and error checking.

Figure 6A:
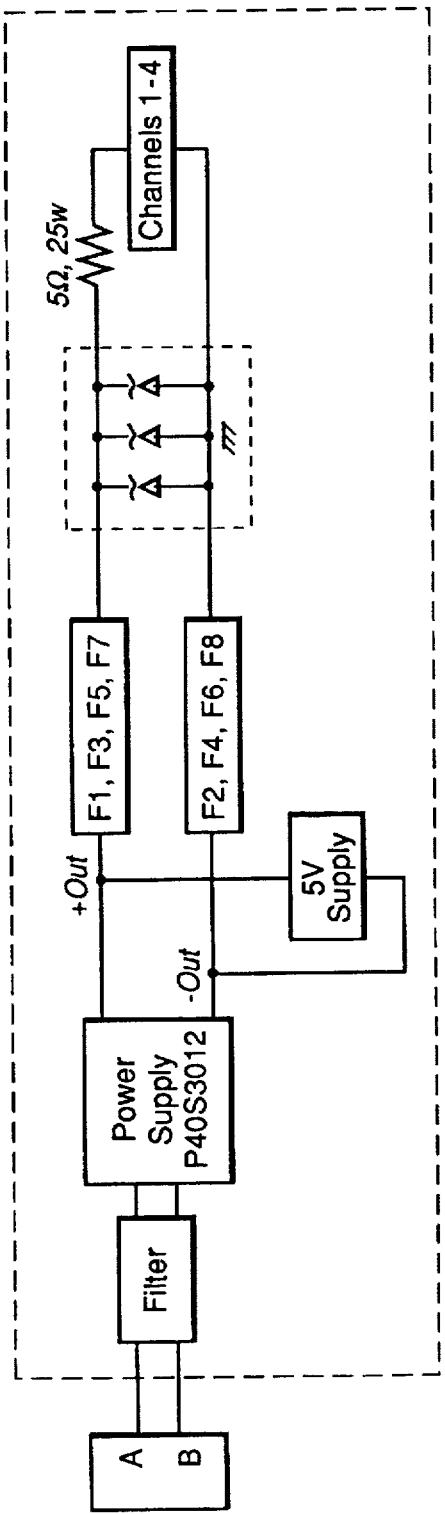
FIGS. 6(A) and 6(B) are component level diagrams of a DC Power Supply and its outputs, respectively, according to the present invention.
Figure 6B:
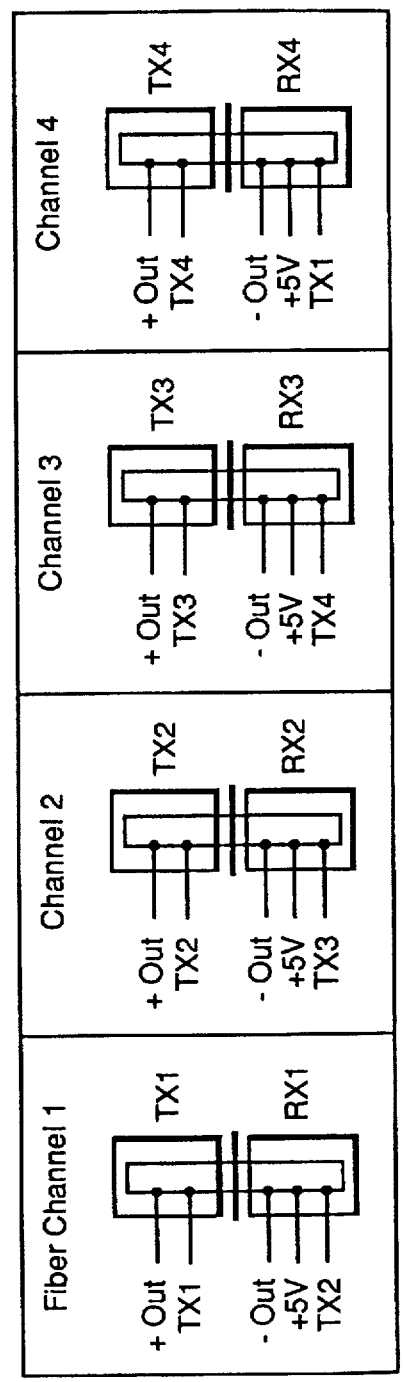

Finally, all system components are powered by DC Power Supply 54, which provides filtered, stabilized power from the vehicle battery or from a dedicated battery to the components. Details of the DC Power Supply 54 are shown in FIGS. 6A and 6B.

The following list summarizes all the functions on the Local Control Console. The parameters and correct sequence of function usage will follow. Note that any function number followed by a "P" means that the system must be in Prover mode to access that function.

SET DECIMAL PLACES (10)—Set the Number of Decimal Places in Delivery Mode for both Net & Gross. Valid range 0 thru 5.

SET TOTALIZER DECIMAL PLACES (11)—Set the Number of Decimal Places for the Totalizer for both Net & Gross. Valid range 0 thru 2.

GET PRODUCT NUMBER (40)—This will give the user the current Product Number which is a number from 0 thru 10.

DISPLAY CURRENT TIME (50)—Will display the time as HH:MM:SS H=Hour, M=Minute, S=Seconds.

DISPLAY CURRENT DATE (51)—Will display the date as MMDDYY Month, Day, Year.

ENABLE TEMPERATURE FUNCTION (60P)—If it already exists, it enables the Temperature function, i.e., allows Net & Gross volumes.

DISABLE TEMPERATURE FUNCTION (61)—If it already exists, it disables Temperature function.

SET TEMPERATURE MODE (62)—If it already exists, entering a 0 for the input parameter sets degrees C, a 1 sets degrees F.

SET TEMPERATURE OFFSET (63P)—Enter a floating point value that is applied to the Temperature value as a correction (i.e., offset).

SET PRESET PARAMETER (70)—Allows the user to setup the Preset Function Parameters. User must first choose the parameter by entering the parameter number 1 thru 5.

SET MAXIMUM PRESET (71)—Allows the user to set the maximum allowable Preset. It is an integer number from 0 thru 4000000000.

ENABLE PRESET FUNCTION (72)—If Preset exists, enable it. Note that if it does not exist (via function 200), this function does nothing.

DISABLE PRESET FUNCTION (73)—If Preset exists, disable it.

PRESET USING GROSS (74)—This function will result in the Gross volume being used for presetting.

PRESET USING NET (75)—This function will result in the Net volume being used for presetting.

SET PRESET VOLUME (76)—Allows the user to set (integer number) the preset volume.

SAVE BATCH PRESET VOLUME (77)—This function will make the current preset volume the permanent or batch volume.

ADJUST PRESET LATENCY VOLUME (78)—This function will recompute the latency volume for the preset function. The latency volume is one-half the presetted volume minus the final volume.

GET CURRENT PRESET PARAMETERS (79)—This function allows the user to view the current preset parameters.

SET VALVE PARAMETERS (80)—Allows the user to set the valve parameters. The user must first choose the parameter by entering the parameter number 1 thru 7.

GET VALVE PARAMETERS (89)—This function allows the user to view the current valve settings. The user must first choose the parameter by entering the parameter number from 1 thru 7.

ENTER PROVER IDENTIFICATION (90P)—This function will request the user to enter a nine (9) digit number. (0 thru 999999999).

EXECUTE SINGLE POINT CALIBRATION (91P) This function is used to calibrate the meter by running actual product thru the meter, depressing the <PRINT> button when product has stopped, and using the keypad to enter the actual volume of the product pumped when the 0.0 display prompt is seen.

EXECUTE MULTI-POINT CALIBRATION (92P)—This function is used to calibrate the meter by running actual product thru the meter. The sequence is the same as single point calibration, but the user can repeat multiple times. The purpose is to run the product thru at different flow rates so the meter flow rate error can be modeled internally. Up to ten points can be used. Note that the ten points must be run at 10% multiples of the maximum flow rate.

SELECT CURRENT PRODUCT (93)—This function will allow the user to enter a "current" product number. Note that the product must have been setup previously by a proving run.

SET PULSER CALIBRATION (94P)—This allows the user to setup the number of pulses per a unit volume by actually running product. When the product has stopped, the user will be prompted by a 0.0 on the display. The actual volume is then entered using the keypad. The system will then compute the pulses per a unit volume.

SET PROVER PARAMETER (95P)—This allows the user to setup the meter parameters. The user must first choose the parameter by using the keypad to enter the parameter number 1 thru 7 at the display prompt 0. The user can use this function to set the following parameters:

1. ... Pulses per a Unit Volume. This lets user calibrate the meter without running actual product.

2. ... API60 Density

3. ... Maximum Flow Rate. This defines for the meter the maximum flow rate. The maximum flow rate is used in valve control during preset and during multi-point calibration.

4. ... Temperature Increment for Table.

5. ... Temperature Table Partition Value.

6. ... Temperature Offset. This allows the user to fine tune the temperature probe by added an offset to the temperature.

7. ... Allowed Percentage Change. This is used during proving during the interpolation of the meter flow rate error table.

8. ... Missing Pulse Limit. Used to setup the missing pulse limits. These limits are defined by SVM-1. When this limit is exceeded during a delivery, the valve will close. Note that this limit is the number of missing pulses per a unit volume and is dependent on meter size.

9. ... Maximum Pulser Reversals. The maximum number of reversals that are allowed before delivery is stopped by closing valve. Note that this limit is the number of missing pulses per a unit of volume and is dependent on meter size.

10. ... Linear Coefficient Value.

11. ... Metrics
   0=Gallons
   1=Liters
   anything else=Nothing

12. ... Product Identification

13. ... Temperature Start

14. . . . Temperature End

15. . . . VCF Table Id

QUERY VCF TABLE VALUE (97)—This function allows the user to query the current products API table to get a VCF. The user will be prompted by a 0.0 on the display to enter a temperature for which the VCF will be computed.

GENERATE VCF TABLE (98P)—This function is used during prover to generate an API table for the product. The user will be prompted by a 0 on the display for the index of the table desired. The table index is then entered by using the keypad. The current available tables are:

1—Linear Coefficient (Fahrenheit)

2—Linear Coefficient (Celsius)

3—Table 6B

4—Table 54B

5—Table 24B

6—Table 54A

7—Table 24A

8—Table 6A

GET PROVER PARAMETER (99)—This allows the user to view the meter parameters. The user must first choose the parameter by using the keypad to enter the parameter number 1 thru 8 at the display prompt 0. The user can use this function to view the following parameters:

1. . . . Pulses per a Unit Volume

2. . . . API60 Density

3. . . . Maximum Flow Rate

4. . . . Temperature Increment

5. . . . Temperature Table Partition

6. . . . Temperature Offset

7. . . . Allowed Percentage Change

8. . . . Missing Pulse Limit

9. . . . Maximum Pulser Reversals

10. . . . Linear Coefficient

11. . . . Metrics (Gallons, Liters, None)

12. . . . Product Identification

13. . . . Temperature Start

14. . . . Temperature End

15. . . . Table Identification

DISPLAY CURRENT COUNTER VERSION (100)—This will display the current version of the Counter. Note that at present, the counter, meter and printer are all at the same version.

DISPLAY CURRENT METER VERSION (101)—This will display the current version of the Meter.

SET DELIVERY NUMBER (110)—This allows the user to initialize the delivery number that will be printed out on the delivery ticket. This number will be automatically incremented after each delivery.

SET UNIT NUMBER (111)—This allows the user to setup the unit number that will be printed out on the delivery ticket.

PRESET EXISTS (200P)—This function establishes the existence of the PRESET option. i.e., the customer has paid for it.

PRESET NOT EXISTS (201P)—This function removes the PRESET option from the system.

TEMPERATURE EXISTS (202P)—This function establishes the existence of the Temperature option. i.e., the customer has paid for it.

TEMPERATURE DOES NOT EXIST (203P)—This function removes the TEMPERATURE option from the system.

PRINTER EXISTS (204)—This function establishes that a printer is in the system.

SET ENVIRONMENT MODE (209P)—This function set the environment for the Stop button command. The user must first choose the mode by using the keypad to enter a <0> for a fast stop and a <1> for a ramp-down stop at the display prompt 0. Note that normally a truck gets a <0> and a fixed facility gets a <1>.

SET TIME (210P)—This is used to set the Time for the Real-Time Clock. The format is HHMM where HH=Hours (00 thru 23) and MM=Minutes (00 thru 59).

SET WEEKDAY (214P)—This function is used to set the day of the week for the Real-Time Clock with 0=Sunday, 1=Monday, thru 6=Saturday.

SET DATE (215P)—This function is used to set the Date of the Real-Time Clock. The format is YYMMDD where MM=Month (01 thru 12), DD=Day (01 thru 31), and YY=Year (93, 94, etc.).

SET PRINT TICKET HEADER (220P)—This function allows the user to set a ticket header for the delivery ticket. The header characters must be inserted in decimal and the user must know the printer control sequences. This will allow the user to change Fonts, and use the multi-language capability of the Printer. Normally, this function is not used by customers, only EWA and LCC.

GET PRINT TICKET HEADER (221)—This function is used to display the current ticket header (in decimal).

PRINT HEADER (222)—This function will print the Header on the network Printer.

PRINT SYSTEM PARAMETERS (223)—This function will print out maintenance data and system data.

PRINT AUDIT TRAIL (230)—This function will print the Audit Trail on the System Printer.

TURN PRINT AUDIT TRAIL OFF (231)—This function will disable the printing of the Audit Trail. Note that the Audit trail will continue to be kept (i.e., the user is unable to keep it from happening).

The backbone of the present invention is the serial system bus 56. The basis for the overall system philosophy is the separation of the registration, control and associated system functions, first into discrete blocks, and then into physical and logical functions. The constant through the entire system is the communications network and the associated messages that flow through it. The messages represent information, such as gross and net volume data or requests, such as current temperature. An example of a logical request is a preset requesting a valve closure and leaving the actual sequence to the valve software. In this case, the preset is making a logical request while the valve accomplishes the physical actions.

System communications are conducted according to a collision avoidance-arbitration scheme. Each system module competes for control of the serial bus 56. When the bus 56 is available, a module with a pending outgoing message sends its to the target device. If a module tries to access the serial link 56 but the link is busy, the module waits a random period of time before trying again. The size of the random wait causes low priority modules to wait longer than high priority modules. To ensure that no module ties up the system for extended periods, the messages are kept small.

Each module continuously monitors the information that flows through the system over the common serial link. Each module intercepts those messages that are sent to it, perform whatever action is required, and send result/action messages back through the serial link. Each module identifies messages intended for it by the specific message header. The general format of messages to be sent through the serial link is as follows:

message header containing a unique identifier for each module in the system;

the digital data transmitted over the serial link; and a checksum to guarantee robustness of the communications system.

The message flows throughout the system represent the "work" of the system. The messages carry requests and responses between the various modules in the system. The flexibility of the system is in its dealing with logical messages rather than physical actions; for example, a preset requiring a valve to partially close and then shut it off completely. The message from the preset might say, for example, "partially close". Then, at the preset's discretion, it directs the valve to "close". The valve receives the message for both actions and carries them out, as requested. The preset does not have to know what the valve type is, since the valve processor performs the request. If a different valve is inserted into the system, no change to the system code is necessary. The valve intercepts the message and performs the request. A message could also be directed to multiple counters for display purposes. Examples of typical messages in the system are as follows:

| FROM | TO | MESSAGE |
| --- | --- | --- |
| Meter 1 | Counter 1 | Volume data, Corrected |
| Meter 1 | Counter 1 | Volume data, gross |
| Meter 1 | Counter 1 | Temperature |
| Meter 1 | Counter 1 | Direction of flow is "+" (normal) |
| Meter 1 | Counter 1 | Direction of flow is "−" (reverse) |
| Meter 1 | Supervisory Module | Temperature |
| Meter 1 | Supervisory Module | Maximum pressure |
| Meter 1 | Supervisory Module | Current pressure |
| Meter 1 | Supervisory Module | Current proving data |
| Meter 1 | Supervisory Module | Date of last proving |
| Meter 1 | Supervisory Module | T/V compensation Values |
| Meter 1 | Supervisory Module | Liquid level OK/not OK |
| Preset 1 | Supervisory Module | Throttle Control |
| Preset 1 | Valve 1 | Open |
| Preset 1 | Valve 1 | Partially close |
| Preset 1 | Valve 1 | Close |
| Supervisory Module | Meter 2 | Request for temperature data |
| Supervisory Module | Meter 2 | Request for pressure data |
| Supervisory Module | Printer 1 | Print billing data |
| Supervisory Module | Preset | Request current preset value, current total |
| Supervisory Module | All devices | Request current status |
| Supervisory Module | All devices | Request location code |
| Supervisory Module | All meters | Request current internal meter settings |
| Supervisory Module | Meter 1 | Enter proving mode |
| Supervisory Module | All valves | Emergency shutdown |
| Printer | Supervisory Module | Printer fault—no paper |

The messaging format is depicted in FIG. 24. Each message is sent in the form of a network packet consisting of a packet flag byte having a hexadecimal value of 1E, a one-byte message length field, the message itself, and a modulo 256 checksum.

The messages are sent in an industry-standard HDLC format consisting of a header and an information field. The header consists of three bytes: a destination byte, a network control field byte, and a source address byte. The information field is of variable length and consists of a message type field as the first byte and a variable-length data field in the remainder of the information field.

System identification is required whenever a new piece of equipment is added. This function provides the user with information and functionality to insert the equipment into the system. An example is a multi-meter system (described more fully below) where valves must be assigned to each meter. This mode also allows the user to enter information that is not used for meter proving. Examples of such information are product codes, unit ID numbers, meter and truck numbers, and throttle control volume.

Figure 7:
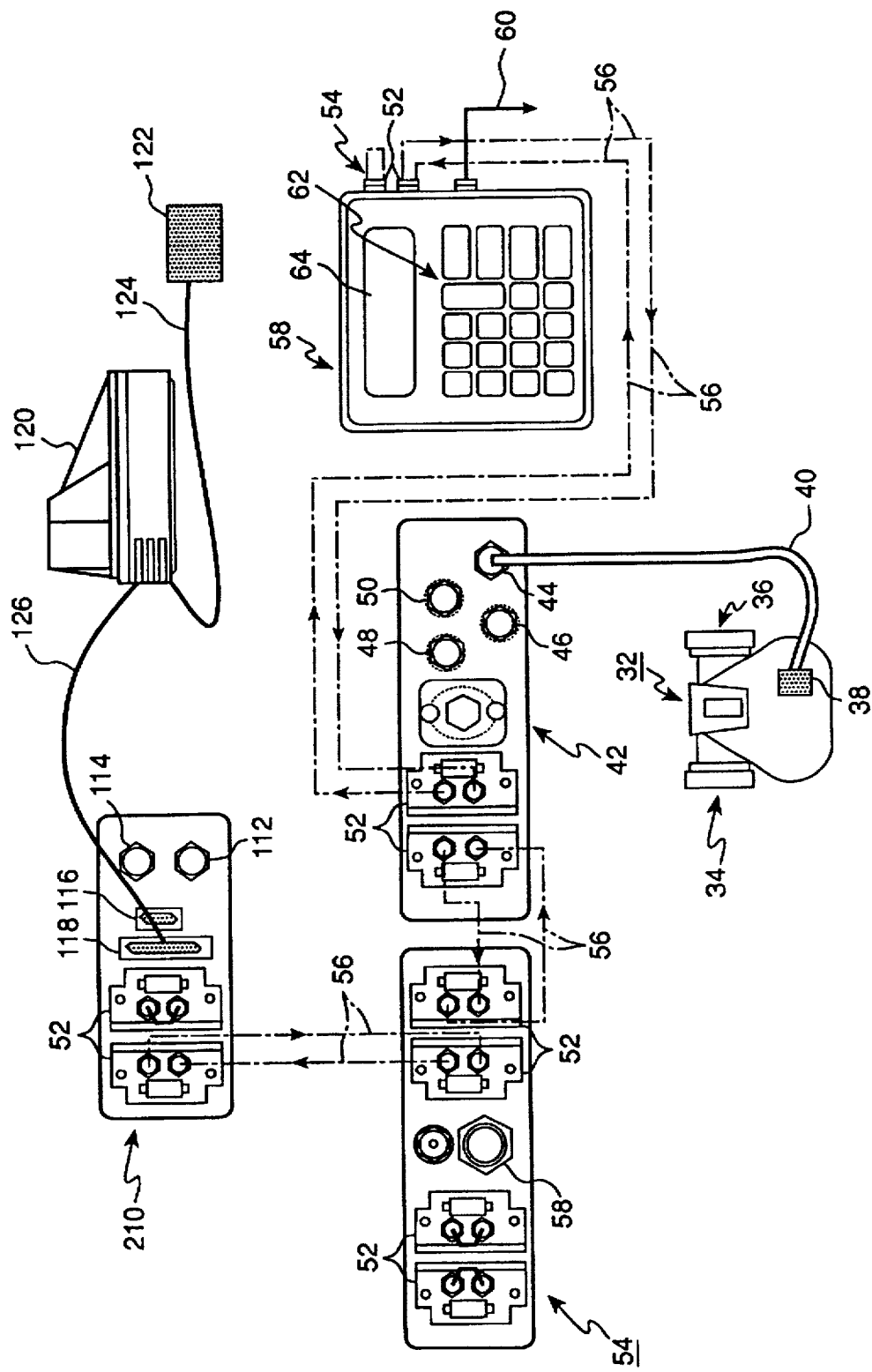
FIG. 7 is a system diagram of a second embodiment of the present invention which includes a Printer Interface Module and associated printer for hardcopy output of liquid registration information.
Figure 8:
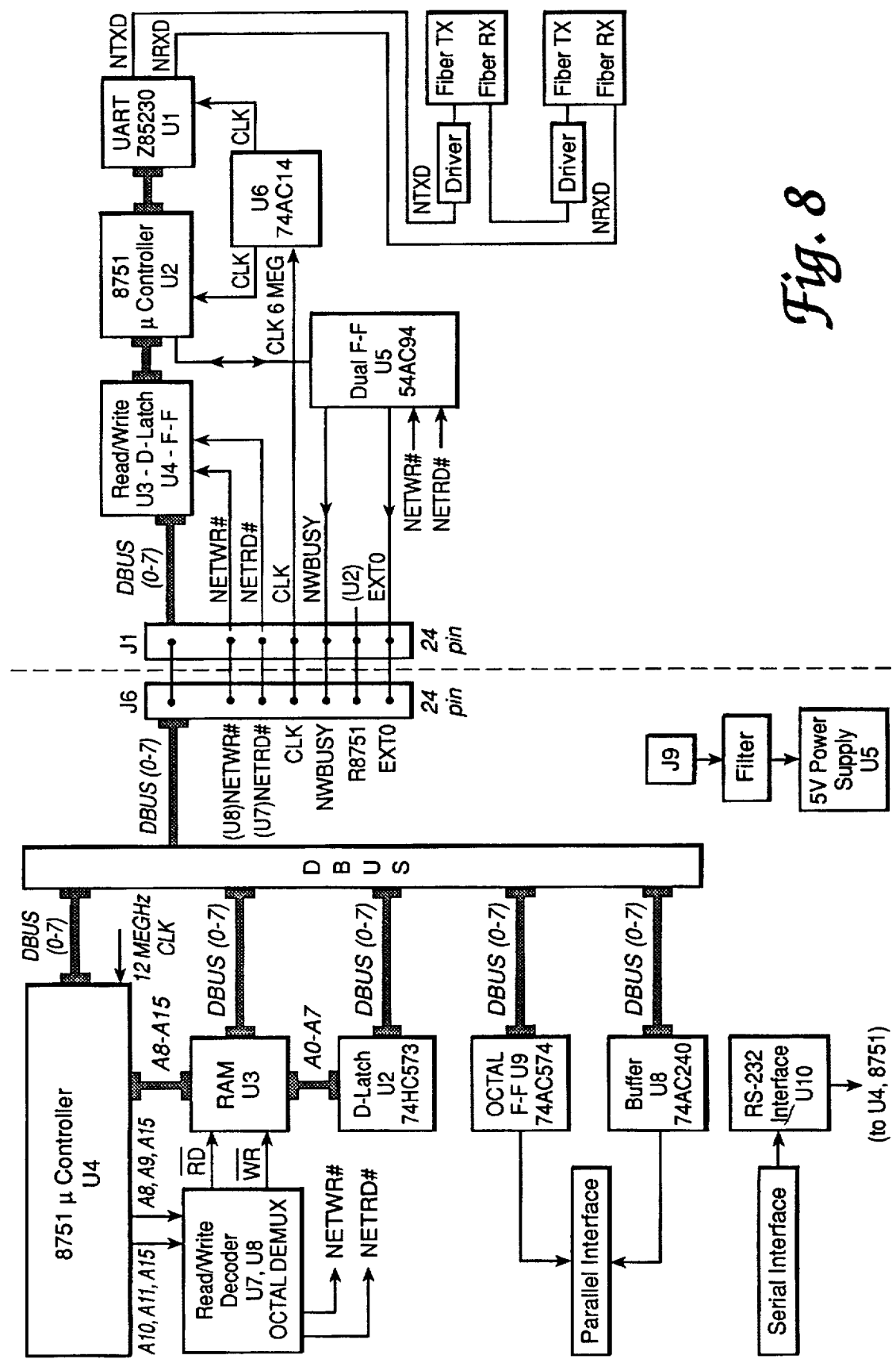
FIG. 8 is a component level diagram of a Printer Interface Module according to the present invention.

When further system functionality is required, the system may be upgraded by adding a Printer Interface Module 110 and associated printer 120 as shown in FIG. 7. The printer and module are most conveniently mounted in the truck cab and can be advantageously used to provide bills to customers, delivery schedules and amounts, and other useful information to the driver. A detailed diagram of Printer Interface Module 110 is provided in FIG. 8.

If further functionality is desired, the system can be upgraded by adding a preset function to one of the basic systems described above. By using the preset function, an operator can enter an amount of liquid to be delivered to a customer and the system will permit delivery of liquid until that amount is reached. While the necessary software routines may be resident in the meter dedicated processor 42 as described above, physical control of the liquid flow requires the addition of a Valve Control Module 128 to operate the solenoid valves which control liquid flow. Preferably, the system software allows the operator to select "preset amount", "amount remaining to deliver" or "amount delivered" to be shown on the display and to control the liquid delivery accordingly.

Figure 9:
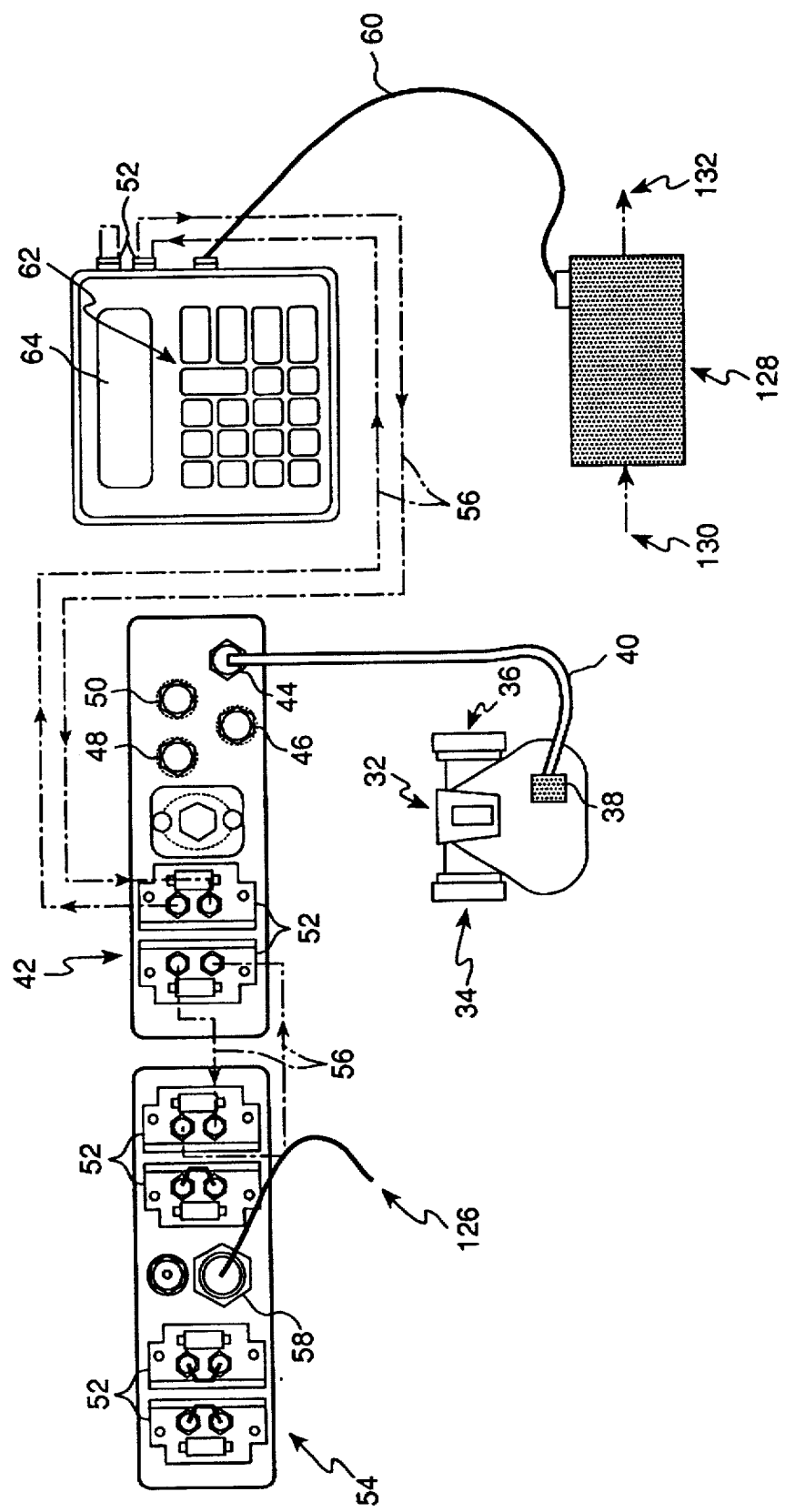
FIG. 9 is a system diagram of a third embodiment of the present invention which performs liquid registration and control functions.
Figure 10:
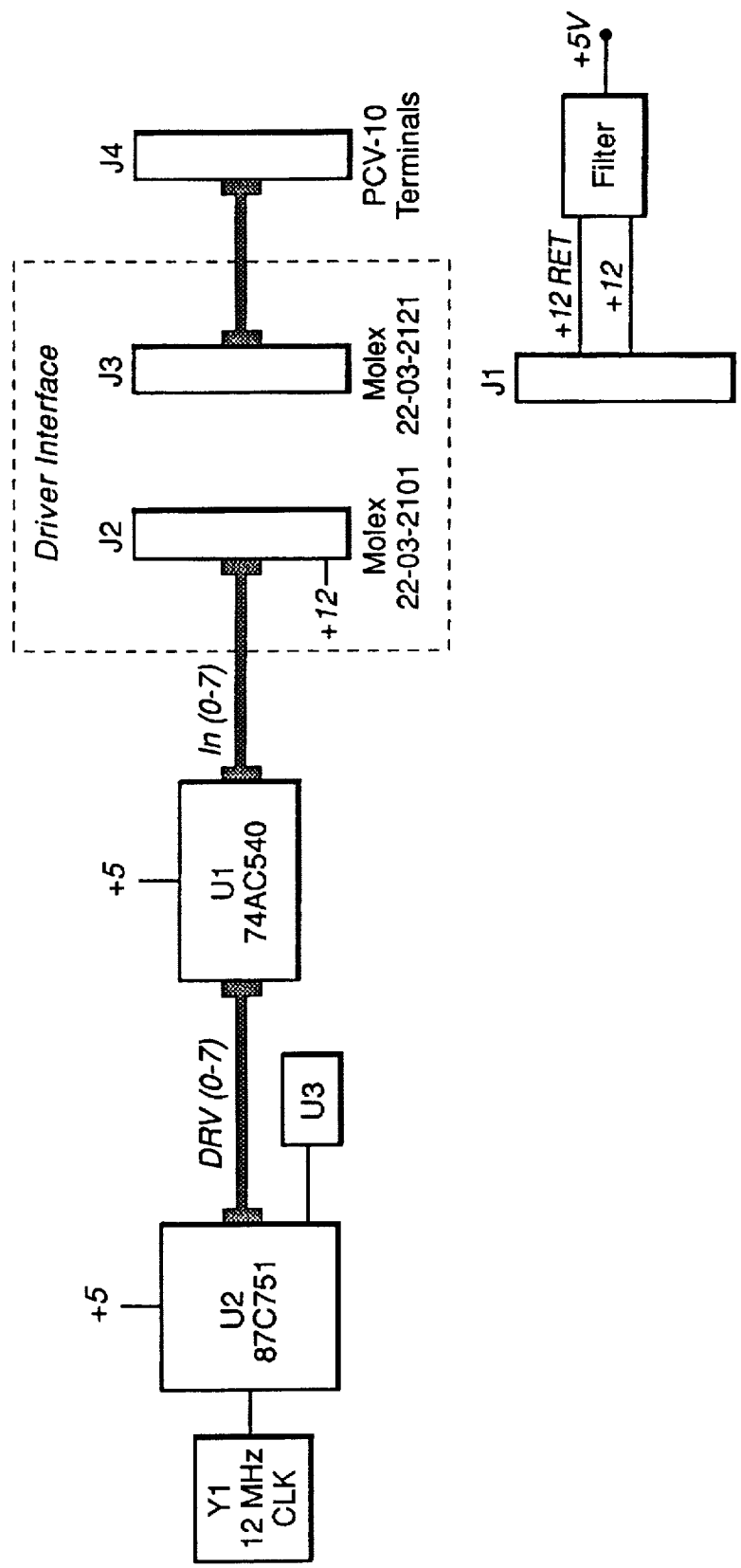
FIG. 10 is a component level diagram of a Valve Control Module according to the present invention.
Figure 11:
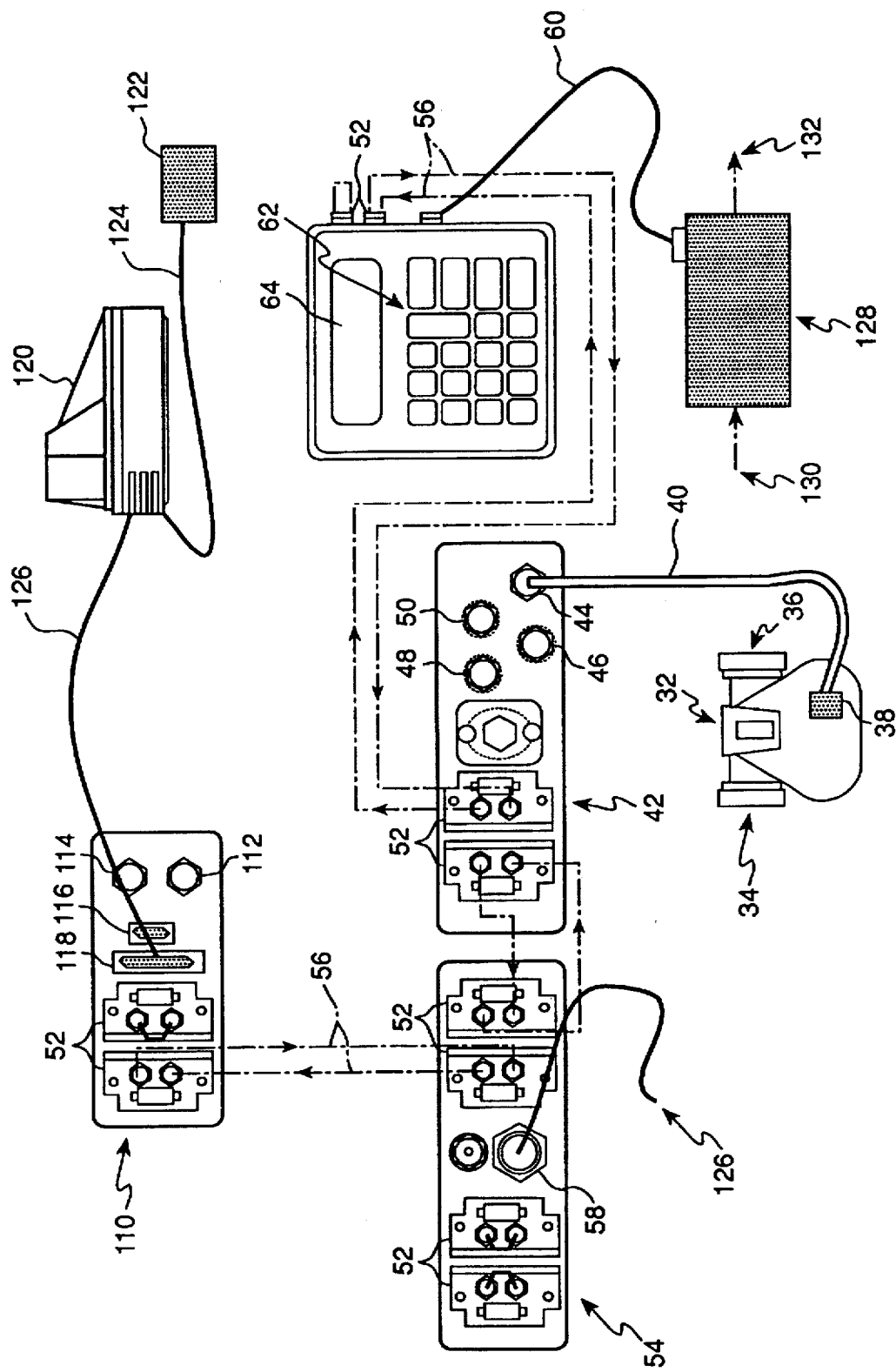
FIG. 11 is a system diagram of a fourth embodiment of the present invention which performs automated liquid registration and control functions and includes a Printer Interface Module and associated printer for hardcopy output of liquid registration information.

A basic system incorporating this preset capability is depicted in FIG. 9, and a similar system with printing capability is shown in FIG. 11. FIG. 10 is a detailed diagram of Valve Control Module 128.

As noted above, the Valve Control Module 128 can also be used to terminate liquid delivery when pressure in the line drops, thus indicating a low liquid condition in the truck's tank. This is accomplished by installing a tank outlet pressure switch in the tank to send a signal to the Valve Control Module 128 to shut down liquid flow to prevent air from entering the meter when the tank runs low on liquid.

Figure 12:
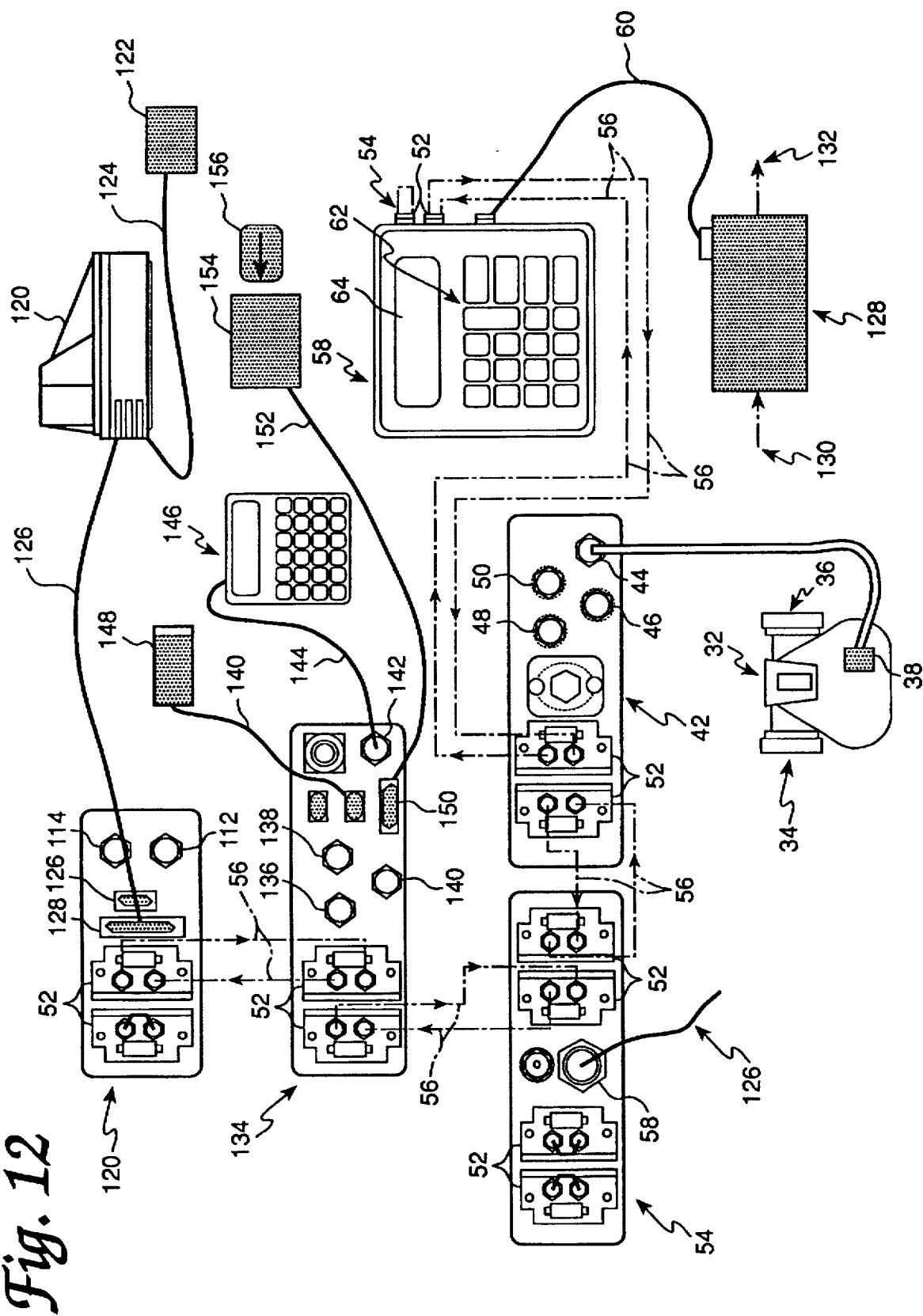
FIG. 12 is a system diagram of a fifth embodiment of the present invention which performs automated liquid registration and control functions and provides an array of auxiliary support functions.

FIG. 12 shows a system configuration implementing many of the capabilities contemplated by the present invention. This system includes DC Power Supply 54, Solid State Pulser 38, Meter Dedicated Processor 42, Local Control Console 58, and Printer Interface Module 110 as described above; however, it also includes Supervisory Control Module 134 to provide additional functionality.

The Main program of the Supervisory Console (SVC) can be viewed as the code necessary to manage a single pointer. To clarify, the SVC can display only one dynamic line at a time. Although the display hardware will allow 4 lines to be displayed, three (3) of the lines are static and show only global information such as mode (i.e Prover), product, and date. Thus the SVC code accepts input from the keyboard, switches (such as the prover switch) and the network to manage the "system pointer" and point to one of 33 menus. These menus are shown above and are the principal driving processes in the system.

For example, when the user enters a new mode number, the "system pointer" (SP) then points to that menu and displays the first line associated with that mode. As the operator moves thru his choices, internally he is changing the SP within the index bounds of that menu, i.e., Menu 0 has 22 items, so as the operator moves around in Menu 0, the index will change from 0 thru 21. Realize that the SP has two components, the menu number and the index within the menu. As the operator chooses a function to execute, the menu structure maintains the information necessary to execute the function.

Figure 13:
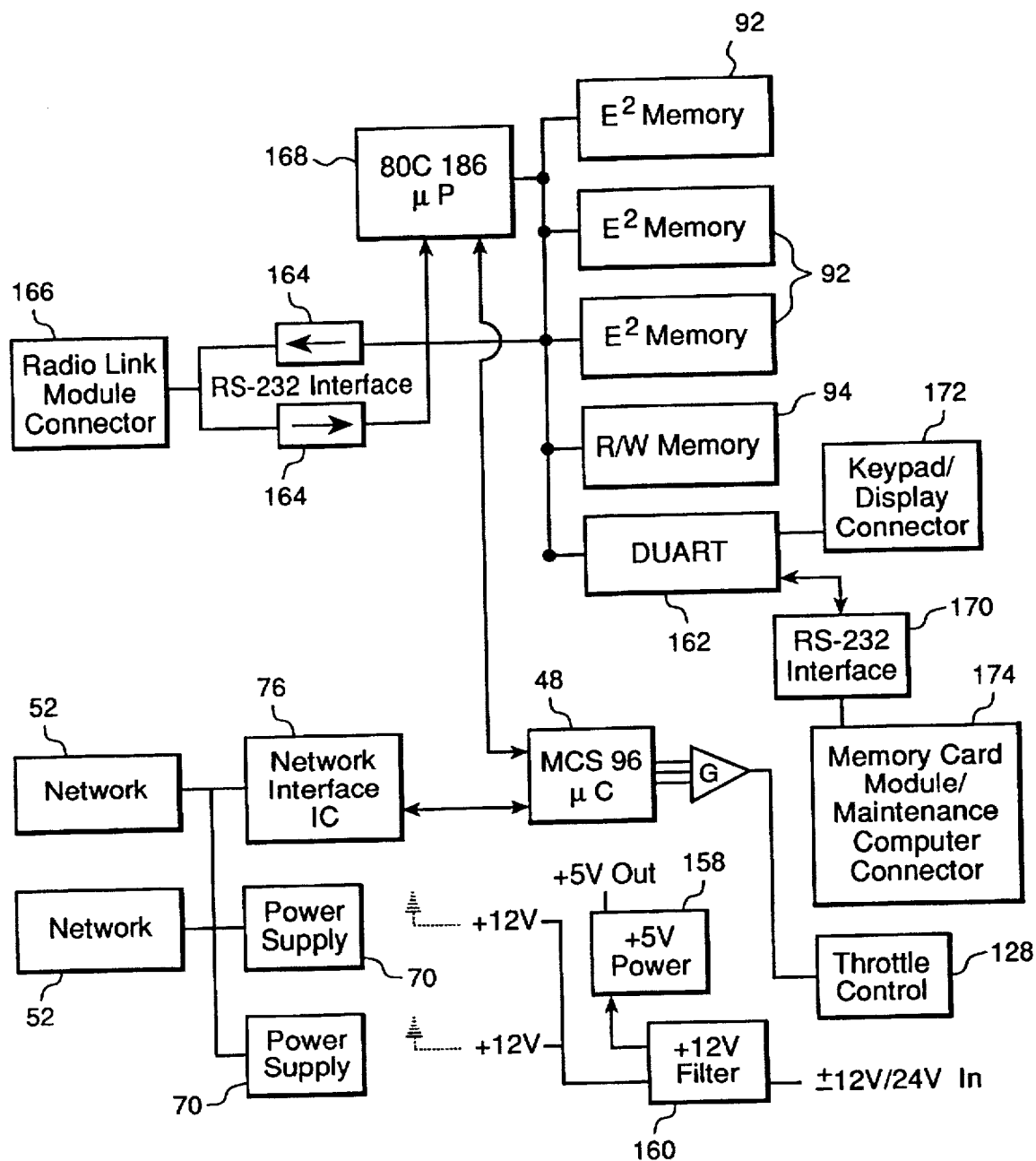
FIG. 13 is a block diagram of a Supervisory Control Module according to the present invention.
Figure 14:
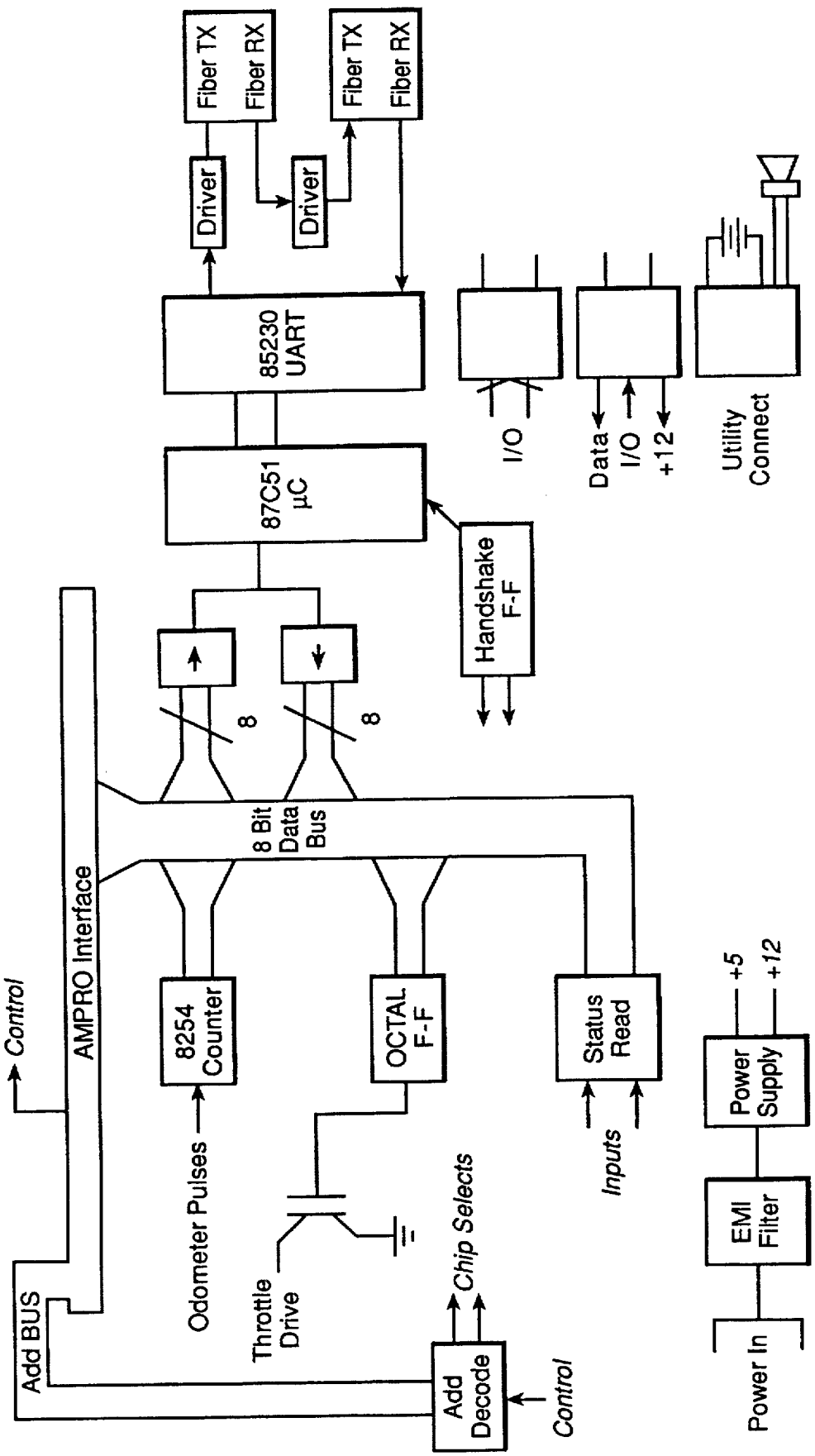
FIG. 14 is a component level diagram of a Supervisory Control Module according to the present invention.
Figure 15:
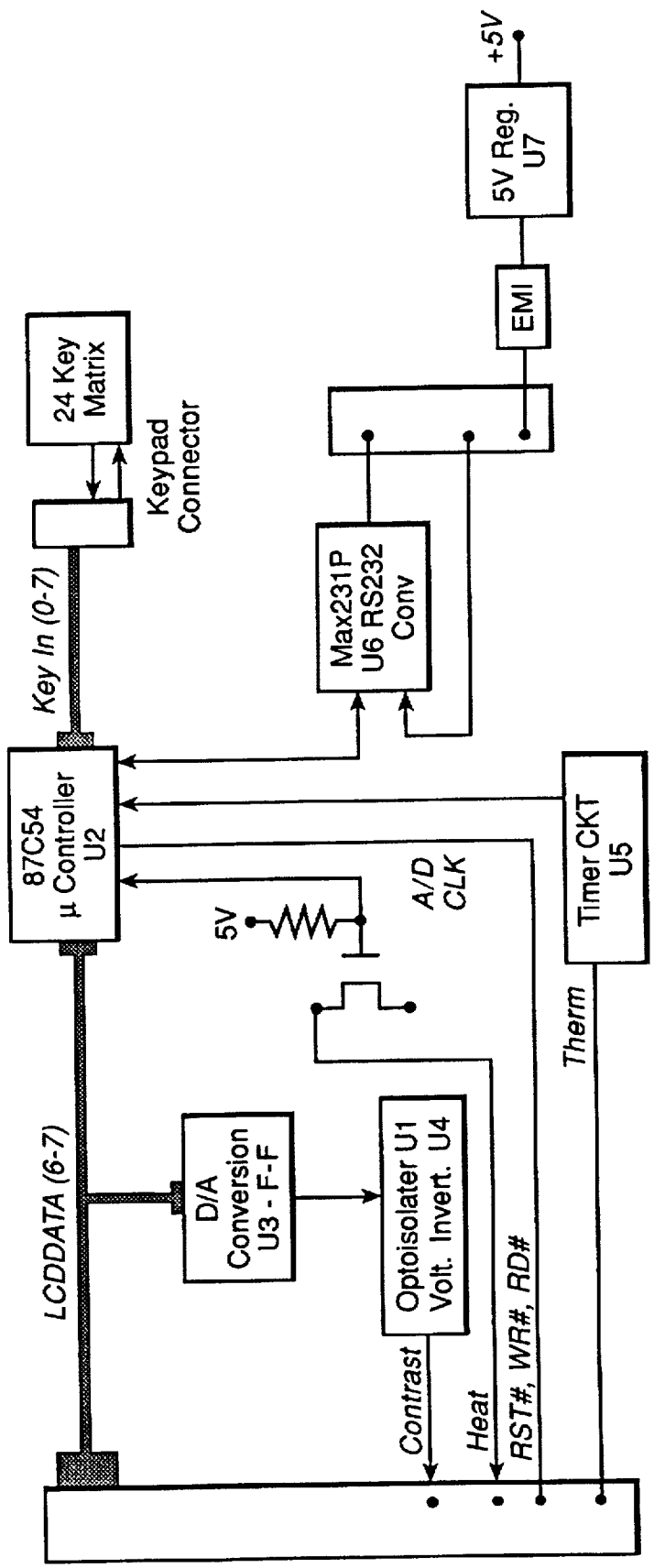
FIG. 15 is a component level diagram of a Lap Pad Module according to the present invention.
Figure 16:
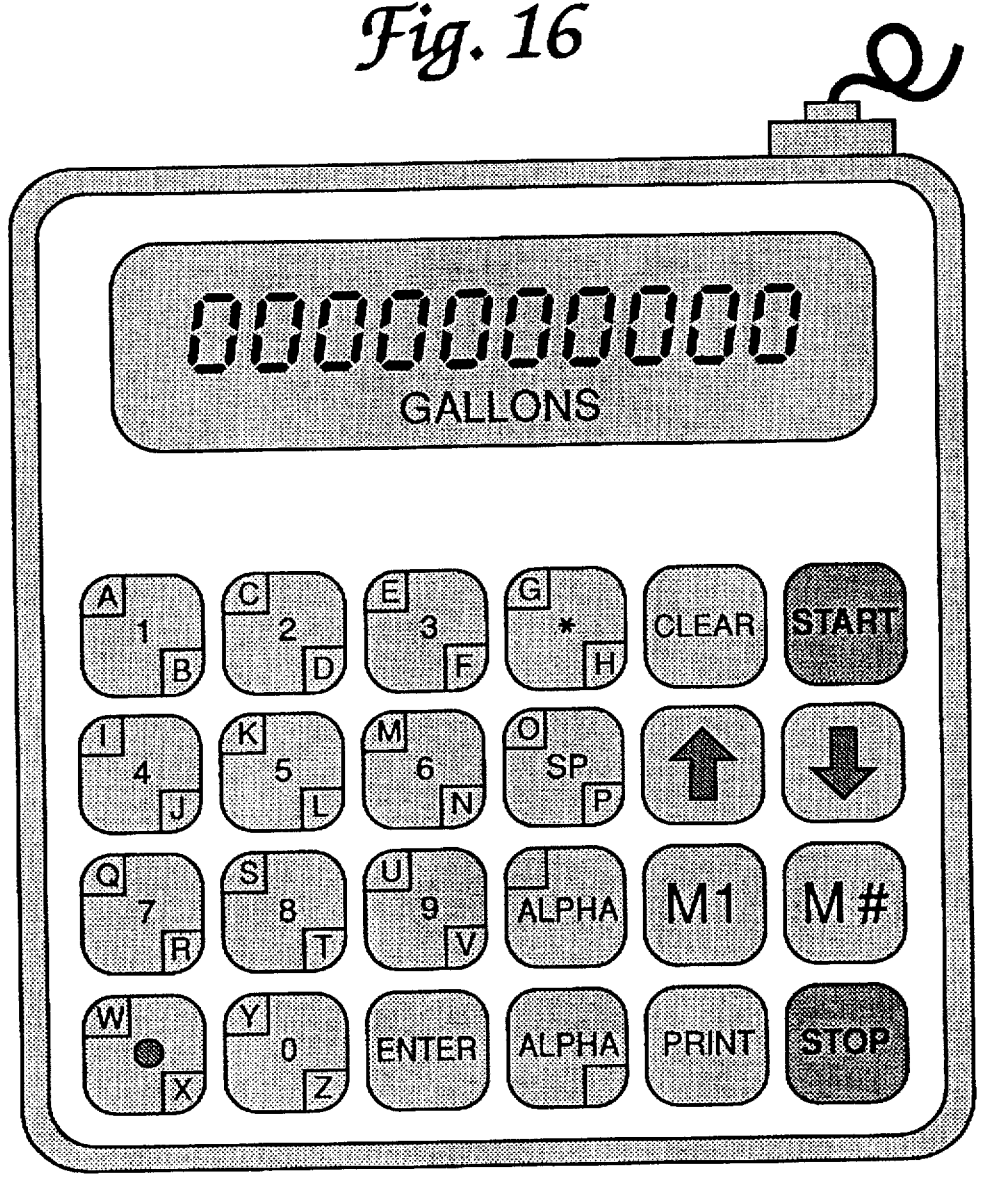
FIG. 16 is a block diagram of a keyboard for a Lap Pad Module according to the present invention.

As shown in FIGS. 13 and 14, the Supervisory Control Module 134 is an electronic unit specifically designed for installation and use in the delivery truck cab. The module 134 includes two components, a stationary base unit 136 and a movable lap pad 146 (particularly shown in FIG. 15) interconnected by a rugged electrical data cable 144. The base unit 136 may be mounted in a variety of truck cab locations. As shown in FIG. 16, the lap pad 146 has a hydrocarbon-resistant keyboard with oversized ¾ inch keys and a large, illuminated 40 character by four row liquid crystal display.

The lap pad 146 keyboard has different functions available depending on the mode the counter is in at that time. If the system is currently in the process of delivering fluid, then the keypad's only valid keys are START, STOP, SELECT, and PRINT. If the system is not currently in the process of delivering fluid then the keypad has full functionality. All keys are available at this time including F1 and F2 for entering and initiating a system command.

This module is independent of the main loop in the sense that the keystrokes are retrieved from an interrupt service routine. The keys are buffered and as the main loop makes its cycle an interpreter is called to interpret the key that was pressed. Commands entered at the keypad always follow the form of F1-TERMINATOR where F1 is the F1 key on the keypad and TERMINATOR can be either the F2 key by itself or one or more occurrences of DATA followed by the F2 key. The number of requests for DATA input will be dependent upon the requested function.

Figure 17:
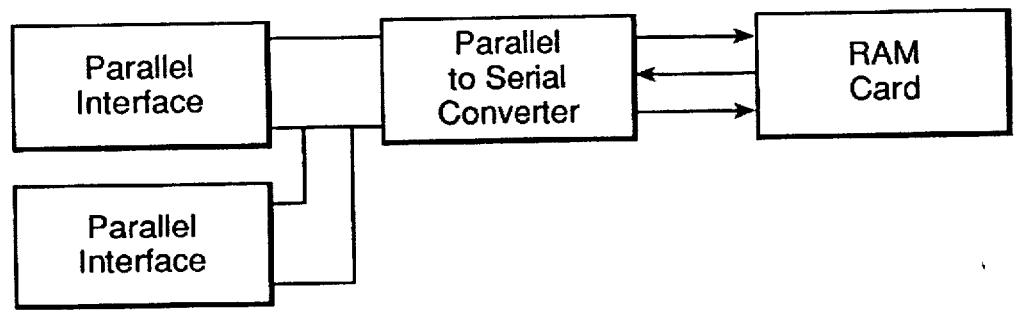
FIG. 17 is a block diagram of a RAM Interface according to the present invention.

Volume, temperature, pressure, and odometer data collected and scaled in Meter Dedicated Processor 42 is transmitted on the system serial bus, and the Supervisory Control Module 134 receives the data. In addition, the Supervisory Control Module 134 can send and receive data from an optional RAM card interface 154 (shown in FIG. 17) connected to an RS-232 port on the Supervisory Control Module 134 by a cable 152. RAM Interface 154 allows downloading or uploading of data from or to the office by way of a credit card-size memory card 156. The supervisory control module additionally has a Radio Interface Link 148 connected to a RS-232 port on the Supervisory Control Module 134 by a cable 140. The Radio Interface Link 148 allows transmission of data to and from the office over the two-way voice radio currently in the truck. Further, in lieu of entry at Local Control Console 58, operator commands may be entered using the keyboard of lap pad 146.

The Radio Interface Link uses the delivery truck's RF transceiver for 2400 baud data communications with a central base station. Communications on the truck end are controlled by a Data radio frequency modem equipped with a 64 kB data buffer, while communications at the base station are controlled by a Data Radio bidirectional link controller that can control multiple truck radio modems.

An output from Supervisory Control Module 134 providing suitable throttle control drivers to the truck's engine can be provided to control engine RPM and thereby control pump pressure.

Preferably, the Supervisory Console hardware comprises three components: the Ampro stack (available from Ampro Computers, Inc., 990 Almanor Avenue, Sunnyvale, Calif. 94086), the Network Board and the EWA Mother Board (available from Electronic Warfare Associates, 13873 Park Center Road, Herndon, Va. 22071). The Ampro Stack includes a CM286 main CPU board having an AMD286 16 MHz processor, 2 mB of system RAM and a CMOS setup memory, a battery-backed real-time clock, a 128 kB RAM drive, and a 4800 baud serial port for communicating with the lap pad; a MMSSP board including two serial ports for communicating with the Radio Interface Link 148 and the ticket printer; a parallel port for communicating with the RAM Card Module; and an MMSSD board including a 512 kB RAM drive and a 256 kB RAM drive. The Network Board includes an Intel 8096 CPU which handles network operations and an SDLC unit to interface with the network. The EWA Motherboard includes the system power supply, two lithium batteries, and circuitry interfacing the Ampro Stack with the network the odometer and the throttle.

The RAM drive on the CM286 board generally contains all operating software such as DR DOS 5.0 operating system files, configuration files and autoexecutable files. The RAM drive on the MMSSD board generally contains the lap pad executable program files such as the following:
FLASHWRI.EXE—programs the RAM drives;
NVRAMFMT.EXE—programs the system RAM
CHKSRAM.EXE—checks validity of system RAM;
CHKDSK.EXE—checks validity of disks; and
LAPPAD.EXE—system program file.
Finally, the RAM drive on the MMSSD board contains real-time program data.

Several software routines are used by the Supervisory Control Module 134 during its operation. One of these is the Serial Interface Routine which controls the serial line that is connected to the Supervisory Control Module 134, decodes intercepted messages and pass them along to the serial command process described more fully below. This function will be activated whenever a serial port interrupt occurs, thus indicating communications activity on the system serial bus. Serial bus communications will be described more fully below.

The Supervisory Control Module 134 also includes a Send Message Routine which is used when the Supervisory Control Module 134 wants to send a message over the system serial bus 56 to another processor. It will compute all the necessary error correction checksums and other necessary protocol-related functions.

Related to the Send Message Routine is the Receive Message Routine, which monitors the system serial bus 56 for incoming messages addressed to the supervisory control module 134 and turns the intercepted messages over to the system command processor routine (described below) for action.

Finally, the System Command Processor Routine analyzes the system serial line messages for requests and information and initiates other meter routines as necessary.

The Supervisory Control Module 134 has four basic modes of operation. The first mode is the Calibration Mode. This mode supports the calculations necessary to develop initial proving factors for the meter. Another mode supported by the Supervisory Control Module 134 is a Proving Mode, which is used to perform accuracy checks for Weights and Measures requirements. The Proving Mode is used to ensure the accuracy of Supervisory Control Module 134 as described above.

Two other modes used in the Supervisory Control Module 134 are the Operational Mode and the Testing Mode. The Operational Mode is the normal run mode for the processor after it has been calibrated and proven. The Testing Mode allows service technicians to view system parameters and perform internal diagnostics without changing the preset system values.

In addition to the above-described routines, the testing mode also makes use of a Run Diagnostics Routine when requested by the operator. Examples of diagnostic functions that may be performed by the run diagnostics routine are memory checking, viewing system parameters, and causing meter functions to activate.

The Supervisory Control Module 134 also has a Pass Through Routine which will pass any message that is received, through itself, into the system serial link. This function permits more flexible diagnostics and error checking.

Supervisory Control Module 134 further includes a number of operator interface routines as described below. The first of these routines is the Logon/Logoff Routine which manages the logon/logoff process of the Supervisory Control Module 134. At logon time, Supervisory Control Module 134 looks up a user's authority code as described below and uses it throughout the system to prevent unauthorized access to selected functions.

All functions in the system have authority codes associated with them. The user is given up to five levels of authority by a supervisor. The five levels from highest to lowest are Factory, Weights and Measures, Supervisor, Technician, and Operator. Factory access is used to set up the meter for initial shipment. It includes code insertion and calibration functions. Weights and Measures authority is used to prove the meter. Supervisor access is used by the customer's supervisors to set up tax and billing information, enabling functions, and other management decisions. Technician access is used by the customer's technicians to run diagnostics and other functions. Operator access is used by the operator to make deliveries during a normal business day.

The Price and Tax Routine performs modifications of the values of the variables relating to unit prices and taxes.

The Add/Delete Tax Category Routine permits the adding and deletion of tax categories. This allows the system to expand as system demands increase.

The Setup Unit Price/Taxes Ranges Routine permits the setting of the ranges of the variables relating to unit prices and taxes. This allows a system manager to prevent a vehicle driver from entering unreasonable values while making an unscheduled delivery.

The Discounts Routine performs the modifications of the values of the variables relating to various discount categories.

The Add/Delete Discount Category Routine permits the addition and deletion of discount categories. This allows the system to expand as system demands increase.

The Setup Discounts Ranges Routine permits setting the ranges of the variables relating to discount categories. This allows a system manager to prevent a vehicle driver from entering unreasonable values while making an unscheduled delivery.

The Miscellaneous Charges Routine performs the modifications of the values of variables relating to various miscellaneous charges.

The Add/Delete Charges Routine permits the adding and deletion of miscellaneous charges. This allows the system to expand as system demands increase.

The Setup Miscellaneous Charge Ranges Routine permits the setting of the ranges for the variables relating to the miscellaneous charges. This allows a system manager to prevent a driver from entering unreasonable values while making an unscheduled delivery.

The Printer Routine allows a user to print out any files that may be pending in the print queue. Most reports will not require a manual initiation of print. Thus, the Printer Routine is required only if the printer is not available at the time of report generation, but is available at a later time.

The Report Generation Routine allows a user to generate any of the reports that are currently defined.

The Printer Report Setup Routine allows a user to setup various system-defined reports. Two examples of such reports are error reports and audit trails.

The Totalizer Routine allows a user to examine the current values of the cumulative delivery registers.

The Select Totalizer Report Routine allows a user to select the report format desired for the totalizer's report. The Generate Totalizer Report Routine does the actual generation of the totalizer report.

The Reset Totalizers Routine zeros out all of the system totalizers. This function would only be called at the beginning of a shift or after the full shift ticket had been printed at the end of the shift.

The Enables Routine allows a user to set functions such as net preset, gross preset, price preset, percent full, account setup mode, and miscellaneous transactions for the delivery ticket.

The Real-Time Clock Routine performs the setting of the real-time clock in the system.

The System Printer Routine sets the default system printer if there is more than one printer in the system.

The Odometer Routine manages the odometer variables.

Figure 18:
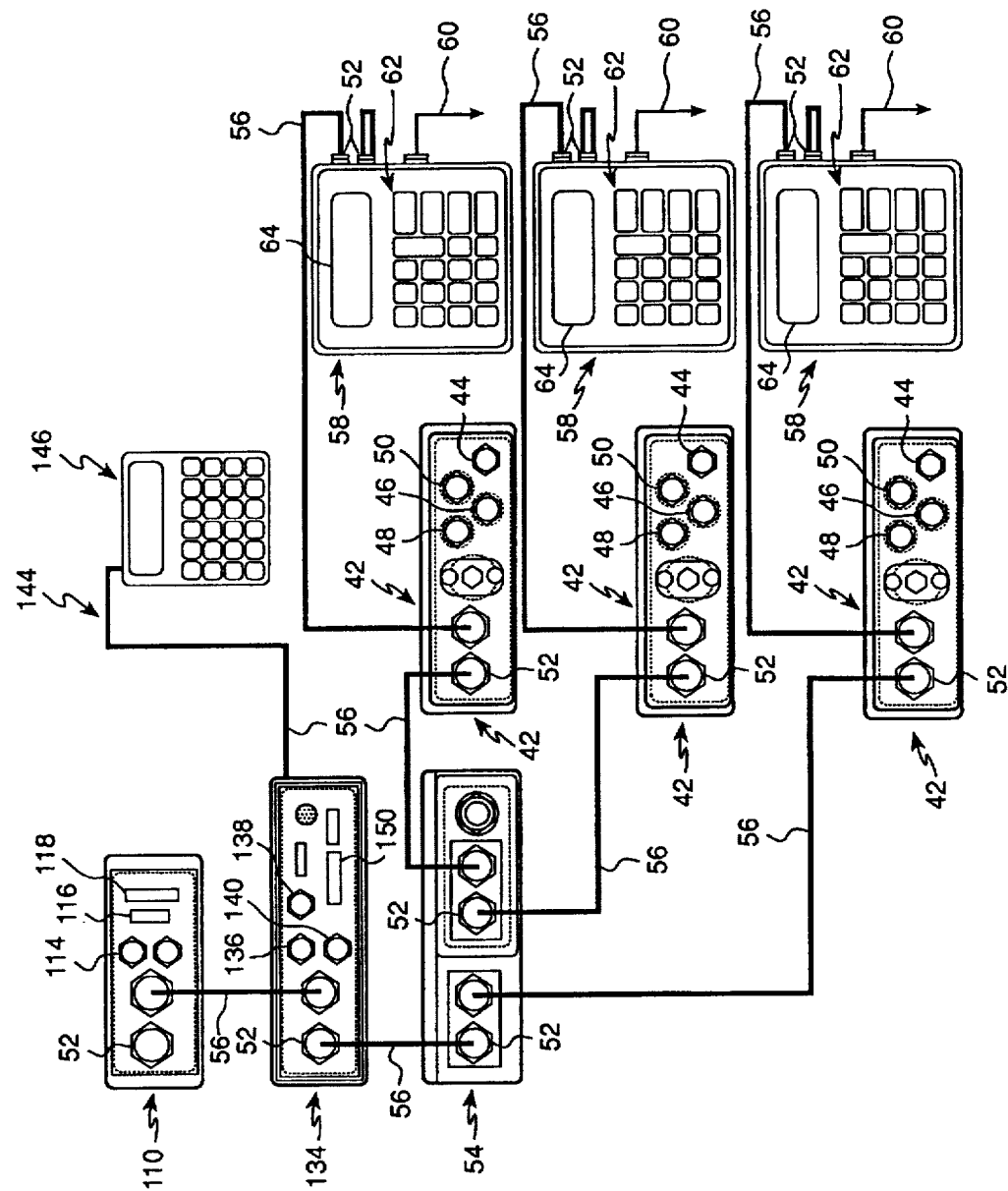
FIG. 18 is a system diagram of a sixth embodiment of the present invention which is capable of liquid registration and control at a plurality of meter sites.

FIG. 18 shows an expanded version of the above system which can simultaneously manage information for three meter systems.

A few design principles are common to all embodiments of this invention. For example, all system components are designed to operate well in high humidity conditions such as those encountered in tropical areas, as well as low humidity conditions such as those found in desert areas. Further, all system components are capable of operation without degradation or damage in heavy wind-driven rains or snow and with heavy accumulations of snow and/or ice. The system electronics are resistant to damage from static discharges due to nearby lightning strikes, and they are highly resistant to hot humid salt air such as that found in coastal areas in tropical climates. Further, the modules are able to withstand a constant atmosphere of petroleum fumes and are able to withstand the shock and vibration encountered during normal use while mounted on a liquid delivery truck driving over rough unimproved dirt, gravel, or paved roads.

For ease of configuration, cable connectors are designed so that it is impossible to connect a cable to the wrong connector. All connectors that are external to the housing are supported where necessary to prevent breakage due to vibration.

The system is designed and constructed to prevent electromagnetic radiation from any part of the system of such a level that would cause interference to any other device or system on the truck. Examples of such systems are two-way radio communications systems, electronic ignition systems, electronic dashboards, electronic anti-lock braking systems.

Electromagnetic emission levels from the system are reduced to levels that will permit the system to pass worldwide standards for emissions for this application.

The system is designed and constructed to prevent abnormal operation in any manner due to external electromagnetic interference that might be encountered in a liquid delivery truck environment. Normal sources of electromagnetic interference would be on-board two-way radio communications transmitters, engine ignition systems, anti-lock braking systems, truck accessories, or nearby broadcast stations.

Although a few preferred embodiments of the invention have been shown and described, it will be appreciated by those skilled in the art that changes may be made in these embodiments without departing from the principles and the spirit of the invention, the scope of which is defined in the appended claims.

APPENDIX A

```
{
struct MenuItems
        char active;    /* locative,0==protected */
        char text[41];
        int index;      /* index to value: pos.=by product; neg.=common value */
        char places;    /* -1=NO Number,1ST ROW; -2=NO Number,3rd ROW;     else decimal
                           -4 last prove: date and time...
                           -5 move back to col 10 and start product code number...
                           -6 date and time...
                           -7 text line input...
                           -8 text line output...
                           -9 misc. trans. menu second line...
                           -10 temp. table number...index into string arrays...
                           places categories:... 1=1; 12=volume; 13=price; 14=price+2 */
        char change;    /* 0=read; 1=changeable no.; 2-10=changeable no,network packet no.*/
        char range;     /* 0=no negative numbers; -1=negative numbers allowed;
                           1=0,1; 3=1,2,3; 4=0,1,2,3; 6=0,1,2,3,4,5,6; 12=1-12; 31=1-31; 9=0-9
                           59=00-59; 23=00-23; 8=0-8; 99=0-99; 100=1-100; 101=1-1000;
                           or... -# in prover (-10place) equals menu #...code label */
        char metric;    /* 0=none; 1-3 overwrite with metric label at index
                           or... -1 through -9 == 9 tax categories labels
                           or... -# in prover (-10place) equals action #...code label */
        char degree;    /* 0=none; 1-31=overwrite with degree label at index
                           or... negative number== tax categories labels index
                           or...flag for %ERROR--flow rate...default=0,entered=1,
                                                                    interpolated=2
                           or... -# in prover (-10place) equals action #...density label */
        char odometer;  /* 0=none; 1-31 overwrite w/odometer label   at index
                           or... negative number== tax categories labels end-index
                           or... -# in prover (-10place) equals action #...density label */
}

Menu[] =                                                /* I P C R M
0 0 */
{
/*0.0  */{0,"ENTER MODE NUMBER>                          ", -98, 0,1, 0, 0, 0, 0 },
/*0.1  */{1,"M1 - DELIVERY MODE                          ", 0,-1,0, 0, 0, 0, 0 },
/*0.2  */{1,"M2 - DELIVERY ACCOUNT SET-UP                ", 0,-1,0, 0, 0, 0, 0 },
/*0.3   */{1,"M3 - TOTALIZERS                            ", 0,-1,0, 0, 0, 0, 0
},
/*0.4   */{1,"M4 - VALVE RELATED OPTIONS                 ", 0,-1,0, 0, 0, 0, 0 },
/*0.5   */{1,"M5 - ENABLES                               ", 0,-1,0, 0, 0, 0, 0
},
/*0.6  */{1,"M6 - REAL-TIME CLOCK                        ", 0,-1,0, 0, 0, 0, 0 },
/*0.7  */{1,"M7 - DIAGNOSTICS                            ", 0,-1,0, 0, 0, 0, 0
},
/*0.8  */{1,"M8 - IDENTIFICATION                         ", 0,-1,0, 0, 0, 0, 0 },
/*0.9  */{1,"M9 - ODOMETER                               ", 0,-1,0, 0, 0, 0, 0
},
/*0.10 */{1,"M10 - PRINT END OF SHIFT TICKET             ", 0,-1,0, 0, 0, 0, 0 },
/*0.11 */{1,"M11 - AUDIT TRAIL                           ", 0,-1,0, 0, 0, 0, 0 },
/*0.12 */{1,"M12 - BASE PRICE AND TAX                    ", 0,-1,0, 0, 0, 0, 0 },
/*0.13 */{1,"M13 - TOTALIZERS PRINT LIST                 ", 0,-1,0, 0, 0, 0, 0 },
/*0.14 */{1,"M14 - DISCOUNTS                             ", 0,-1,0, 0, 0, 0, 0
},
/*0.15 */{0,"                                            ", 0, 0,0, 0, 0, 0, 0
},
/*0.16 */{1,"M16 - SUM TOTALIZER                         ", 0,-1,0, 0, 0, 0, 0 },
/*0.17 */{1,"M17 - PRODUCT SETUP                         ", 0,-1,0, 0, 0, 0, 0 },
/*0.18 */{1,"M18 - SYSTEM SETUP                          ", 0,-1,0, 0, 0, 0, 0 },
/*0.19 */{1,"M19 - TEMP.VCF CALCULATOR                   ", 0,-1,0, 0, 0, 0, 0 },
/*0.20 */{1,"M20 - DATA RADIO LINK                       ", 0,-1,0, 0, 0, 0, 0
}, /*1.0  */{1,"NET VOLUME GALLONS                          ", 1,12,0, 0,14, 0, 0 },
/*1.1  */{1,"ACCESS # - SCHEDULED>                       ",-216, 0,1, 0, 0, 0,
0 },
/*1.2  */{0,"ACCOUNT NAME                                ",0,-1,0, 0, 0, 0, 0 },
```

- 50 -

```
/*1.3 */{0,"ACCOUNT STREET ADDRESS              ",  0,-1,0, 0, 0, 0, 0
},
/*1.4 */{0,"ACCOUNT CITY AND STATE AND ZIP     ", 0,-1,0, 0, 0, 0, 0 },
/*1.5 */{0,"DRIVER INSTRUCTIONS -- LINE 1      ", 0,-1,0, 0, 0, 0, 0
},
/*1.6 */{0,"DRIVER INSTRUCTIONS -- LINE 2      ", 0,-1,0, 0, 0, 0, 0
},
/*1.7 */{1,"ACCESS # - UNSCHEDULED>            ",-217, 0,1, 0, 0, 0,
0 },
/*1.8 */{1,"PRESET NET>                        ", 3,12,1, 0, 0, 0, 0
},
/*1.9 */{1,"PRESET GROSS>                      ", 4,12,1, 0, 0, 0, 0
},
/*1.10 */{1,"PRESET PRICE>            $         ", 5,13,1, 0, 0, 0, 0 },
/*1.11 */{1,"PRODUCT CODE>                      ", -99, 0,1, 0, 0, 0,
0 },
/*1.12 */{1,"TEMP. THIS DELIVERY  °c            ",-195, 2,0, 0, 0.23, 0 },
/*1.13 */{1,"INVENTORY>                         ", 11,12,1, 0, 0, 0,
0 },
/*1.14 */{1,"DRIVER NUMBER>                     ", -36, 0,1, 0, 0, 0, 0 },
/*1.15 */{1,"MISC. TRANSACTION ACCESS #>        ",-149, 0,1, 0, 0, 0, 0 },
/* 1.16 */{0,"MAX. PRICE W/TAX OVERFLOW         ", 0,-1,0, 0, 0, 0, 0 },
/*1.17 */{0,"PRODUCT DATA IS NOW INITIALIZED    ", 0,-1,0, 0, 0, 0, 0 },
/* 1.18 */{0,"NO ACCESS NUMBER -- DELIVERY ABORTED", 0,-1,0, 0, 0, 0, 0 },
/* 1.19 */{0,"MAX. PRESET VOLUME EXCEEDED       ", 0,-1,0, 0, 0, 0, 0 },
/*1.20 */{0,"ILLEGAL PRODUCT CODE               ", 0,-1,0, 0, 0, 0, 0
},

/*M2 or CCOUNT SET-UP--UNDER M1..UNDER ACCESS NUMBER...same as M2 **/
/*2.0 */{1,"** M2 - DELIVERY ACCOUNT SET-UP **  ", 0,-1,0, 0, 0, 0, 0 },
/*2.1 */{1,"PRODUCT CODE>                      ", -99, 0,1, 0, 0, 0,
0 },
/*2.2 */{1,"ENABLE CYLINDER FILL>              ", -95, 0,1, 1, 0, 0, 0 },
/*2.3 */{1,"PRICE PER GALLON>         $         ", 15,14,1, 0,11, 0,
0 },
/*2.4 */{1,"PRICE PER CYLINDER>       $         ", 27,14,1, 0, 0, 0, 0 },
/*2.5 */{1,"% TAX - CATEGORY 1        >%        ", 16,14,1, 0,-1,-1,-28},
/*2.6 */{1,"TAX PER UNIT-CATEGORY 1   >$        ", 17,14,1,0,-2,-1,-28},
/*2.7 */{1,"% TAX - CATEGORY 2        >%        ", 18,14,1, 0,-3,-1,-28},
/*2.8 */{1,"TAX PER UNIT - CATEGORY 2 >$        ", 19,14,1, 0,-4,-1,-28},
/*2.9 */{1,"% TAX - SUBTTL+TAX CAT 1&2 >%       ", 20,14,1, 0,-5,-1,-28},
/*2.10*/{1,"% TAX-CATEGORY 3          >%        ", 21,14,1,
0,-6,-1,-28},
/*2.11*/{1,"TAXPERUNIT-CATEGORY3      >$        ",
22,14,1,0,-7,-1,-28},
/*2.12*/{1,"% TAX - CATEGORY 4        >%        ", 23,14,1, 0,-8,-1,-28},
/*2.13*/{1,"TAXPERUNIT-CATEGORY4      >$        ",
24,14,1,0,-9,-1,-28},
/*2.14*/{1,"ENABLE VOLUME DISCOUNT>            ", 25, 0,1, 1, 0, 0,
0 },
/*2.15*/{1,"SELECT CASHDISCOUNT CAT.>          ", 26, 0,1, 4, 0, 0, 0 },
/*2.16*/{1,"MISC. CHARGE - NON-TAXABLE> $       ",-153,14,1, 0, 0, 0, 0 },
/*2.17*/{1,"PRESET NET>                        ", 3,12,1, 0, 0, 0, 0
},
/*2.18*/{1,"PRESET GROSS>                      ", 4,12,1, 0, 0, 0, 0
},
/*2.19*/{1,"PRESET PRICE>            $         ", 5,13,1, 0, 0, 0, 0
},
/*2.20*/{1,"END USE CODE>                      ", 28, 0,1, 0, 0, 0,
0 }, /*3.0 */{1," M3 - TOTALIZERS                ", 0,-1,0, 0, 0, 0, 0 },
/*3.1 */{1,"PRODUCT CODE>                      ", -99, 0,1, 0, 0, 0,
0 },
/*3.2 */{1,"TICKET NUMBER>                     ", -19, 0,1, 0, 0, 0,
0 },
/*3.3 */{1,"SALE NUMBER>                       ", -20, 0,1, 0, 0, 0, 0 },
/*3.4 */{1,"MISC. TRANSACTION NUMBER>          ", -21, 0,1, 0, 0, 0, 0 },
/*3.5 */{1,"TOTAL NET VOLUME>                  ", 32,12,1, 0, 0, 0,
0 },
/*3.6 */{1,"TOTAL GROSS VOLUME>                ", 33,12,1, 0, 0, 0, 0 },
```

- 51 -

```
/*3.7 */{1,"TOTAL SALES, NO TAX>         $         ", 34,13,1, 0, 0, 0, 0 },
/*3.8 */{1,"CUM                          >%            ", 35,13,1,
0,-1,-5,-28},
/*3.9 */{1,"CUM                          >$         ", 36,13,1,
0,-2,-5,-28},
/*3.10*/{1,"CUM                          >%         ", 37,13,1,
0,-3,-5,-28},
/*3.11*/{1,"CUM                          >$         ", 38,13,1,
0,-4,-5,-28},
/*3.12*/{1,"CUM                          >%         ", 39,13,1,
0,-5,-5,-28},
/*3.13*/{1,"CUM                          >%         ", 40,13,1,
0,-6,-5,-28},
/*3.14*/{1,"CUM                          >$         ",
41,13,1,0,-7,-5,-28},
/*3.15*/{1,"CUM                          >%         ", 42,13,1,
0,-8,-5,-28},
/*3.16*/{1,"CUM                          >$         ", 43,13,1,
0,-9,-5,-28},
/*3.17*/{1,"TOTAL TAX>                   $         ", 44,13,1, 0, 0, 0,
0 },
/*3.18*/{1,"TOTAL SALES INCL TAX>        $         ", 45,13,1, 0, 0, 0,
0 },
/*3.19*/{1,"TOTAL MISC. CHARGES>         $         ", 46,13,1, 0, 0, 0, 0 },
/*3.20*/{1,"TOTAL PAYMENT RECEIVED>      $         ", 47,13,1, 0, 0, 0,
0 },

/*4.0 */{1,"** M4 - VALVE RELATED OPTIONS **         ", 0,-1,0, 0, 0, 0, 0 },
/*4.1 */{1,"PRODUCT CODE>                           ", -99, 0,1, 0, 0, 0,
0 },
/*4.2 */{1,"FIRST STAGE CLOSURE>                    ", -6,12,4, 0, 0, 0,
0 },
/*4.3 */{1,"HIGH FLOW (% OF MAX. FLOW)>   %         ", -7, 1,4,100,0, 0, 0 },
/*4.4 */{1,"LOW FLOW (% OF MAX. FLOW)>    %         ", -44, 1,4,100,0, 0, 0 },
/*4.5 */{1,"DEAD BAND (% OF MAX. FLOW)>   %         ", -113, 1,4,100,0, 0, 0 },
/*4.6 */{1,"NOMINAL OPEN TIME (IN 5 MSEC)>          ", -59, 0,4, 0, 0, 0, 0 },
/*4.7 */{1,"NOMINAL CLOSE TIME (5 MSEC)>            ", -112, 0,4, 0, 0, 0, 0 },
/*4.8 */{1,"FAST OPEN TIME (IN 5 MSEC)>             ", -94, 0,4, 0, 0, 0, 0 },
/*4.9 */{1,"FAST CLOSE TIME (IN 5 MSEC)>            ", -4, 0,4, 0, 0, 0, 0 },
/*4.10*/{1,"MAX. PULSERREVERSALS>                   ", -5, 0,3, 0, 0, 0, 0,
0 },
/*4.11*/{1,"MAX. PRESET VOLUME>                     ",-114, 0,4, 0, 0, 0, 0 },
/*4.12*/{1,"THROTTLE CONTROL VOLUME>                ",-119,12,1, 0, 0, 0, 0 },
/*4.13*/{0,"                                        ", 0,0,0,0,0,0,0},
/*4.14*/{0,"                                        ", 0,0,0,0,0,0,0},
/*4.15*/{0,"                                        ", 0,0,0,0,0,0,0},
/*4.16*/{0,"                                        ", 0,0,0,0,0,0,0 },
/*4.17*/{0,"PERCENT FULL>                 %         ",-123, 2,1, 0, 0, 0,
0 },
/*4.18*/{0,"PERCENT FULL                  %         ",-123, 2,0, 0, 0, 0, 0 },
/*4.19*/{0,"                                        ", 0,0,0,0,0,0,0},
/*4.20*/{0,"                                        ", 0,0,0,0,0,0,0},

/*5.0 */{1,"** M5-ENABLES **                        ", 0,-1,0, 0, 0, 0, 0
},
/*5.1 */{1,"ENABLE NET PRESET>                      ", -46, 0,1, 1, 0, 0, 0 },
/*5.2 */{1,"ENABLE GROSS PRESET>                    ", -47, 0,1, 1, 0, 0, 0 },
/*5.3 */{1,"ENABLE PRICE PRESET>                    ", -8, 0,1, 1, 0, 0, 0 },
/*5.4 */{1,"ENABLE REPEATING PRESET>                ", -9, 0,1, 1, 0, 0, 0 },
/*5.5 */{1,"ENABLE PRODUCT CODE PROMPT>             ", -10, 0,1, 1, 0, 0, 0 },
/*5.6 */{1,"ENABLE UNSCH. SET-UP MODE>              ", -11, 0,1, 1, 0, 0, 0 },
/*5.7 */{1,"ACTIVE TICKET HEADER #(0-6)>            ", -12, 0,1, 6, 0, 0, 0 },
/*5.8 */{1,"ENABLE ADDRESS ON TICKET>               ", -13, 0,1, 1, 0, 0, 0 },
/*5.9 */{1,"BLANKS ON TOP, DELIVERY>                ", -14, 0,1, 0, 0, 0, 0 },
/*5.10*/{1,"BLANKS ON TOP, OTHER>                   ", -15, 0,1, 0, 0, 0,
0 },
/*5.11*/{1,"ENABLE TANK INDICATOR LINE>    ", -16, 0,1, 1, 0, 0, 0 },
/*5.12*/{1,"ENABLE PERCENT FULL PROMPT>             ", -17, 0,1, 1, 0, 0, 0 },
/*5.13*/{1,"ENABLE ODOMETER ON TICKET>              ", -18, 0,1, 1, 0, 0, 0 },
/*5.14*/{1,"ENABLE TOTAL CAT.S ON TICKET>           ",-117, 0,1, 1, 0, 0,
0 },
```

```
/*5.15*/{1,"ENABLE DEL. TEMP. ON TICKET>          ",-148, 0,1, 1, 0, 0, 0 },
/*5.16*/{1,"ENABLE MISC.TRANS.--M1 PRINT>         ",-122, 0,1, 1, 0, 0,
0 },
/*5.17*/{1,"ENABLE PROD. DESC. ON TICKET>         ",-147, 0,1, 1, 0, 0,
0 },
/*5.18*/{1,"ENABLE SERIAL TICKET PRINTER>         ",-193, 0,1, 1, 0, 0,
0 },
/*5.19*/{1,"ENABLE PARALLEL PRINTER>              ", -97, 0,1, 1, 0, 0, 0 },
/*5.20*/{0,"                                      ", 0,-1,0, 0, 0, 0, 0
},

/*6.0 */{1,"** M6 - REAL-TIME CLOCK    **         ", 0,-1,0, 0, 0, 0, 0 },
/*6.1 */{1,"YEAR>                                 ", -37,
0,1,99, 0, 0, 0 },
/*6.2 */{1,"MONTH>                                ", -38, 0,1,12, 0, 0,
0 },
/*6.3 */{1,"DAY>                                  ", -39,
0,1,31, 0, 0, 0 },
/*6.4 */{1,"HOUR>                                 ", -40,
0,1,23, 0, 0, 0 },
/*6.5 */{1,"MINUTE>                               ", -41, 0,1,59, 0, 0,
0 },
/*6.6 */{1,"SECOND>                               ", -42, 0,1,59, 0, 0,
0 },
/*6.7 */{1,"DAYS UNTIL PAYMENT>         ", -43, 0,1, 0, 0, 0, 0 },
/*6.8 */{1," DATE TIME                            ", 0,-6,0, 0, 0, 0, 0
},
/*6.9 */{0,"SAVING RAM-CARD RECORDS...            ", 0,-1,0, 0, 0, 0, 0 },
/*6.10 */{0,"ACCESS # NOT FOUND!          ", 0,-1,0, 0, 0, 0, 0 },
/*6.11 */{0,"RAM-CARD IS FULL! DISABLE RAM-CARD IN M5  ", 0,-1,0, 0, 0, 0, 0 },
/*6.12 */{0,"WARNING: RAM-CARD IS NEAR FULL OF RECS.   ", 0,-1,0, 0, 0, 0, 0 },
/*6.13 */{0,"PRESS ENTER WHEN PRINTER IS READY>   ", 0,-1,0, 0, 0, 0, 0 },
/*6.14 */{0,"DELIVERY STOPPED: PRINT BUTTON        ", 0,-2,0, 0, 0, 0, 0 },
/*6.15 */{0,"DELIVERY STOPPED: STOP BUTTON         ", 0,-2,0, 0, 0, 0, 0 },
/*6.16 */{0,"PRESS START TO RESUME, PRINT TO END>  ", 0,-1,0, 0, 0, 0, 0 },
/*6.17 */{0,"DELIVERY STOPPED: PRESET              ", 0,-2,0, 0, 0, 0, 0 },
/*6.18 */{0,"RAM-CARD MISMATCH. DELIVERY ABORTED.  ", 0,-1,0, 0, 0, 0, 0 },
/*6.19 */{0,"M?                                    ", 0,-1,0, 0, 0, 0, 0
},
/*6.20 */{0,"METER...      ...PRESET               ", 6,12,0, 0, 0, 0, 0 },

/*7.0 */{1,"** M7 - DIAGNOSTICS **                ", 0,-1,0, 0, 0, 0, 0
},
/*7.1 */{1,"ACTUAL PULSER REVERSALS               ",-118, 0,0, 0, 0, 0, 0 },
/*7.2 */{1,"MAX. FLOW RATE EVER                   ",-222, 4,0, 0, 0, 0, 0 },
/*7.3 */{1,"MAX. FLOW RATE LAST DELIVERY          ",-223, 4,0, 0, 0, 0,
0 },
/*7.4 */{1,"TOTAL MILES                           ",-142, 2,0, 0, 0, 0,
7 },
/*7.5 */{1,"LAST PROVE:                           ", 0,-4,0, 0, 0, 0, 0
},
/*7.6 */{1,"PRODUCT CODE                          ", -99, 0,0, 0, 0, 0, 0 },
/*7.7 */{1,"TEMP. UNCORRECTED °C                  ",-157, 2,0, 0, 0,21, 0 },
/*7.8 */{1,"TEMP. CORRECTED °C                    ",-158, 2,0, 0, 0,20, 0 },
/*7.9 */{1,"MAX. FLOW RATE--COMP. TABLE           ", 84, 4,0, 0, 0, 0, 0 },
/*7.10*/{1,"PULSES/UNIT VOLUME                    ", 86,12,0, 0, 0, 0, 0 },
/*7.11*/{1,"%ERROR F.RATE 1         %CHANGE--%    ", 87, 5,0, 0, 0, 0, 0 },
/*7.12*/{1,"%ERROR F.RATE 2         %CH 9.99+ %   ", 88, 5,0, 0, 0, 0,
0 },
/*7.13*/{1,"%ERROR F.RATE 3         %CH 9.99+ %   ", 89, 5,0, 0, 0, 0,
0 },
/*7.14*/{1,"%ERROR F.RATE 4         %CH 9.99+ %   ", 90, 5,0, 0, 0, 0,
0 },
/*7.15*/{1,"%ERROR F.RATE 5         %CH 9.99+ %   ", 91, 5,0, 0, 0, 0,
0 },
/*7.16*/{1,"%ERROR F.RATE 6         %CH 9.99+ %   ", 92, 5,0, 0, 0, 0,
0 },
/*7.17*/{1,"%ERROR F.RATE 7         %CH 9.99+ %   ", 93, 5,0, 0, 0, 0,
0 },
/*7.18*/{1,"%ERROR F.RATE 8         %CH 9.99+ %   ", 94, 5,0, 0, 0, 0,
0 },
```

- 53 -

```
/*7.19*/{1,"XERROR F.RATE 9          %CH 9.99+ %    ", 95, 5,0, 0, 0, 0,
0 },
/*7.20*/{1,"XERROR F.RATE 10         %CH 9.99+ %    ", 96, 5,0, 0, 0, 0,
0 },

/*8.0 */{1,"** M8-IDENTIFICATION **                 ", 0,-1,0, 0, 0, 0, 0 },
/*8.1 */{1,"    DATE TIME                           ", 0,-6,0, 0, 0, 0, 0 },
/*8.2 */{1,"VERSION NO: SCM-1.00 MTR-1.00 LCC-1.00  ", 0,-1,0, 0, 0, 0, 0 },
/*8.3 */{1,"MODEL SETTING NUMBER                    ",-205, 0,0, 0, 0, 0, 0 },
/*8.4 */{1,"UNIT ID NUMBER                          ", -1, 0,0, 0, 0, 0,
0 },
/*8.5 */{1,"METER ID NUMBER                         ", -2, 0,0, 0, 0, 0,
0 },
/*8.6 */{1,"TRUCK ID NUMBER                         ", -3, 0,0, 0, 0, 0,
0 },
/*8.7 */{1,"PRODUCT CAT. 1 CODE                     ", -49, 0,0, 0, 0, 0, 0 },
/*8.8 */{1,"PRODUCT CAT. 1 NAME                     ", -70,-3,0, 0, 0, 0, 0 },
/*8.9 */{1,"PRODUCT CAT. 1 METER                    ", -60, 0,0, 0, 0, 0, 0 },
/*8.10*/{1,"PRODUCT CAT. 1 DENSITY                  ", -84, 6,0, 0, 0, 0,
0 },
/*8.11*/{1,"PROD. 1 TEMP. COMP. CODE                ",-100,-10,0,0, 0. 0, 0 },
/*8.12*/{1,"PRODUCT CAT. 2 CODE                     ", -50, 0,0, 0, 0, 0, 0 },
/*8.13*/{1,"PRODUCT CAT. 2 NAME                     ", -71,-3,0, 0, 0, 0, 0 },
/*8.14*/{1,"PRODUCT CAT. 2 METER                    ", -61, 0,0, 0, 0, 0, 0 },
/*8.15*/{1,"PRODUCT CAT. 2 DENSITY                  ", -85, 6,0, 0, 0, 0,
0 },
/*8.16*/{1,"PROD. 2 TEMP. COMP. CODE                ",-101,-10,0,0, 0. 0, 0 },
/*8.17*/{1,"PRODUCT CAT. 3 CODE                     ", -51, 0,0, 0, 0, 0, 0 },
/*8.18*/{1,"PRODUCT CAT. 3 NAME                     ", -72,-3,0, 0, 0, 0, 0 },
/*8.19*/{1,"PRODUCT CAT. 3 METER                    ", -62, 0,0, 0, 0, 0, 0 },
/*8.20*/{1,"PRODUCT CAT. 3 DENSITY                  ", -86, 6,0, 0, 0, 0,
0 },

/* Mode 9 odometer...plus temp.table codes and prompts (.range is active byte*/
/*9.0 */{1,"** M9 - ODOMETER **                     ", 0,-1,0, 0, 0, 0, 0 },
/*9.1 */{1,"TRIP ODOMETER>                          ", -45, 2,1, 0, 0, 0, 0 },
/*9.2 */{1,"TOTAL MILES>                            ",-142, 2,1, 0, 0, 0, 7 },
/*9.3 */{1,"PULSES PER 1/100TH MILE>                ", -48, 0,1, 0, 0, 0,20 },
/*9.4 */{0,"                 NONE                   ", 0, 0,0, 1, 0, 0, 0
},
/*9.5 */{0,"TEMP. COEFFICENT              LINEAR    ", 0, 0,0, 1, 0, 0, 0 },
/*9.6 */{0,"API GRAVITY 60 F              6B        ", 0, 0,0, 1, 0, 0, 0 },
/*9.7 */{0,"DENSITY 15 C                  54B       ", 0, 0,0, 1, 0, 0, 0 },
/*9.8 */{0,"RELATIVE DENSITY 60/60 F      24B       ", 0, 0,0, 1, 0, 0, 0 },
/*9.9 */{0,"DENSITY 15 C                  54A       ", 0, 0,0, 1, 0, 0, 0
},
/*9.10*/{0,"RELATIVE DENSITY 60/60 F      24A       ", 0, 0,0, 1, 0, 0, 0 },
/*9.11*/{0,"API GRAVITY 60 F              6A        ", 0, 0,0, 1, 0, 0, 0
}, /*9.12**{0,"DENSITY 15 C                  NH3       ", 0, 0,0, 1, 0, 0, 0 },
9.13{0,"S.G. 60/60 F                  LPG24     ", 0, 0,0, 1, 0, 0, 0 },
9.14{0,"DENSITY KG/LITER              LPG54     ", 0, 0,0, 1, 0, 0, 0
}.**/

/*9.12*/{0,"                                        ", 0,0,0,0,0,0,0 },
/*9.13 /{0,"                                        ", 0,0,0,0,0,0,0 },
/*9.14*/{0,"                                        ", 0,0,0,0,0,0,0 },
/*9.15*/{0,"NETWORK RE-INIT>                        ", -98, 0,1, 0, 0, 0,
0,},
/*9.16*/{0,"NETWORK RE-START>                       ", -98, 0,1, 0, 0, 0, 0,},
/*9.17*/{0,"RAM-CARD FIRST TICKET NUMBER.           ",-219, 0,0, 0, 0, 0, 0 },
/*9.18*/{0,"ODOMETER AT END OF LAST DELIVERY.       ",-218, 0,0, 0, 0, 0, 0 },
/*9.19*/{0,"LAST CASH DISCOUNT                      ",-220, 0,0, 0, 0, 0, 0 },
/*9.20*/{1,"NETWORK DELIVERY UPDATES>               ",-221, 0,1, 0, 0, 0, 0 },

/*10.0 */{1,"PRODUCT CODE>                          ", -99, 0,1, 0, 0, 0, 0 },
/*10.1 */{1,"FOR END OF SHIFT TICKET PRESS PRINT    ", 0,-1,0, 0, 0, 0, 0 },
/*10.2 */{0,"RAM-CARD NOT FOUND. INSERT RAM-CARD.   ", 0,-1,0, 0, 0, 0, 0 },
/*10.3 */{0,"RAM-CARD DATA NOT VALID.               ", 0,-1,0, 0, 0, 0, 0 },
/*10.4 */{0," RECS READ FROM RAM-CARD. HIT ARROW    ", 0,-1,0, 0, 0, 0, 0 },
```

- 54 -

```
/*10.5 */{0,"RAM-CARD ID                                    ",-211, 0,0, 0, 0, 0,
0 },
/*10.6 */{0,"RAM-CARD MILES DRIVEN                          ",-212, 0,0, 0, 0, 0,
0 },
/*10.7 */{0,"RAM-CARD NET TOTAL UNITS                       ",-213, 0,0, 0, 0, 0 },
/*10.8 */{0,"RAM-CARD GROSS TOTAL UNITS                     ",-214, 0,0, 0, 0, 0 },
/*10.9 */{0,"** MODE 10 SHIFT TOTALS **                     ", 0,-1,0, 1, 0, 0, 0 },
/*10.10*/{0,"BEGIN SHIFT: 00/00/00        00:00:00          ", 0,-1,0, 1, 0, 0, 0
},
/*10.11*/{0,"END SHIFT:   00/00/00        00:00:00          ", 0,-1,0, 1, 0, 0, 0
},
/*10.12*/{0,"PRODUCT CODE                                   ", -99, 0,0, 1, 0, 0, 0 },
/*10.13*/{0,"DRIVER NUMBER                                  ", -36, 0,0, 1, 0, 0, 0 },
/*10.14*/{0,"UNIT ID NUMBER                                 ", -1, 0,0, 1, 0, 0, 0 },
/*10.15*/{0,"TRUCK ID NUMBER                                ", -3, 0,0, 1, 0, 0, 0 },
/*10.16*/{0,"INVENTORY                                      ", 11,12,0, 1, 0, 0,
0 },
/*10.17*/{0,"TICKET NUMBER                                  ", -19, 0,0, 1, 0, 0, 0 },
/*10.18*/{0,"SALE NUMBER                                    ", -20, 0,0, 1, 0, 0, 0 },
/*10.19*/{0,"MISC. TRANSACTION NUMBER                       ", -21, 0,0, 1, 0, 0, 0 },
/*10.20*/{0,"TOTAL NET VOLUME                               ", 32,12,0, 1, 0, 0,
0 },

/* AUDIT RAIL AND PRODUCT CATEGORIES...PRODUCT CODE AND NAME...AND DIAG.**/
/*11.0 */{0,"** M11 - AUDIT TRAIL **                        ", 0,-1,0, 0, 0, 0, 0 },
/*11.1 */{1,"AUDIT TRAIL DATA, OCCURANCE #>                 ",-121, 0,1,101,0, 0, 0 },
/*11.2*/{0,"                                                ", 0,0,0,0,0,0,0},
/*11.3 */{0,"PRODUCT    ?.    JET FUEL                      ", -49,-5,0, 0, 0, 0,
0 },
/*11.4 */{0,"PRODUCT    ?.    KEROSENE                      ", -50,-5,0, 0, 0, 0,
0 },
/*11.5 */{0,"PRODUCT    ?.    DIESEL                        ", -51,-5,0, 0, 0, 0 },
/*11.6 */{0,"PRODUCT    ?.    REGULAR                       ", -52,-5,0, 0, 0, 0 },
/*11.7 */{0,"PRODUCT    ?.    UNLEADED                      ", -53,-5,0, 0, 0, 0,
0 },
/*11.8 */{0,"PRODUCT    ?.    LPG                           ", -54,-5,0, 0, 0, 0,
0 },
/*11.9 */{0,"PRODUCT    ?.    LUBE OIL                      ", -55,-5,0, 0, 0, 0,
0 },
/*11.10*/{0,"PRODUCT    ?.    SUPER                         ", -56,-5,0, 0, 0, 0,
0 },
/*11.11*/{0,"PRODUCT    ?.    BEER                          ", -57,-5,0, 0, 0, 0,
0 },
/*11.12*/{0,"PRODUCT    ??.   EVION                         ", -58,-5,0, 0, 0, 0,
0 },
/* 11.13*/{0,"RESETTING METER FOR DELIVERY...    ", 0,-1,0, 0, 0, 0, 0 },
/* 11.14*/{0,"UN-ABLE TO UPGRADE SYSTEM CODE...  ", 0,-1,0, 0, 0, 0, 0 },
/*11.15*/{0,"RAM-CARD NOT INITIALIZED. ENTERMID.", 0,-1,0, 0, 0, 0, 0 },
/* 11.16*/{0,"SERIAL TICKET PRINTER NOT READY.  ", 0,-1,0, 0, 0, 0, 0 },
/*11.17*/{0,"DIAGNOSTIC...Last Key Hit         ", 0,-1,0, 0, 0, 0, 0 },
/*11.18*/{0,"DIAGNOSTIC...Actions Count        ", 0,-1,0, 0, 0, 0, 0 },
/*11.19*/{0,"DIAGNOSTIC...Menu Number          ", 0,-1,0, 0, 0, 0, 0 },
/*11.20*/{0,"DIAGNOSTIC..Action Number         ", 0,-1,0, 0, 0, 0, 0 }, /*12.0 */{1," M12 - BASE ACCOUNT SET-UP            ", 0,-1,0, 0, 0, 0, 0 },
/*12.1 */{1,"PRODUCT CODE>                             ", -99, 0,1, 0, 0, 0,
0 },
/*12.2 */{1,"PRICEPER GALLON>         $                ", 61,14,1,0,11,0,0},
/*12.3 */{1,"%TAX-CATEGORY 1                      >%   ",
62,14,1,0,-1,-1,-28},
/*12.4 */{1,"TAX PER UNIT - CATEGORY 1    >$           ", 63,14,1, 0,-2,-1,-28},
/*12.5 */{1,"% TAX - CATEGORY 2           >%           ", 64,14,1, 0,-3,-1,-28},
/*12.6 */{1,"TAX PER UNIT - CATEGORY 2    >$           ", 65,14,1, 0,-4,-1,-28},
/*12.7 */{1,"% TAX - SUBTTL+TAX CAT 1&2   >%           ", 66,14,1, 0,-5,-1,-28},
/*12.8 */{1,"% TAX - CATEGORY 3           >%           ", 67,14,1, 0,-6,-1,-28},
/*12.9 */{1,"TAX PER UNIT-CATEGORY 3      >$           ", 68,14,1,0,-7,-1,-28},
/*12.10*/{1,"%TAX-CATEGORY 4                      >%   ",
69,14,1,0,-8,-1,-28},
/*12.11*/{1,"TAX PER UNIT - CATEGORY 4    >$           ", 70,14,1, 0,-9,-1,-28},
/*12.12*/{0,"WAIT FOR SYSTEM TO RE-BOOT..              ", 0,-1,0, 0, 0, 0, 0 },
/*12.13*/{0,"SYSTEM UPGRADED SUCCESSFULLY...           ", 0,-1,0, 0, 0, 0, 0 },
```

```
/*12.14*/{0,"UPGRADING SYSTEM CODE OVER RF-PORT...    ", 0,-1,0, 0, 0, 0, 0 },
/*12.15*/{0,"DOWNLOADING SYSTEM PARMS OVER NETWORK... ", 0,-1,0, 0, 0, 0, 0 },
/*12.16*/{0,"UPLOADING SYSTEM PARMS OVER NETWORK...   ", 0,-1,0, 0, 0, 0, 0 },
/*12.17*/{0,"TOTALIZER RECORD RECEIVED FROM RF-LINK.  ", 0,-1,0, 0, 0, 0, 0 },
/*12.18*/{0,"DISPATCH RECORD REC'D,ACCESS#            ", 0,-1,0, 0, 0, 0, 0 },
/*12.19*/{0,"BASE PRICE REC. RECEIVED FROM RF-LINK.   ", 0,-1,0, 0, 0, 0, 0 },
/*12.20*/{0,"DISCOUNT RECORD RECEIVED FROM RF-LINK.   ", 0,-1,0, 0, 0, 0, 0 },

/*13.0 */{1,"** M13 - TOTALIZERS PRINT LIST **        ", 0,-1,0, 0, 0, 0, 0 },
/*13.1 */{1,"PRODUCT CODE                             ", -99, 0,0, 0, 0, 0, 0 },
/*13.2 */{1," DATE TIME                               ", 0,-6,0, 0, 0, 0, 0 },
/*13.3 */{1,"TRUCK ID NUMBER                          ", -3, 0,0, 0, 0, 0, 0 },
/*13.4 */{1,"UNIT ID NUMBER                           ", -1, 0,0, 0, 0, 0, 0 },
/*13.5 */{1,"TICKET NUMBER                            ", -19, 0,0, 0, 0, 0, 0 },
/*13.6 */{1,"SALE NUMBER                              ", -20, 0,0, 0, 0, 0, 0 },
/*13.7 */{1,"MISC. TRANSACTION NUMBER                 ", -21, 0,0, 0, 0, 0, 0 },
/*13.8 */{1,"TOTAL NET VOLUME                         ", 32,12,0, 0, 0, 0, 0 },
/*13.9 */{1,"TOTAL GROSS VOLUME                       ", 33,12,0, 0, 0, 0, 0 },
/*13.10*/{1,"TOTAL SALES, NO TAX          $           ", 34,13,0, 0, 0, 0, 0 },
/*13.11*/{1,"CUM                          %           ", 35,13,0, 0,-1,-5,-29},
/*13.12*/{1,"CUM                          $           ", 36,13,0, 0,-2,-5,-29},
/*13.13*/{1,"CUM                          %           ", 37,13,0, 0,-3,-5,-29},
/*13.14*/{1,"CUM                          $           ", 38,13,0, 0,-4,-5,-29},
/*13.15*/{1,"CUM                          %           ", 39,13,0, 0,-5,-5,-29},
/*13.16*/{1,"CUM                          %           ", 40,13,0, 0,-6,-5,-29},
/*13.17*/{1,"CUM                          $           ", 41,13,0, 0,-7,-5,-29},
/*13.18*/{1,"CUM                          %           ",                        42,13,0,0,-8,-5,-29},
/*13.19*/{1,"CUM                          $           ", 43,13,0, 0,-9,-5,-29},
/*13.20*/{1,"TOTAL TAX                    $           ", 44,13,0, 0, 0, 0, 0 },

/*14.0 */{1,"** M14 - DISCOUNTS **                    ", 0,-1,0, 0, 0, 0, 0 },
/*14.1 */{1,"VOLUME DISCOUNT LEVEL 1>                 ",-178,12,1, 0, 0, 0, 0 },
/* 14.2 */{1,"PRICE DISCOUNT LEVEL 1>     $           ",-179,14,1, 0, 0, 0, 0 },
/* 14.3 */{1,"VOLUME DISCOUNT LEVEL 2>                ",-180,12,1, 0, 0, 0, 0 },
/*14.4 */{1,"PRICE DISCOUNT LEVEL 2>      $           ",-181,14,1, 0, 0, 0, 0 },
/* 14.5 */{1,"VOLUME DISCOUNT LEVEL 3>                ",-182,12,1, 0, 0, 0, 0 },
/*14.6 */{1,"PRICE DISCOUNT LEVEL 3>      $           ",-183,14,1, 0, 0, 0, 0 },
/* 14.7 */{1,"CASH DISCOUNT INTERVAL 1>               ",-184, 0,1, 0, 0, 0, 0 },
/*14.8 */{1,"DISCOUNT % CATEGORY 1>       %           ",-185,14,1,-1, 0, 0, 0 },
/*14.9 */{1,"DISCOUNT/UNIT CATEGORY 1>    $           ",-186,14,1,-1, 0, 0, 0 },
/*14.10*/{1,"CASH DISCOUNT INTERVAL 2>                ",-187, 0,1, 0, 0, 0, 0 },
/*14.11*/{1,"DISCOUNT % CATEGORY 2>       %           ",-188,14,1,-1, 0, 0, 0 },
/*14.12*/{1,"DISCOUNT/UNIT CATEGORY 2>    $           ",-189,14,1,-1, 0, 0, 0 },
/*14.13*/{1,"CASH DISCOUNT INTERVAL 3>                ",-190, 0,1, 0, 0, 0, 0 },
/*14.14*/{1,"DISCOUNT % CATEGORY 3>       %           ",-191,14,1,-1, 0, 0, 0 },
/*14.15*/{1,"DISCOUNT/UNIT CATEGORY 3>    $           ",-192,14,1,-1, 0, 0, 0 },
/*14.16*/{0,"                                         ", 0,0,0,0,0,0,0},
/*14.17*/{0,"                                         ", 0,0,0,0,0,0,0},
/*14.18*/{0,"                                         ", 0,0,0,0,0,0,0},
/*14.19*/{0,"                                         ", 0,0,0,0,0,0,0},
/*14.20*/{0,"                                         ", 0,0,0,0,0,0,0},

/***** cotinuance of M3-TOTALIZERS #2 and of product shift times #1********/
/*15.0 */{0,"ACCESS # -- ALREADY DELIVERED.           ", 0,-1,0, 0, 0, 0, 0 },
```

```
/*15.1  */{0,"UPLOADING SRAM RECORDS TO RF-LINK...        ", 0,-1,0, 0, 0, 0, 0 },
/*15.2  */{0,"DISPATCH RECORD INVALID. INACTIVE OPTION    ", 0,-1,0, 0, 0, 0, 0 },
/* 15.3 */{0,"LOADING CPU RAM FROM RAM-CARD...        ", 0,-1,0, 0, 0, 0, 0 },
/*15.4  */{0,"SAVING CPU RAM TO RAM-CARD...              ", 0,-1,0, 0, 0, 0, 0 },
/*15.5  */{0,"RAM-CARD DOESN'T CONTAIN CPU DATA.    ", 0,-1,0, 0, 0, 0, 0 },
/*15.6  */{0,"COMPUTING PRESET PRICE...                  ", 0,-1,0, 0, 0, 0, 0 },
/*15.7  */{0,"SRAM FILE NOT FOUND. DEL. REC. NOT SAVED   ", 0,-1,0, 0, 0, 0, 0 },
/*15.8  */{0,"SRAM IS FULL! DISABLE RF-LINK IN M18       ", 0,-1,0, 0, 0, 0, 0 },
/*15.9  */{0,"WARNING: SRAM IS NEAR FULL OF RECORDS.     ", 0,-1,0, 0, 0, 0, 0 },
/*15.10*/{0,"RAM-CARD NOT FOUND. DEL. REC. NOT SAVED    ", 0,-1,0, 0, 0, 0, 0 },
/*15.11*/{0,"BEGIN SHIFT: 00/00/00       00:00:00              ", 0,-1,0, 0, 0, 0, 0 },
/*15.12*/{0,"END SHIFT:   00/00/00       00:00:00              ", 0,-1,0, 0, 0, 0, 0 },
/*15.13*/{0,"BEGIN SHIFT: 00/00/00       00:00:00              ", 0,-1,0, 0, 0, 0, 0 },
/*15.14*/{0,"END SHIFT:   00/00/00       00:00:00              ", 0,-1,0, 0, 0, 0, 0 },
/*15.15*/{0,"BEGIN SHIFT: 00/00/00       00:00:00              ", 0,-1,0, 0, 0, 0, 0 },
/*15.16*/{0,"END SHIFT:   00/00/00       00:00:00              ", 0,-1,0, 0, 0, 0, 0 },
/*15.17*/{0,"BEGIN SHIFT: 00/00/00       00:00:00              ", 0,-1,0, 0, 0, 0, 0 },
/*15.18*/{0,"END SHIFT:   00/00/00       00:00:00              ", 0,-1,0, 0, 0, 0, 0 },
/*15.19*/{0,"BEGIN SHIFT: 00/00/00       00:00:00              ", 0,-1,0, 0, 0, 0, 0 },
/*15.20*/{0,"END SHIFT:   00/00/00       00:00:00              ", 0,-1,0, 0, 0, 0, 0 },

/*16.0  */{1,"** M16 - SUM TOTALIZER **                ", 0,-1,0, 0, 0, 0, 0 },
/*16.1  */{1,"SUM TOTAL NET VOLUME                    ",-159,12,0, 0, 0, 0, 0 },
/*16.2  */{1,"SUM TOTAL GROSS VOLUME                  ",-160,12,0, 0, 0, 0, 0 },
/*16.3  */{1,"SUM TOTAL SALES, NO TAX       $         ",-161,13,0, 0, 0, 0, 0 },
/*16.4  */{1,"SUM                           %         ",-162,13,0, 0,-1,-5,-29},
/*16.5  */{1,"SUM                           $         ",-163,13,0, 0,-2,-5,-29},
/*16.6  */{1,"SUM                           %         ",-164,13,0, 0,-3,-5,-29},
/*16.7  */{1,"SUM                           $         ",-165,13,0, 0,-4,-5,-29},
/*16.8  */{1,"SUM                           %         ",-166,13,0, 0,-5,-5,-29},
/*16.9  */{1,"SUM                           %         ",-167,13,0, 0,-6,-5,-29},
/*16.10*/{1,"SUM                           $         ",-168,13,0, 0,-7,-5,-29},
/*16.11*/{1,"SUM                           %         ",-169,13,0, 0,-8,-5,-29},
/*16.12*/{1,"SUM                           $         ",-170,13,0, 0,-9,-5,-29},
/*16.13*/{1,"SUM TOTAL TAX                 $         ",-171,13,0, 0, 0, 0, 0,},
/*16.14*/{1,"SUM TOTAL SALES INCL TAX      $         ",-172,13,0, 0, 0, 0, 0,},
/*16.15*/{1,"SUM TOTAL MISC. CHARGES       $         ",-173,13,0, 0, 0, 0, 0,},
/*16.16*/{1,"SUM TOTAL PAYMENT RECEIVED    $         ",-174,13,0, 0, 0, 0, 0,},
/*16.17*/{1,"SUM TOTAL UNMETERED TRANS VOL.          ",-175,12,0, 0, 0, 0, 0,},
/*16.18*/{1,"SUM TOTAL GROSS NOT PRICED              ",-176,12,0, 0, 0, 0, 0,},
/*16.19*/{1,"SUM TOTAL NET NOT PRICED                ",-177,12,0, 0, 0, 0, 0,},
/*16.20*/{1,"CLEAR ALL TOTALIZERS>                   ", -98, 0,1, 1, 0, 0, 0,},

/*17.0  */{1,"** M17 - PRODUCT SETUP **               ", 0,-1,0, 0, 0, 0,},
/*17.1  */{1,"PRODUCT CAT. 1 CODE>                    ", -49, 0,7, 0, 0, 0, 0,},
/*17.2  */{1,"PRODUCT CAT. 1 NAME>                    ", -70,-3,1,10, 0, 0, 0,},
```

```
/*17.3 */{1,"PRODUCT CAT. 1 METER>            ", -60, 0,1, 3, 0, 0,
0,},
/*17.4 */{1,"PRODUCT CAT. 2 CODE>             ", -50, 0,7, 0, 0, 0,
0,},
/*17.5 */{1,"PRODUCT CAT. 2 NAME>             ", -71,-3,1,10, 0, 0,
0,},
/*17.6 */{1,"PRODUCT CAT. 2 METER>            ", -61, 0,1, 3, 0, 0,
0,},
/*17.7 */{1,"PRODUCT CAT. 3 CODE>             ", -51, 0,7, 0, 0, 0,
0,},
/*17.8 */{1,"PRODUCT CAT. 3 NAME>             ", -72,-3,1,10, 0, 0,
0,},
/*17.9 */{1,"PRODUCT CAT. 3 METER>            ", -62, 0,1, 3, 0, 0,
0,},
/*17.10*/{1,"PRODUCT CAT. 4 CODE>             ", -52, 0,7, 0, 0, 0,
0,},
/*17.11*/{1,"PRODUCT CAT. 4 NAME>             ", -73,-3,1,10, 0, 0,
0,},
/*17.12*/{1,"PRODUCT CAT. 4 METER>            ", -63, 0,1, 3, 0, 0,
0,},
/*17.13*/{1,"PRODUCT CAT. 5 CODE>             ", -53, 0,7, 0, 0, 0,
0,},
/*17.14*/{1,"PRODUCT CAT. 5 NAME>             ", -74,-3,1,10, 0, 0,
0,},
/*17.15*/{1,"PRODUCT CAT. 5 METER>            ", -64, 0,1, 3, 0, 0,
0,},
/*17.16*/{1,"PRODUCT CAT. 6 CODE>             ", -54, 0,7, 0, 0, 0,
0,},
/*17.17*/{1,"PRODUCT CAT. 6 NAME>             ", -75,-3,1,10, 0, 0,
0,},
/*17.18*/{1,"PRODUCT CAT. 6 METER>            ", -65, 0,1, 3, 0, 0,
0,},
/*17.19*/{1,"PRODUCT CAT. 7 CODE>             ", -55, 0,7, 0, 0, 0,
0,},
/*17.20*/{1,"PRODUCT CAT. 7 NAME>             ", -76,-3,1,10, 0, 0,
0,},

/*18.0 */{1,"** M18 - SYSTEM SETUP **         ", 0,-1,0, 0, 0, 0, 0,},
/*18.1 */{1,"MODEL SETTING NUMBER>            ",-205, 0,1, 0, 0, 0, 0,},
/*18.2 */{1,"ENABLE NET INVENTORY (GROSS)>    ",-111, 0,1, 1, 0, 0, 0,},
/*18.3 */{1,"ENABLE DEGREES °C (VS. °F)>      ", -96, 0,1, 1, 0, 0, 0,},
/*18.4 */{1,"ENABLE ODOMETER>                 ",-196, 0,1, 1, 0, 0,
0,},
/*18.5 */{1,"ENABLE KILOMETERS (MILES)>       ",-110, 0,1, 1, 0, 0, 0,},
/* 18.6 */{1,"ENABLE RAM-CARD>                ",-199, 0,1, 1, 0, 0, 0,},
/*18.7 */{1,"ENABLE PRICING>                  ",-197, 0,1, 1, 0, 0, 0,},
/*18.8 */{1,"ENABLE DISCOUNTING>              ",-198, 0,1, 1, 0, 0, 0,},
/*18.9 */{ 1,"ENABLE CYLINDER FILL ENABLE>    ",-200, 0,1, 1, 0, 0, 0,},
/*18.10*/{1,"VOL.DISC. BEFORE TAX (AFTER)>    ",-127, 0,1, 1, 0, 0, 0,},
/*18.11*/{1,"ENABLE DATA RADIO LINK>          ",-209, 0,1, 1, 0, 0, 0,},
/*18.12*/{1,"UNIT ID NUMBER>                  ", -1, 0,5, 0, 0, 0,
0,},
/*18.13*/{1,"METER ID NUMBER>                 ", -2, 0,5, 0, 0, 0,
0,},
/*18.14*/{1,"TRUCK ID NUMBER>                 ", -3, 0,5, 0, 0, 0,
0,},
/*18.15*/{0,"           GALLON                ", 0, 0,0, 0, 0, 0, 0,},
/*18.16*/{0,"           LITER                 ", 0, 0,0, 0, 0, 0, 0,},
/*18.17*/{1,"UNIT OF MEASURE: OTHER (#2)> LITRE", 0,-7,1, 8, 0, 0, 0 },
/*18.18*/{1,"UNIT OF MEASURE: OTHER (#3)> IMP.GAL.", 0,-7,1, 8, 0, 0, 0 },
/*18.19*/{0,"                                 ", 0,0,0,0,0,0,0,},
/*18.20*/{0,"                                 ", 0,0,0,0,0,0,0,},

/*M19 - emp calc. and continuance of 30..under M1-misc. transaction */
/*19.0 */{1,"** M19 - TEMP. VCF CALCULATOR ** ", 0,-1,0, 0, 0, 0, 0,},
/*19.1 */{1,"TEMP. VCF TABLE            548   ", 0,-1,0, 0, 0, 0,
0,},
/*19.2 */{1,"DENSITY                          ",-206, 6,0, 0, 0, 0, 0,},
/*19.3 */{1,"TEMP.°C>                         ",-207, 2,1,-1, 0, 8, 0,},
/*19.4 */{1,"VCF                              ",-208, 8,0, 0, 0, 0,
0,},
```

```
/*19.5 */{1,"STANDARDS INFORMATION:                ",  0,-1,0, 0, 0, 0,
0,},
/*19.6 */{1,"THE STANDARDS INFO GOES HERE...       ",  0,-1,0, 0, 0, 0,},
/*19.7 */{0,"     DATE TIME                        ",  0,-6,0, 0, 0, 0,
0,},
/*19.8 */{0,"MISC. TRANSACTION ACCESS #            ",-149, 0,0, 0, 0, 0,},
/*19.9 */{0,"TRANSACTION CODE                      ",-150, 0,0, 0, 0, 0,
0,},
/*19.10*/{0,"TICKET NUMBER                         ", -19, 0,0, 0, 0, 0,
0,},
/*19.11*/{0,"MISC. TRANSACTION NUMBER              ", -21, 0,0, 0, 0, 0,},
/*19.12*/{0,"PRODUCT CODE                          ", -99, 0,0, 0, 0, 0,
0,},
/*19.13*/{0,"UNIT ID NUMBER                        ",  -1, 0,0, 0, 0, 0,
0,},
/*19.14*/{0,"MISC. CHARGE - TAXABLE       $        ",-151,13,0, 0, 0, 0,},
/*19.15*/{0,"% TAX ON MISC. CHARGE        %        ",-152,14,0, 0, 0, 0,},
/*19.16*/{0,"MISC. CHARGE - NON-TAXABLE   $        ",-153,13,0, 0, 0, 0,},
/*19.17*/{0,"TOTAL CHARGE                 $        ",-143,13,0, 0, 0, 0,},
/*19.18*/{0,"PAYMENT RECEIVED             $        ",-154,13,0, 0, 0, 0,},
/*19.19*/{0,"CASH=1, CHECK=2,CREDIT CARD=3         ",-155, 0,0, 0, 0, 0,},
/*19.20*/{0,"UNMETERED TRANSACTION-VOLUME          ",-156,12,0, 0, 0, 0,
0,},

/*20.0 */{1,"** #20 - DATA RADIO LINK **           ",  0,-1,0, 0, 0, 0,},
/*20.1 */{0,"                                      ",  0,-1,0, 0, 0, 0,
0,},
/*20.2 */{0,"                                      ",  0,-1,0, 0, 0, 0,
0,},
/*20.3 */{0,"                                      ",  0,-1,0, 0, 0, 0,
0,},
/*20.4 */{0,"                                      ",  0,-1,0, 0, 0, 0,
0,},
/*20.5 */{0,"                                      ",  0,-1,0, 0, 0, 0,
0,},
/*20.6 */{0,"                                      ",  0,-1,0, 0, 0, 0,
0,},
/*20.7 */{0,"                                      ",  0,-1,0, 0, 0, 0,
0,},
/*20.8 */{0,"                                      ",  0,-1,0, 0, 0, 0,
0,},
/*20.9 */{0,"                                      ",  0,-1,0, 0, 0, 0,
0,},
/*20.10*/{0,"                                      ",  0,-1,0, 0, 0, 0,
0,},
/*20.11*/{0,"                                      ",  0,-1,0, 0, 0, 0,
0,},
/*20.12*/{0,"                                      ",  0,-1,0, 0, 0, 0,
0,},
/*20.13*/{0,"                                      ",  0,-1,0, 0, 0, 0,
0,},
/*20.14*/{0,"                                      ",  0,-1,0, 0, 0, 0,
0,},
/*20.15*/{0,"                                      ",  0,-1,0, 0, 0, 0,
0,},
/*20.16*/{0,"                                      ",  0,-1,0, 0, 0, 0,
0,},
/*20.17*/{0,"                                      ",  0,-1,0, 0, 0, 0,
0,},
/*20.18*/{0,"MESSAGE SENT TO BASE STATION. HIT ARROW", 0,-1,0, 0, 0, 0,},
/*20.19*/{1,"CLEAR OLD MESSAGES>                   ", -98, 0,1, 1, 0, 0, 0,},
/*20.20*/{1,"SEND MESSAGE>                         ",  0,-7,1,27, 0, 0, 0,},

/***** cotinuance of M3-TOTALIZERS #1***********/
/*21.0 */{1,"TOTAL UNMETERED TRANS VOLUME>         ", 48,12,1, 0, 0, 0, 0,},
/*21.1 */{1,"TOTAL GROSS NOT PRICED>               ", 49,12,1, 0, 0, 0, 0,},
/*21.2 */{1,"TOTAL NET NOT PRICED>                 ", 50,12,1, 0, 0, 0,
0,},
/*21.3 */{1,"KEY FOR M2>                           ", -22, 0,1, 0, 0, 0, 0,},
/*21.4 */{1,"KEY FOR M3>                           ", -23, 0,1, 0, 0, 0, 0,},
```

```
/*21.5  */{1,"KEY FOR M4>                       ", -24, 0,1, 0, 0, 0, 0,},
/*21.6  */{1,"KEY FOR M5>                       ", -25, 0,1, 0, 0, 0, 0,},
/*21.7  */{1,"KEY FOR M6>                       ", -26, 0,1, 0, 0, 0, 0,},
/*21.8  */{1,"KEY FOR M9>                       ", -27, 0,1, 0, 0, 0, 0,},
/*21.9  */{1,"KEY FOR M12>                      ", -28, 0,1, 0, 0, 0,
0,},
/*21.10*/{1,"KEY FOR M13>                       ", -29, 0,1, 0, 0, 0,
0,},
/*21.11*/{(1"KEY FOR M14>                       ", -30, 0,1, 0, 0, 0,
0,},
/*21.12*/{1,"KEY FOR M16>                       ",-124, 0,1, 0, 0, 0,
0,},
/*21.13*/{1,"KEY FOR M17>                       ", -31, 0,1, 0, 0, 0,
0,},
/*21.14*/{1,"KEY FOR M18>                       ", -32, 0,1, 0, 0, 0,
0,},
/*21.15*/{1,"KEY FOR M102>                      ",-125, 0,1, 0, 0, 0,
0,},
/*21.16*/{1,"DECIMAL PLACES--VOLUME>            ", -33, 0,1, 8, 0, 0, 0,},
/*21.17*/{1,"DECIMAL PLACES--PRICE>             ", -34, 0,1, 8, 0, 0,
0,},
/*21.18*/{1,"MAX. PRICE/UNIT INCL TAX>    $     ", -35,13,1, 0, 0, 0, 0,},
/*21.19*/{1,"RAM-CARD: READ RAM CPU DATA>       ", -98, 0,1, 1, 0, 0, 0,},
/*21.20*/{1,"RAM-CARD: WRITE RAM CPU DATA>      ", -98, 0,1, 1, 0, 0, 0,},

/** continuance of M13-TOTALIZERS PRINT LIST and Temp.tables Standards info**/
/*22.0  */{1,"TOTAL SALES INCL TAX     $        ", 45,13,0, 0, 0, 0, 0 },
/*22.1  */{1,"TOTAL MISC. CHARGES      $        ", 46,13,0, 0, 0, 0,
0 },
/*22.2  */{1,"TOTAL PAYMENT RECEIVED   $        ", 47,13,0, 0, 0, 0, 0 },
/*22.3  */{1,"TOTAL UNMETERED TRANS VOLUME      ", 48,12,0, 0, 0, 0, 0 },
/*22.4  */{1,"TOTAL GROSS NOT PRICED            ", 49,12,0, 0, 0, 0,
0 },
/*22.5  */{1,"TOTAL NET NOT PRICED              ", 50,12,0, 0, 0, 0,
0 },
/*22.6  */{0,"NONE                              ",  0,-1,0, 0, 0, 0, 0 },
/*22.7  */{0,"NONE                              ",  0,-1,0, 0, 0, 0, 0 },
/*22.8  */{0,"ASTM: D1250-80 API:2540 IP:200    ",  0,-1,0, 0, 0, 0, 0 },
/*22.9  */{0,"ASTM: D1250-80 API:2540 IP:200    ",  0,-1,0, 0, 0, 0, 0 },
/*22.10*/{0,"ASTM: D1250-80 API:2540 IP:200     ",  0,-1,0, 0, 0, 0, 0 },
/*22.11*/{0,"ASTM: D1250-80 API:2540 IP:200     ",  0,-1,0, 0, 0, 0, 0 },
/*22.12*/{0,"ASTM: D1250-80 API:2540 IP:200     ",  0,-1,0, 0, 0, 0, 0 },
/*22.13*/{0,"ASTM: D1250-80 API:2540 IP:200     ",  0,-1,0, 0, 0, 0, 0 },
/*22.14*/{0,"LEGAL METROLOGY BUREAU, CANADA 90-02-06 ", 0,-1,0, 0, 0, 0, 0 },
/*22.15*/{0,"ASTM IP TABLE-24                   ",  0,-1,0, 0, 0, 0, 0
},
/*22.16*/{0,"ASTM IP TABLE-54                   ",  0,-1,0, 0, 0, 0, 0
},
/*22.17*/{0,"CONFIRM PRODUCT CODE>              ", -98, 0,1, 0, 0, 0,
0 },
/*22.18*/{0,"ENTER KEY>                         ",-126, 0,1, 0, 0, 0, 0 },
/*22.19*/{0,"CURRENT BALANCE DUE      $         ",-143,-9,0, 0, 0, 0, 0 },
/*22.20*/{0,"TANK IND LINE..                    ",  0,-8,0, 0, 0, 0, 0 }, /* PRINTE OUTPUT OF DELIVERY--M1 TICKET **/
/*23.0  */{1,"START                             ",  0,-1,0, 0, 0, 0, 0
},
/*23.1  */{1,"FINISH                            ",  0,-1,0, 0, 0, 0, 0
},
/*23.2  */{1,"                                  ",  0,-1,0, 0, 0, 0, 0
},
/*23.3  */{0,"ACCOUNT NAME                      ",  0,-1,0, 0, 0, 0, 0
},
/*23.4  */{0,"ACCOUNT ADDRESS                   ",  0,-1,0, 0, 0, 0, 0
},
/*23.5  */{0,"ACCOUNT CITY STATE ZIP            ",  0,-1,0, 0, 0, 0, 0
},
/*23.6  */{1,"ACCESS # - UNSCHEDULED            ",-129, 0,0, 0, 0, 0,
0 },
/*23.7  */{0,"ACCOUNT NUMBER                    ",  0,-1,0, 0, 0, 0, 0
},
```

- 60 -

```
/*23.8 */{1."                                    ", 0,-1,0, 0, 0, 0, 0
},
/*23.9 */{1,"NET VOL. GALLONS: START             ", 0,12,0, 0,12, 0, 0 },
/*23.10*/{1,"NET VOL. GALLONS: FINISH            ", 1,12,0, 0,12, 0, 0 },
/*23.11*/{0,"TEMP. THIS DELIVERY  °C             ",-195, 2,0, 0, 0,23,
0 },
/*23.12*/{0,"TEMP. CORRECTED TO BASE TEMP        ", 79, 2,0, 0, 0, 0, 0 },
/*23.13*/{1,"TICKET NUMBER                       ", -19, 0,0, 0, 0, 0,
0 }
/*23.14*/{1,"SALE NUMBER                         ", -20, 0,0, 0, 0, 0, 0 },
/*23.15*/{0,"DRIVER NUMBER                       ", -36, 0,0, 0, 0, 0,
0 },
/*23.16*/{1,"PRODUCT CODE                        ", -99, 0,0, 0, 0, 0,
0 },
/*23.17*/{0,"PRODUCT DESCRIPTION                 ", 0,-1,0, 0, 0, 0, 0 },
/*23.18*/{0,"END USE CODE                        ", 28, 0,0, 0, 0, 0,
0 },
/*23.19*/{0,"ODOMETER START                      ",-128, 2,0, 0, 0, 0,
0 },
/*23.20*/{0,"ODOMETER CHANGE                     ", -45, 2,0, 0, 0, 0,
0 },

/* CONT.f MODE 10-PRINT SHIFT T. and ALSO...MISC. TRANSACTION MENU-M1 */
/*24.0 */{0,"TOTAL GROSS VOLUME                  ", 33,12,0, 1, 0, 0, 0 },
/*24.1 */{0,"ODOMETER START OF SHIFT             ", 71, 2,0, 1, 0, 0, 0 },
/*24.2 */{0,"ODOMETER END OF SHIFT               ", 60, 2,0, 1, 0, 0,
0 },
/*24.3 */{0,"S* TOTAL MILES DRIVEN               ", 53, 2,0, 1, 0,
0,10 },
/*24.4 */{0,"S* NUMBER OF DELIVERIES             ", 52, 0,0, 1, 0, 0, 0 },
/*24.5 */{0,"S* TOTALIZER NET VOLUME             ", 51,12,0, 1, 0, 0, 0 },
/*24.6 */{0,"S* TOTALIZER GROSS VOLUME           ", 9,12,0, 1, 0, 0, 0 },
/*24.7 */{0,"S* TOTAL SALES NO TAX               ", 8,13,0, 1, 0, 0, 0
},
/*24.8 */{0,"S* TTL TAX % CAT 1                  ", 7,13,0, 1,-1,-8,-30},
/*24.9 */{0,"S* TTL TAX/UNIT CAT 1               ", 10,13,0,
1,-2,-8,-30},
/*24.10*/{0,"S* TTL TAX % CAT 2                  ", 13,13,0, 1,-3,-8,-30},
/*24.11*/{0,"S* TTL TAX/UNIT CAT 2               ", 58,13,0,
1,-4,-8,-30},
/*24.12*/{0,"S* TTL TAX ON SUB + 1&2             ", 29,13,0, 1,-5,-8,-30},
/*24.13*/{0,"S* TTL TAX % CAT 3                  ", 30,13,0, 1,-6,-8,-30},
/*24.14*/{0,"S* TTL TAX/UNIT CAT 3               ", 14,13,0,
1,-7,-8,-30},
/*24.15*/{0,"S* TTL TAX % CAT 4                  ", 31,13,0, 1,-8,-8,-30},
/*24.16*/{0,"S* TTL TAX/UNIT CAT 4               ", 73,13,0,
1,-9,-8,-30},
/*24.17*/{0,"S* GRAND TOTAL TAX                  ", 59,13,0, 1, 0, 0, 0 },
/*24.18*/{1,"MISC. CHARGE-NON-TAXABLE>    $      ",-153,13,1, 0, 0, 0, 0 },
/*24.19*/{1,"PAYMENT RECEIVED>                   ",-154,13,1, 0, 0, 0, 0 },
/*24.20*/{1,"CASH=1,CHECK=2,CREDIT CARD=3>       ",-155, 0,1, 4, 0, 0, 0 }, /* CONT.f MODE 17-PRODUCT SETUP and...continuance of 31...M1 print--DELIVERY]prCKET.*/
/*25.0 */{1,"PRODUCT CAT. 7 METER>               ", -66, 0,1, 3, 0, 0,
0 },
/*25.1 */{1,"PRODUCT CAT. 8 CODE>                ", -56, 0,7, 0, 0, 0,
0 },
/*25.2 */{1,"PRODUCT CAT. 8 NAME>                ", -77,-3,1,10, 0, 0,
0 },
/*25.3 */{1,"PRODUCT CAT. 8 METER>               ", -67, 0,1, 3, 0, 0,
0 },
/*25.4 */{1,"PRODUCT CAT. 9 CODE>                ", -57, 0,7, 0, 0, 0,
0 },
/*25.5 */{1,"PRODUCT CAT. 9 NAME>                ", -78,-3,1,10, 0, 0,
0 },
/*25.6 */{1,"PRODUCT CAT. 9 METER>               ", -68, 0,1, 3, 0, 0,
0 },
/*25.7 */{1,"PRODUCT CAT. 10 CODE>               ", -58, 0,7, 0, 0, 0,
0 },
/*25.8 */{1,"PRODUCT CAT. 10 NAME>               ", -79,-3,1,10, 0, 0,
0 },
```

```
/*25.9 */{1,"PRODUCT CAT. 10 METER>           ", -69, 0,1, 3, 0, 0,
0 },
/*25.10*/{0,"GRAND TOTAL DUE           $      ",-145,13,0, 0, 0, 0,
0 },
/*25.11*/{0,"PAYMENT RECEIVED          $      ",-154,13,0, 0, 0, 0,
0 },
/*25.12*/{0,"CASH=1,CHECK=2,CREDIT CARD=3     ",-155, 0,0, 0, 0, 0, 0 },
/*25.13*/{0,"BALANCE DUE               $      ",-143,13,0, 0, 0, 0, 0 },
/*25.14*/{0,"CREDIT BALANCE            $      ",-143,13,0, 0, 0, 0, 0 },
/*25.15*/{0,"BEFORE / / --DISCOUNTED TO       ",-146,13,0, 0, 0, 0, 0 },
/*25.16*/{0,"AFTER  / / --PENALTY ADDED       ",-146,13,0, 0, 0, 0,
0 },
/*25.17*/{0,"                                  ", 0,-1,0, 0, 0, 0, 0
},
/*25.18*/{0,"                                  ", 0,-1,0, 0, 0, 0, 0
},
/*25.19*/{0,"BUDGET - NO PAYMENT DUE          ", 0,-1,0, 0, 0, 0, 0 },
/*25.20*/{0,"                                  ", 0,-1,0, 0, 0, 0, 0
},

/* CONT o MODE 8-identification **/
/*26.0 */{1,"PROD. 3 TEMP. COMP. CODE         ",-102,-10,0,0, 0, 0, 0 },
/*26.1 */{1,"PRODUCT CAT. 4 CODE              ", -52, 0,0, 0, 0, 0, 0 },
/*26.2 */{1,"PRODUCT CAT. 4 NAME              ", -73,-3,0, 0, 0, 0, 0 },
/*26.3 */{1,"PRODUCT CAT. 4 METER             ", -63, 0,0, 0, 0, 0,
0 },
/*26.4 */{1,"PRODUCT CAT. 4 DENSITY           ", -87, 6,0, 0, 0, 0,
0 },
/*26.5 */{1 ,"PROD. 4 TEMP. COMP. CODE        ",-103,-10,0,0, 0, 0, 0 },
/*26.6 */{1,"PRODUCT CAT. 5 CODE              ", -53, 0,0, 0, 0, 0, 0 },
/*26.7 */{1,"PRODUCT CAT. 5 NAME              ", -74,-3,0, 0, 0, 0, 0 },
/*26.8 */{1,"PRODUCT CAT. 5 METER             ", -64, 0,0, 0, 0, 0,
0 },
/*26.9 */{1,"PRODUCT CAT. 5 DENSITY           ", -88, 6,0, 0, 0, 0,
0 },
/*26.10*/{1,"PROD. 5 TEMP. COMP. CODE         ",-104,-10,0,0, 0, 0, 0 },
/*26.11*/{1,"PRODUCT CAT. 6 CODE              ", -54, 0,0, 0, 0, 0, 0 },
/*26.12*/{1,"PRODUCT CAT. 6 NAME              ", -75,-3,0, 0, 0, 0, 0 },
/*26.13*/{1,"PRODUCT CAT. 6 METER             ", -65, 0,0, 0, 0, 0,
0 },
/*26.14*/{1,"PRODUCT CAT. 6 DENSITY           ", -89, 6,0, 0, 0, 0,
0 },
/*26.15*/{1,"PROD. 6 TEMP. COMP. CODE         ",-105,-10,0,0, 0, 0, 0 },
/*26.16*/{1,"PRODUCT CAT. 7 CODE              ", -55, 0,0, 0, 0, 0, 0 },
/*26.17*/{1,"PRODUCT CAT. 7 NAME              ", -76,-3,0, 0, 0, 0, 0 },
/*26.18*/{1,"PRODUCT CAT. 7 METER             ", -66, 0,0, 0, 0, 0,
0 },
/*26.19*/{1,"PRODUCT CAT. 7 DENSITY           ", -90, 6,0, 0, 0, 0,
0 },
/*26.20*/{1,"PROD. 7 TEMP. COMP. CODE         ",-106,-10,0,0, 0, 0, 0 }, /* CONT.f MODE 8-identification #2 and CONT. of Shift print #2**/
/*27.0 */{1,"PRODUCT CAT. 8 CODE              ", -56, 0,0, 0, 0, 0, 0 },
/*27.1 */{1,"PRODUCT CAT. 8 NAME              ", -77,-3,0, 0, 0, 0, 0 },
/*27.2 */{1,"PRODUCT CAT. 8 METER             ", -67, 0,0, 0, 0, 0,
0 },
/*27.3 */{1,"PRODUCT CAT. 8 DENSITY           ", -91, 6,0, 0, 0, 0,
0 },
/*27.4 */{1,"PROD. 8 TEMP. COMP. CODE         ",-107,-10,0,0, 0, 0, 0 },
/*27.5 */{1,"PRODUCT CAT. 9 CODE              ", -57, 0,0, 0, 0, 0, 0 },
/*27.6 */{1,"PRODUCT CAT. 9 NAME              ", -78,-3,0, 0, 0, 0, 0 },
/*27.7 */{1,"PRODUCT CAT. 9 METER             ", -68, 0,0, 0, 0, 0,
0 },
/*27.8 */{1,"PRODUCT CAT. 9 DENSITY           ", -92, 6,0, 0, 0, 0,
0 },
/*27.9 */{1,"PROD. 9 TEMP. COMP. CODE         ",-108,-10,0,0, 0, 0, 0 },
/*27.10*/{1,"PRODUCT CAT. 10 CODE             ", -58, 0,0, 0, 0, 0,
0 },
/*27.11*/{1,"PRODUCT CAT. 10 NAME             ", -79,-3,0, 0, 0, 0,
0 },
```

```
/*27.12*/{1,"PRODUCT CAT. 10 METER           ", -69, 0,0, 0, 0, 0,
0 },
/*27.13*/{1,"PRODUCT CAT. 10 DENSITY         ", -93, 6,0, 0, 0, 0, 0 },
/*27.14*/{1,"PROD. 10 TEMP. COMP. CODE       ",-109,-10,0,0, 0, 0, 0 },
/*27.15*/{0,"S* TOTAL SALES INCL. TAX        ", 74,13,0, 1, 0, 0, 0 },
/*27.16*/{0,"S* TOTAL MISC. CHARGES          ", 72,13,0, 1, 0, 0,
0 },
/*27.17*/{0,"S* TOTAL PAYMENT RECEIVED       ", 12,13,0, 1, 0, 0, 0 },
/*27.18*/{0,"S* TOTAL UNMETERED TRANS-VOL    ", 81,12,0, 1, 0, 0,
0 },
/*27.19*/{0,"S* TOTAL GROSS VOL NOT PRICED   ", 57,12,0, 1, 0, 0, 0 },
/*27.20*/{0,"S* TOTAL NET VOL NOT PRICED     ", 54,12,0, 1, 0, 0, 0 },

/* CONT.f MODE 18-SYSTEM SETUP #1 */
/*28.0 */{0,"                                ", 0, 0, 0, 0, 0, 0,
0 },
/*28.1 */{0,"                                ", 0, 0, 0, 0, 0, 0,
0 },
/*28.2 */{0,"                                ", 0, 0, 0, 0, 0, 0,
0 },
/*28.3 */{0,"                                ", 0, 0, 0, 0, 0, 0,
0 },
/*28.4 */{0,"                                ", 0, 0, 0, 0, 0, 0,
0 },
/*28.5 */{1,"TANK IND.>TANK FULL___ NOT FULL___", 0,-7,1,30, 0, 0, 0 },
/*28.6 */{1,"TAX LABEL 1>% TAX - CATEGORY 1    ", 0,-7,1,28, 0, 0, 0 },
/*28.7 */{1,"TAX LABEL 2>TAX PER UNIT - CATEGORY 1", 0,-7,1,28, 0, 0, 0 },
/*28.8 */{1,"TAX LABEL 3>%TAX - CATEGORY 2     ", 0,-7,1,28, 0, 0, 0 },
/*28.9 */{1,"TAX LABEL 4>TAX PER UNIT - CATEGORY 2", 0,-7,1,28, 0, 0, 0 },
/*28.10*/{1,"TAX LABEL 5>% TAX - CAT 1&2 SUBTTL+TAX", 0,-7,1,28, 0, 0, 0 },
/*28.11*/{1,"TAX LABEL 6>% TAX - CATEGORY 3    ", 0,-7,1,28, 0, 0, 0 },
/*28.12*/{1,"TAX LABEL 7>TAX PER UNIT - CATEGORY 3", 0,-7,1,28, 0, 0, 0 },
/*28.13*/{1,"TAX LABEL 8>% TAX - CATEGORY 4    ", 0,-7,1,28, 0, 0, 0 },
/*28.14*/{1,"TAX LABEL 9>TAX PER UNIT - CATEGORY 4", 0,-7,1,28, 0, 0, 0 },
/*28.15*/{1,"** HEADER #1 **                 ", 0,-1,0, 0, 0, 0, 0 },
/*28.16*/{1,"********************            ", 0,-7,1,40,0,0,0},
/*28.17*/{1,"* LIQUID CONTROLS CORP.       * ", 0,-7,1,40, 0, 0, 0 },
/*28.18*/{1,"* 105 ALBRECHT DR.            * ", 0,-7,1,40, 0, 0, 0 },
/*28.19*/{1,"* LAKE BLUFF, IL              * ", 0,-7,1,40, 0, 0, 0 },
/*28.20*/{1,"* 60044                       * ", 0,-7,1,40, 0, 0, 0 },

/* CONT.fMODE 18-SYSTEM SETUP #2 */
/*29.0 */{1,"*   800-458-5262              * ", 0,-7,1,40, 0, 0, 0
},
/*29.1 */{1,"********************            ", 0,-7,1,40,0,0,0},
/*29.2 */{1,"** HEADER #2 **                 ", 0,-1,0, 0, 0, 0, 0 },
/*29.3 */{1,"********************            ", 0,-7,1,40,0,0,0},
/*29.4 */{1,"* LIQUID CONTROLS CORP.       * ", 0,-7,1,40, 0, 0, 0 },
/*29.5 */{1,"* 105 ALBRECHT DR.            * ", 0,-7,1,40, 0, 0, 0 },
/*29.6 */{1,"* LAKE BLUFF, IL              * ", 0,-7,1,40, 0, 0, 0 },
/*29.7 */{1,"* 60044                       * ", 0,-7,1,40, 0, 0, 0
},
/*29.8 */{1,"* 800-458-5262                * ", 0,-7,1,40, 0, 0, 0
},
/*29.9 */{1,"********************            ", 0,-7,1,40,0,0,0},
/*29.10*/{1,"** HEADER #3 **                 ", 0,-1,0, 0, 0, 0, 0 },
/*29.11*/{1,"********************            ", 0,-7,1,40,0,0,0},
/*29.12*/{1,"* LIQUID CONTROLS CORP.       * ", 0,-7,1,40, 0, 0, 0 },
/*29.13*/{1,"* 105 ALBRECHT DR.            * ", 0,-7,1,40, 0, 0, 0 },
/*29.14*/{1,"* LAKE BLUFF, IL              * ", 0,-7,1,40, 0, 0, 0 },
/*29.15*/{1,"* 60044                       * ", 0,-7,1,40, 0, 0, 0 },
/*29.16*/{1,"* 800-458-5262                * ", 0,-7,1,40, 0, 0, 0
},
/*29.17*/{1,"********************            ", 0,-7,1,40,0,0,0},
/*29.18*/{1,"** HEADER #4 **                 ", 0,-1,0, 0, 0, 0, 0 },
/*29.19*/{1,"********************            ", 0,-7,1,40,0,0,0},
/*29.20*/{1,"* LIQUID CONTROLS CORP.       * ", 0,-7,1,40, 0, 0, 0 },

/* MISC. RANSACTIONS--UNDER M1 and continuance of 23...M1-delivery print **/
/*30.0 */{1,"TRANSACTION CODE>               ",-150, 0,1, 0, 0, 0, 0 },
/*30.1 */{1,"MISC. CHARGE - TAXABLE>      $  ",-151,13,1, 0, 0, 0, 0 },
```

```
/*30.2 */{1,"% TAX ON MISC. CHARGE>      %            ",-152,14,1, 0, 0, 0, 0 },
/*30.3 */{1,"MISC. CHARGE - NON-TAXABLE>  $              ",-153,13,1, 0, 0, 0,
0 },
/*30.4 */{1,"PAYMENT RECEIVED>            $            ",-154,13,1, 0, 0, 0, 0 },
/*30.5 */{1,"CASH=1,CHECK=2,CREDIT CARD=3>              ",-155, 0,1, 4, 0, 0, 0 },
/*30.6 */{1,"UNMETERED TRANS-VOLUME>                    ",-156,12,1, 0, 0, 0, 0 },
/*30.7 */{0,"                                            ", 0,-1,0, 0, 0, 0, 0
},
/*30.8 */{0,"                                           ", 0,-1,0, 0, 0, 0, 0
},
/*30.9 */{0,"                                            ", 0,0,0,0,0,0,0},
/*30.10*/{0,"NUMBER OF CYLINDERS>                       ",-130, 0,1, 0, 0, 0,
0 },
/*30.11*/{0,"NUMBER OF CYLINDERS                        ",-130, 0,0, 0, 0, 0, 0 },
/*30.12*/{0,"PRICE PER GALLON             $             ", 15,14,0, 0,11, 0,
0 },
/*30.13*/{0,"PRICE PER CYLINDER           $             ", 27,14,0, 0, 0, 0, 0 },
/*30.14*/{0,"CUSTOMER DISCOUNT            $             ",-131,14,0, 0, 0, 0, 0 },
/*30.15*/{0,"NET PRICE/ GALLON            $             ",-132,14,0,0,11,0,0},
/*30.16*/{0,"VOLUME DISCOUNT              $             ",-133,13,0, 0, 0, 0,
0 },
/*30.17*/{0,"SUBTOTAL                     $             ",-141,13,0, 0, 0, 0,
0 },
/*30.18*/{0,"% TAX - CATEGORY 1           %             ", 16,14,0, 0,-1,-1,-28},
/*30.19*/{0,"TAX PER UNIT - CATEGORY 1    $             ", 17,14,0, 0,-2,-1,-28},
/*30.20*/{0,"TOTAL TAX CATEGORY 1         $             ",-134,13,0, 0, 0, 0,
0 },
/* PRESETMENU and...continuance of 30...M1 print--DELIVERY TICKET.*/
/*31.0 */{1,"PUSH START, PRINT OR DOWN TO PRESET ", 0,-1,0, 0, 0, 0, 0 },
/*31.1 */{1,"NET VOLUME GALLONS                         ", 1,12,0, 0,14, 0, 0 },
/*31.2 */{1,"PRESET NET>                                ", 3,12,1, 0, 0, 0, 0
},
/*31.3 */{1,"PRESET GROSS>                              ", 4,12,1, 0, 0, 0, 0
},
/*31.4 */{1,"PRESET PRICE>                $             ", 5,13,1, 0, 0, 0, 0
},
/*31.5 */{0,"% TAX - CATEGORY 2           %             ", 18,14,0, 0,-3,-1,-28},
/*31.6 */{0,"TAX PER UNIT-CATEGORY 2      $             ", 19,14,0,0,-4,-1,-28},
/*31.7 */{0,"TOTAL TAX CATEGORY 2         $             ",-135,13,0, 0, 0, 0,
0 },
/*31.8 */{0,"% TAX - SUB TTL+TAX CAT 1&2  %             ", 20,14,0,
0,-5,-1,-28},
/*31.9 */{0,"TOTAL TAX CATEGORY SUB+1&2   $             ",-136,13,0, 0, 0, 0, 0 },
/*31.10*/{0,"% TAX - CATEGORY 3           %             ", 21,14,0, 0,-6,-1,-28},
/*31.11*/{0,"TAX PER UNIT-CATEGORY 3      $             ", 22,14,0,0,-7,-1,-28},
/*31.12*/{0,"TOTAL TAX CATEGORY 3         $             ",-137,13,0, 0, 0, 0,
0 },
/*31.13*/{0,"% TAX - CATEGORY 4           %             ", 23,14,0, 0,-8,-1,-28},
/*31.14*/{0,"TAX PER UNIT - CATEGORY 4    $             ", 24,14,0, 0,-9,-1,-28},
/*31.15*/{0,"TOTAL TAX CATEGORY 4         $             ",-138,13,0, 0, 0, 0,
0 },
/*31.16*/{0,"TAX THIS DELIVERY            $             ",-139,13,0, 0, 0, 0, 0 },
/*31.17*/{0,"PRICE INCLUDING TAX          $             ",-140,13,0, 0, 0, 0,
0 },
/*31.18*/{0,"VOLUME DISCOUNT              $             ",-133,13,0, 0, 0, 0,
0 },
/*31.19*/{0,"MISC. CHARGE - NON-TAXABLE   $             ",-153,13,0, 0, 0, 0, 0 },
/*31.20*/{0,"PREVIOUS BALANCE             $             ",-144,13,0, 0, 0, 0,
0 },
/* CONT.f MODE 18-SYSTEM SETUP #3 */
/*32.0 */{1,"* 105 ALBRECHT DR.           *             ", 0,-7,1,40, 0, 0, 0 },
/*32.1 */{1,"* LAKE BLUFF, IL             *             ", 0,-7,1,40, 0, 0, 0 },
/*32.2 */{1,"* 60044                      *             ", 0,-7,1,40, 0, 0, 0 },
/*32.3 */{1,"* 800-458-5262               *             ", 0,-7,1,40, 0, 0, 0 },
/*32.4 */{1,"*******************                        ", 0,-7,1,40,0,0,0},
/*32.5 */{1,"** HEADER #5 **                            ", 0,-1,0, 0, 0, 0, 0 },
/*32.6 */{1,"*******************                        ", 0,-7,1,40,0,0,0},
/*32.7 */{1,"* LIQUID CONTROLS CORP.      *             ", 0,-7,1,40, 0, 0, 0 },
/*32.8 */{1,"* 105 ALBRECHTDR.            *             ", 0,-7,1,40, 0, 0, 0 },
```

```
/*32.9  */{1,"* LAKE BLUFF, IL            *              ", 0,-7,1,40, 0, 0, 0 },
/*32.10*/{1,"* 60044                                      ", 0,-7,1,40, 0, 0, 0 },
/*32.11*/{1,"* 800-458-5262               *              ", 0,-7,1,40, 0, 0, 0
},
/*32.12*/{1,"*******************                          ", 0,-7,1,40,0,0,0},
/*32.13*/{1,"** HEADER #6 **                             ", 0,-1,0, 0, 0, 0,0},
/*32.14*/{1,"*******************                          ", 0,-7,1,40,0,0,0}.
/*32.15*/{1,"* LIQUID CONTROLS CORP.      *              ", 0,-7,1,40, 0, 0, 0 },
/*32.16*/{1,"* 105 ALBRECHTOR.            *              ", 0,-7,1,40, 0, 0, 0 },
/*32.17*/{1,"* LAKE BLUFF, IL             *              ", 0,-7,1,40, 0, 0, 0 },
/*32.18*/{1,"* 60044                                      ", 0,-7,1,40, 0, 0, 0 },
/*32.19*/{1,"* 800-458-5262               *              ", 0,-7,1,40, 0, 0, 0
},
/*32.20*/{1,"*******************                          ", 0,-7,1,40,0,0,0},

/* CONT.f MODE 5-ENABLES and of product shift times #2*/
/*33.0 */{1,"DISABLE RAM-CARD>                           ",-204, 0,1, 1, 0, 0, 0 },
/*33.1 */{1,"ENABLE DEMO PROVER MODE>                    ",-215, 0,1, 1, 0, 0, 0 },
/*33.2 */{0,"                                             ", 0, 0,0, 0, 0, 0, 0
},
/*33.3 */{0,"                                             ", 0, 0,0, 0, 0, 0, 0
},
/*33.4 */{0,"                                             ", 0, 0,0, 0, 0, 0, 0
},
/*33.5 */{0," RECORDS SENT BY RF-LINK. HIT ARROW ", 0,-1,0, 0, 0, 0, 0 },
/*33.6 */{1,"UPLOAD RECORDS TO BASE RADIO>               ", -98, 0,1, 1, 0, 0, 0 },
/*33.7 */{0," RECS WRITEN TO RAM-CARD. HIT ARROW ", 0,-1,0, 0, 0, 0, 0 },
/*33.8 */{0,"RAM-CARD NOT ACTIVE. INSERT RAM-CARD.       ", 0,-1,0, 0, 0, 0, 0 },
/*33.9 */{1,"RE-WRITE RAM RECS TO RAM-CARD>              ", -98, 0,1, 1, 0, 0, 0 },
/*33.10*/{0,"LOADING RAM-CARD RECORDS..                  ", 0,-1,0, 0, 0, 0, 0 },
/*33.11*/{0,"BEGIN SHIFT: 00/00/00    00:00:00           ", 0,-1,0, 0, 0, 0, 0
},
/*33.12*/{0,"END SHIFT:   00/00/00    00:00:00           ", 0,-1,0, 0, 0, 0, 0
},
/*33.13*/{0,"BEGIN SHIFT: 00/00/00    00:00:00           ", 0,-1,0, 0, 0, 0, 0
},
/*33.14*/{0,"END SHIFT:   00/00/00    00:00:00           ", 0,-1,0, 0, 0, 0, 0
},
/*33.15*/{0,"BEGIN SHIFT: 00/00/00    00:00:00           ", 0,-1,0, 0, 0, 0, 0
},
/*33.16*/{0,"END SHIFT:   00/00/00    00:00:00           ", 0,-1,0, 0, 0, 0, 0
},
/*33.17*/{0,"BEGIN SHIFT: 00/00/00    00:00:00           ", 0,-1,0, 0, 0, 0, 0
},
/*33.18*/{0,"END SHIFT:   00/00/00    00:00:00           ", 0,-1,0, 0, 0, 0, 0
},
/*33.19*/{0,"BEGIN SHIFT: 00/00/00    00:00:00           ", 0,-1,0, 0, 0, 0, 0
},
/*33.20*/{0,"END SHIFT:   00/00/00    00:00:00           ", 0,-1,0, 0, 0, 0, 0
},
};

struct MenuItems ProvMenu[] =     /* I P C R M    D O */
}
/*P.0  */{0,"LAST PROVE:                                 ", 0,-4,0,
0, 0, 0, 1 },
/*P.1  */{0,"PROVER PRINT NUMBER                         ",-115, 0,0, 0, 0, 0, 1 },
/*P.2  */{1,"PRODUCT CODE                                ", -99, 0,0, 0, 0, 0, 1 },
/*P.3  */{1,"PROVER ID>                                  ", 55, 0,6, 0, 0, 0,
1 },
/*P.4  */{1,"UNITS: 0=GAL;1=LITR;2,3=OTHER>              ", 56, 0,6, 4, 0, 0, 1 },
/*P.5  */{1,"GROSS VOLUME GALLONS>                       ", -82,12,1, 0,14, 0, 1 },
/*P.6  */{1,"NET VOLUME GALLONS>                         ", -83,12,1, 0,12, 0, 1 },
/*P.7  */{0,"PROVER                                      ", 0,-1,0, 0, 0, 0, 0
},
/*P.8  */{1,"DENSITY OR COEFICENT         >              ", 0, 6,6, 0, 0, 0, 1
},
/*P.9  */{1,"BASE TEMP.                                  ", 79, 2,0,
0, 0, 0, 1 },
/*P.10*/{1,"MEAN TEMP. VCF                               ", 78, 8,0, 0, 0, 0, 1 },
/*P.11*/{1,"MEAN TEMP. THIS DELIVERY °C                  ",-195, 2,0, 0, 0,27, 1 },
```

- 65 -

```
/*P.12*/{1,"TEMP. UNCORRECTED °C              ",-157, 2.0, 0, 0.21, 1 },
/*P.13*/{1,"TEMP. CORRECTED °C                ",-158, 2.0, 0, 0.20, 1 },
/*P.14*/{1,"TEMP. OFFSET-DEG °C>              ",-120, 2.6,-1, 0.20, 1 },
/*P.15*/{1,"MAX. FLOW RATE EVER               ",-222, 4.0, 0, 0, 0, 1 },
/*P.16*/{1,"MAX. FLOW RATE LAST DELIVERY      ",-223, 4.0, 0, 0, 0, 1 },
/*P.17*/{1,"MAX. FLOW RATE--COMP. TABLE>      ",  84, 4.6, 0, 0, 0, 1 },
/*P.18*/{1,"ALLOWABLE % CHANGE>               ",  85, 3.1, 0, 0, 0, 1 },
/*P.19*/{1,"PULSES/UNIT VOLUME>               ",  86,12.6, 0, 0, 0, 1 },
/*P.20*/{1,"%ERROR F.RATE 1        CHANGE-- > ",  87, 5.6,-1, 0, 0, 1 },
/*P.21*/{1,"%ERROR F.RATE 2            %CH 9.99+ >     ",  88, 5.6,-1, 0, 0, 1 },
/*P.22*/{1,"%ERROR F.RATE 3            %CH 9.99+ >     ",  89, 5.6,-1, 0, 0, 1 },
/*P.23*/{1,"%ERROR F.RATE 4            %CH 9.99+ >     ",  90, 5.6,-1, 0, 0, 1 },
/*P.24*/{1,"%ERROR F.RATE 5            %CH 9.99+ >     ",  91, 5.6,-1, 0, 0, 1 },
/*P.25*/{1,"%ERROR F.RATE 6            %CH 9.99+ >     ",  92, 5.6,-1, 0, 0, 1 },
/*P.26*/{1,"%ERROR F.RATE 7            %CH 9.99+ >     ",  93, 5.6,-1, 0, 0, 1 },
/*P.27*/{1,"%ERROR F.RATE 8            %CH 9.99+ >     ",  94, 5.6,-1, 0, 0, 1 },
/*P.28*/{1,"%ERROR F.RATE 9            %CH 9.99+ >     ",  95, 5.6,-1, 0, 0, 1 },
/*P.29*/{1,"%ERROR F.RATE 10           %CH 9.99+ >     ",  96, 5.6,-1, 0, 0, 1 },
/*P.30*/{1,"FIRST STAGE CLOSURE>              ",  -6,12.4, 0, 0, 0, 1 },
/*P.31*/{1,"HIGH FLOW (% OF MAX. FLOW)>    %  ",  -7, 1.4,100,0, 0, 1 },
/*P.32*/{1,"LOW FLOW (%OF MAX. FLOW)>      %  ", -44, 1.4,100,0,0, 1 },
/*P.33*/{1,"DEAD BAND(%OF MAX. FLOW)>      %  ",-113, 1.4,100,0,0, 1 },
/*P.34*/{1,"NOMINAL OPEN TIME (IN 5 MSEC)>    ", -59, 0.4, 0, 0, 0, 1 },
/*P.35*/{1,"NOMINAL CLOSE TIME (5 MSEC)>      ",-112, 0.4, 0, 0, 0, 1 },
/*P.36*/{1,"FAST OPEN TIME (IN 5 MSEC)>       ", -94, 0.4, 0, 0, 0, 1 },
/*P.37*/{1,"FAST CLOSE TIME (IN 5 MSEC)>      ",  -4, 0.4, 0, 0, 0, 1 },
/*P.38*/{1,"MAX. PULSER REVERSALS>            ",  -5, 0.3, 0, 0, 0, 1 },
/*P.39*/{1,"MAX. PRESET VOLUME>               ",-114,12.4, 0, 0, 0, 1 },
/*P.40*/{1,"THROTTLE CONTROL VOLUME>          ",-119,12.1, 0, 0, 0, 1 },
/*P.41*/{1,"UNIT ID NUMBER>                   ",  -1, 0.5, 0, 0, 0, 1 },
/*P.42*/{1,"METER ID NUMBER>                  ",  -2, 0.5, 0, 0, 0, 1 },
/*P.43*/{1,"TRUCK ID NUMBER>                  ",  -3, 0.5, 0, 0, 0, 1 },
/*P.44*/{1,"ENABLE MULTI-PT. CALIBRATION>     ", -81, 0.1, 1, 0, 0, 0 },
/*P.45*/{1,"RAM-CARD: READ RAM CPU DATA>      ", -98, 0.1, 1, 0, 0, 0 },
/*P.46*/{1,"RAM-CARD: WRITE RAM CPU DATA>     ", -98, 0.1, 1, 0, 0, 0 },
/*P.47*/{1,"CLEAR %ERROR VALUES>              ", -98, 0.1, 1, 0, 0, 0 },
/*P.48*/{1,"ENABLE % CHANGE WARNING>          ", -80, 0.1, 1, 0, 0, 0 },
/*P.49*/{1,"FACTORY MODE SETUP>               ", -98, 0.1, 1, 0, 0, 0 },
/*P.50*/{0,"FLOW RATE: UNITS/MIN              ",-116,12.0, 0, 0, 0, 0 },
/*P.51*/{0,"ILLEGAL TEMP. COMP. CODE          ",   0,-1.0, 0, 0, 0, 0 },
/*P.52*/{0,"%CHANGE OF VCF-F.RATE EXCEEDS ALLOWABLE ", 0,-1.0, 0, 0, 0, 0 },
/*P.53*/{0,"RAM-CARD DOESN'T CONTAIN CPU DATA.  ", 0,-1.0, 0, 0, 0, 0 },
/*P.54*/{0,"RAM-CARD NOT FOUND. INSERT RAM-CARD.", 0,-1.0, 0, 0, 0, 0 },
/*P.55*/{0,"** FACTORY MODE **                ",   0,-1.0, 0, 0, 0, 0 },
/*P.56*/{0,"RETURN TO PROVER MENU>            ", -98, 0.1, 1, 0, 0, 0 },
/*P.57*/{0,"VALVE TYPE (1,2,OR 3)>            ",-201, 0.1, 3, 0, 0, 0 },
/*P.58*/{0,"ENABLE LINEARIZATION>             ",-202, 0.1, 1, 0, 0, 0 },
/*P.59*/{0,"ENABLE MULTI-PRODUCT>             ",-203, 0.1, 1, 0, 0, 0 },
/*P.60*/{0,"PROD. 1 TEMP. COMP. CODE>         ",-100,-10.1,-8,-11,-8,-10},
/*P.61*/{0,"PROD. 2 TEMP. COMP. CODE>         ",-101,-10.1,-8,-16,-8,-15},
/*P.62*/{0,"PROD. 3 TEMP. COMP. CODE>         ",-102,-10.1,-26,0,-8,-20},
/*P.63*/{0,"PROD. 4 TEMP. COMP. CODE>         ",-103,-10.1,-26,-5,-26,-4},
/*P.64*/{0,"PROD. 5 TEMP. COMP. CODE>         ",-104,-10.1,-26,-10,-26,-9},
/*P.65*/{0,"PROD. 6 TEMP. COMP. CODE>         ",-105,-10.1,-26,-15,-26,-14},
```

- 66 -

```
/*P.66*/{0,"PROD. 7 TEMP. COMP. CODE>        ",-106,-10,1,-26,-20,-26,-19},
/*P.67*/{0,"PROD. 8 TEMP. COMP. CODE>        ",-107,-10,1,-27,-4,-27,-3 },
/*P.68*/{0,"PROD. 9 TEMP. COMP. CODE>        ",-108,-10,1,-27,-9,-27,-8 },
/*P.69*/{0,"PROD. 10 TEMP. COMP. CODE>       ",-109,-10,1,-27,-14,-27,-13},
/*P.70*/{0,"ENABLE DEMO MODE>                 ",-224, 0,1, 1, 0, 0, 0 },
/*
                                                                set to 194
*/
/*P.71*/{0,"ENABLE DEMO RAM-CARD WRITES>     ",-210, 0,1, 1, 0, 0, 0 },
/*P.72*/{1,"ENABLE DEMO PROVER MODE>         ",-215, 0,1, 1, 0, 0, 0 },
/*P 73*/{0,"                                  ", 0, 0,0, 0, 0, 0, 0
},
/*P.74 */{0,"                                 ", 0, 0,0, 0, 0, 0, 0
},
};

/**********PRODUCT values************/
double Val[FUELS][PROD_VARS] =
{
/* FUEL # 0           0      1      2      3      4      5      6     789
*/
/* 0.. 9 */    0.0,   0.0,   0.0,   0.0,   0.0,   0.0,   0.0,   0.0,   0.0,
         0.0,
/* 10.. 19 */  0.0,   0.0,   0.0,   0.0,   0.0,   1.0,   0.0,   0.0,   0.0,
         0.0,
/* 20.. 29 */  0.0,   0.0,   0.0,   0.0,   0.0,   0.0,   0.0,   0.0,   0.0,
         0.0,
/* 30.. 39 */  0.0,   0.0,   0.0,   0.0,   0.0,   0.0,   0.0,   0.0,   0.0,
         0.0,
/* 40.. 49 */  0.0,   0.0,   0.0,   0.0,   0.0,   0.0,   0.0,   0.0,   0.0,
         0.0,
/* 50.. 59 */  0.0,   0.0,   0.0,   0.0,   0.0,   0.0,   0.0,   0.0,   0.0,
         0.0,
/* 60.. 69 */  0.0,   0.0,   0.0,   0.0,   0.0,   0.0,   0.0,   0.0,   0.0,
         0.0,
/* 70.. 79 */  0.0,   0.0,   0.0,   0.0,   0.0,   0.0,   0.0,   0.0,   0.0,
        60.0,
/* 80.. 89 */  0.0,   0.0,   0.0,   0.0, 100.0,0.25,500.0,  0.0,   0.0,
/* 90.. 96 */  0.0,   0.0,   0.0,   0.0,   0.0,   0.0,   0.0,
/* FUEL # 1           0      1      2      3      4      5      6     789
*/
/* 0.. 9 */    0.0,   0.0,   0.0,   0.0,   0.0,   0.0,   0.0,   0.0,   0.0,
         0.0,
/* 10.. 19 */  0.0,   0.0,   0.0,   0.0,   0.0,   1.0,   0.0,   0.0,   0.0,
         0.0,
/* 20.. 29 */  0.0,   0.0,   0.0,   0.0,   0.0,   0.0,   0.0,   0.0,   0.0,
         0.0,
/* 30.. 39 */  0.0,   0.0,   0.0,   0.0,   0.0,   0.0,   0.0,   0.0,   0.0,
         0.0,
/* 40.. 49 */  0.0,   0.0,   0.0,   0.0,   0.0,   0.0,   0.0,   0.0,   0.0,
         0.0,
/* 50.. 59 */  0.0,   0.0,   0.0,   0.0,   0.0,   0.0,   0.0,   0.0,   0.0,
         0.0,
/* 60.. 69 */  0.0,   0.0,   0.0,   0.0,   0.0,   0.0,   0.0,   0.0,   0.0,
         0.0,
/* 70.. 79 */  0.0,   0.0,   0.0,   0.0,   0.0,   0.0,   0.0,   0.0,   0.0,
        60.0,
/* 80.. 89 */  0.0,   0.0,   0.0,   0.0, 100.0,0.25,500.0,  0.0,   0.0,
/* 90.. 96 */  0.0,   0.0,   0.0,   0.0,   0.0,   0.0,   0.0,
/* FUEL # 2           0      1      2      3      4      5      6     789
*/
/* 0.. 9 */    0.0,   0.0,   0.0,   0.0,   0.0,   0.0,   0.0,   0.0,   0.0,
         0.0,
/* 10.. 19 */  0.0,   0.0,   0.0,   0.0,   0.0,   1.0,   0.0,   0.0,   0.0,
         0.0,
/* 20.. 29 */  0.0,   0.0,   0.0,   0.0,   0.0,   0.0,   0.0,   0.0,   0.0,
         0.0,
/* 30.. 39 */  0.0,   0.0,   0.0,   0.0,   0.0,   0.0,   0.0,   0.0,   0.0,
         0.0,
/* 40.. 49 */  0.0,   0.0,   0.0,   0.0,   0.0,   0.0,   0.0,   0.0,   0.0,
         0.0,
```

```
/* 50.. 59 */   0.0,   0.0,   0.0,   0.0,   0.0,     0.0,    0.0,   0.0,  0.0,
                0.0,
/* 60.. 69 */   0.0,   0.0,   0.0,   0.0,   0.0,     0.0,    0.0,   0.0,  0.0,
                0.0,
/* 70.. 79 */   0.0,   0.0,   0.0,   0.0,   0.0,     0.0,    0.0,   0.0,  0.0,
               60.0,
/* 80.. 89 */   0.0,   0.0,   0.0,   0.0, 100.0,0.25,500.0,   0.0,  0.0,  0.0,
/* 90.. 96 */   0.0,   0.0,   0.0,   0.0,   0.0,     0.0,    0.0,
/* FUEL # 3              0     1     2     3       4       5       6    789
*/
/* 0.. 9 */     0.0,   0.0,   0.0,   0.0,   0.0,     0.0,    0.0,   0.0,  0.0,
                0.0,
/* 10.. 19 */   0.0,   0.0,   0.0,   0.0,   0.0,     1.0,    0.0,   0.0,  0.0,
                0.0,
/* 20.. 29 */   0.0,   0.0,   0.0,   0.0,   0.0,     0.0,    0.0,   0.0,  0.0,
                0.0,
/* 30.. 39 */   0.0,   0.0,   0.0,   0.0,   0.0,     0.0,    0.0,   0.0,  0.0,
                0.0,
/* 40.. 49 */   0.0,   0.0,   0.0,   0.0,   0.0,     0.0,    0.0,   0.0,  0.0,
                0.0,
/* 50.. 59 */   0.0,   0.0,   0.0,   0.0,   0.0,     0.0,    0.0,   0.0,  0.0,
                0.0,
/* 60.. 69 */   0.0,   0.0,   0.0,   0.0,   0.0,     0.0,    0.0,   0.0,  0.0,
                0.0,
/* 70.. 79 */   0.0,   0.0,   0.0,   0.0,   0.0,     0.0,    0.0,   0.0,  0.0,
               60.0,
/* 80.. 89 */   0.0,   0.0,   0.0,   0.0, 100.0,0.25,500.0,   0.0,  0.0,  0.0,
/* 90.. 96 */   0.0,   0.0,   0.0,   0.0,   0.0,     0.0,    0.0,
/* FUEL # 4              0     1     2     3       4       5       6    789
*/
/* 0.. 9 */     0.0,   0.0,   0.0,   0.0,   0.0,     0.0,    0.0,   0.0,  0.0,
                0.0,
/* 10.. 19 */   0.0,   0.0,   0.0,   0.0,   0.0,     1.0,    0.0,   0.0,  0.0,
                0.0,
/* 20.. 29 */   0.0,   0.0,   0.0,   0.0,   0.0,     0.0,    0.0,   0.0,  0.0,
                0.0,
/* 30.. 39 */   0.0,   0.0,   0.0,   0.0,   0.0,     0.0,    0.0,   0.0,  0.0,
                0.0,
/* 40.. 49 */   0.0,   0.0,   0.0,   0.0,   0.0,     0.0,    0.0,   0.0,  0.0,
                0.0,
/* 50.. 59 */   0.0,   0.0,   0.0,   0.0,   0.0,     0.0,    0.0,   0.0,  0.0,
                0.0,
/* 60.. 69 */   0.0,   0.0,   0.0,   0.0,   0.0,     0.0,    0.0,   0.0,  0.0,
                0.0,
/* 70.. 79 */   0.0,   0.0,   0.0,   0.0,   0.0,     0.0,    0.0,   0.0,  0.0,
               60.0,
/* 80.. 89 */   0.0,   0.0,   0.0,   0.0, 100.0,0.25,500.0,   0.0,  0.0,  0.0,
/* 90.. 96 */   0.0,   0.0,   0.0,   0.0,   0.0,     0.0,    0.0,
/* FUEL # 5              0     1     2     3       4       5       6    789
*/
/* 0.. 9 */     0.0,   0.0,   0.0,   0.0,   0.0,     0.0,    0.0,   0.0,  0.0,
                0.0,
/* 10.. 19 */   0.0,   0.0,   0.0,   0.0,   0.0,     1.0,    0.0,   0.0,  0.0,
                0.0,
/* 20.. 29 */   0.0,   0.0,   0.0,   0.0,   0.0,     0.0,    0.0,   0.0,  0.0,
                0.0,
/* 30.. 39 */   0.0,   0.0,   0.0,   0.0,   0.0,     0.0,    0.0,   0.0,  0.0,
                0.0,
/* 40.. 49 */   0.0,   0.0,   0.0,   0.0,   0.0,     0.0,    0.0,   0.0,  0.0,
                0.0,
/* 50.. 59 */   0.0,   0.0,   0.0,   0.0,   0.0,     0.0,    0.0,   0.0,  0.0,
                0.0,
/* 60.. 69 */   0.0,   0.0,   0.0,   0.0,   0.0,     0.0,    0.0,   0.0,  0.0,
                0.0,
/* 70.. 79 */   0.0,   0.0,   0.0,   0.0,   0.0,     0.0,    0.0,   0.0,  0.0,
               60.0,
/* 80.. 89 */   0.0,   0.0,   0.0,   0.0, 100.0,0.25,500.0,   0.0,  0.0,  0.0,
/* 90.. 96 */   0.0,   0.0,   0.0,   0.0,   0.0,     0.0,    0.0,
/* FUEL # 6              0     1     2     3       4       5       6    789*/
/* 0.. 9 */     0.0,   0.0,   0.0,   0.0,   0.0,     0.0,    0.0,   0.0,  0.0,
                0.0,
```

```
/* 10.. 19 */    0.0,   0.0,   0.0,   0.0,   0.0,   1.0,   0.0,   0.0,   0.0,
     . 0.0,
/* 20.. 29 */    0.0,   0.0,   0.0,   0.0,   0.0,   0.0,   0.0,   0.0,   0.0,
       0.0,
/* 30.. 39 */    0.0,   0.0,   0.0,   0.0,   0.0,   0.0,   0.0,   0.0,   0.0,
       0.0,
/* 40.. 49 */    0.0,   0.0,   0.0,   0.0,   0.0,   0.0,   0.0,   0.0,   0.0,
       0.0,
/* 50.. 59 */    0.0,   0.0,   0.0,   0.0,   0.0,   0.0,   0.0,   0.0,   0.0,
       0.0,
/* 60.. 69 */    0.0,   0.0,   0.0,   0.0,   0.0,   0.0,   0.0,   0.0,   0.0,
       0.0,
/* 70.. 79 */    0.0,   0.0,   0.0,   0.0,   0.0,   0.0,   0.0,   0.0,   0.0,
      60.0,
/* 80.. 89 */    0.0,   0.0,   0.0,   0.0, 100.0,  0.25, 500.0,  0.0,   0.0,
/* 90.. 96 */    0.0,   0.0,   0.0,   0.0,   0.0,   0.0,   0.0,
/* FUEL # 7              0     1     2     3     4     5     6    789
*/
/* 0.. 9 */      0.0,   0.0,   0.0,   0.0,   0.0,   0.0,   0.0,   0.0,   0.0,
       0.0,
/* 10.. 19 */    0.0,   0.0,   0.0,   0.0,   0.0,   1.0,   0.0,   0.0,   0.0,
     . 0.0,
/* 20.. 29 */    0.0,   0.0,   0.0,   0.0,   0.0,   0.0,   0.0,   0.0,   0.0,
       0.0,
/* 30.. 39 */    0.0,   0.0,   0.0,   0.0,   0.0,   0.0,   0.0,   0.0,   0.0,
       0.0,
/* 40.. 49 */    0.0,   0.0,   0.0,   0.0,   0.0,   0.0,   0.0,   0.0,   0.0,
       0.0,
/* 50.. 59 */    0.0,   0.0,   0.0,   0.0,   0.0,   0.0,   0.0,   0.0,   0.0,
       0.0,
/* 60.. 69 */    0.0,   0.0,   0.0,   0.0,   0.0,   0.0,   0.0,   0.0,   0.0,
       0.0,
/* 70.. 79 */    0.0,   0.0,   0.0,   0.0,   0.0,   0.0,   0.0,   0.0,   0.0,
      60.0,
/* 80.. 89 */    0.0,   0.0,   0.0,   0.0, 100.0,  0.25, 500.0,  0.0,   0.0,
/* 90.. 96 */    0.0,   0.0,   0.0,   0.0,   0.0,   0.0,   0.0,
/* FUEL # 8              0     1     2     3     4     5     6    789
*/
/* 0.. 9 */      0.0,   0.0,   0.0,   0.0,   0.0,   0.0,   0.0,   0.0,   0.0,
       0.0,
/* 10.. 19 */    0.0,   0.0,   0.0,   0.0,   0.0,   1.0,   0.0,   0.0,   0.0,
     . 0.0,
/* 20.. 29 */    0.0,   0.0,   0.0,   0.0,   0.0,   0.0,   0.0,   0.0,   0.0,
       0.0,
/* 30.. 39 */    0.0,   0.0,   0.0,   0.0,   0.0,   0.0,   0.0,   0.0,   0.0,
       0.0,
/* 40.. 49 */    0.0,   0.0,   0.0,   0.0,   0.0,   0.0,   0.0,   0.0,   0.0,
       0.0,
/* 50.. 59 */    0.0,   0.0,   0.0,   0.0,   0.0,   0.0,   0.0,   0.0,   0.0,
       0.0,
/* 60.. 69 */    0.0,   0.0,   0.0,   0.0,   0.0,   0.0,   0.0,   0.0,   0.0,
       0.0,
/* 70.. 79 */    0.0,   0.0,   0.0,   0.0,   0.0,   0.0,   0.0,   0.0,   0.0,
      60.0,
/* 80.. 89 */    0.0,   0.0,   0.0,   0.0, 100.0,  0.25, 500.0,  0.0,   0.0,
/* 90.. 96 */    0.0,   0.0,   0.0,   0.0,   0.0,   0.0,   0.0,
/* FUEL # 9              0     1     2     3     4     5     6    789
*/
/* 0.. 9 */      0.0,   0.0,   0.0,   0.0,   0.0,   0.0,   0.0,   0.0,   0.0,
       0.0,
/* 10.. 19 */    0.0,   0.0,   0.0,   0.0,   0.0,   1.0,   0.0,   0.0,   0.0,
     . 0.0,
/* 20.. 29 */    0.0,   0.0,   0.0,   0.0,   0.0,   0.0,   0.0,   0.0,   0.0,
       0.0,
/* 30.. 39 */    0.0,   0.0,   0.0,   0.0,   0.0,   0.0,   0.0,   0.0,   0.0,
       0.0,
/* 40.. 49 */    0.0,   0.0,   0.0,   0.0,   0.0,   0.0,   0.0,   0.0,   0.0,
       0.0,
/* 50.. 59 */    0.0,   0.0,   0.0,   0.0,   0.0,   0.0,   0.0,   0.0,   0.0,
       0.0,
```

```
/* 60.. 69 */   0.0,    0.0,    0.0,    0.0,    0.0,    0.0,    0.0,    0.0,    0.0,
        0.0,
/* 70.. 79 */   0.0,    0.0,    0.0,    0.0,    0.0,    0.0,    0.0,    0.0,    0.0,
        60.0,
/* 80.. 89 */   0.0,    0.0,    0.0,    0.0,    100.0,0.25,500.0,  0.0,    0.0,
/* 90.. 96 */   0.0,    0.0,    0.0,    0.0,    0.0,    0.0,    0.0,
};

char*xlb_file="d:flash.xlb";
char*s0_file="d:flash.s0";
char*SysfontPtr;
char*cptr;

union REGS Regs;
struct tm *ptime;
FILE*pfile;

char video_buff[4][40] =
{
0,0,0,0,0,0,0,0,0,0,0,0,0,0,0,0,0,0,0,0,
0,0,0,0,0,0,0,0,0,0,0,0,0,0,0,0,0,0,0,0,
0,0,0,0,0,0,0,0,0,0,0,0,0,0,0,0,0,0,0,0,
0,0,0,0,0,0,0,0,0,0,0,0,0,0,0,0,0,0,0,0,
0,0,0,0,0,0,0,0,0,0,0,0,0,0,0,0,0,0,0,0,
0,0,0,0,0,0,0,0,0,0,0,0,0,0,0,0,0,0,0,0,
0,0,0,0,0,0,0,0,0,0,0,0,0,0,0,0,0,0,0,0,
0,0,0,0,0,0,0,0,0,0,0,0,0,0,0,0,0,0,0,0,
};

/**note: ORDER IS VERY IMPORTANT INSIDE THIS MAIN ROUTINE... ***/

Load RAM();

if (argc != 1) /* if user enters parameter...then demo mode */
        ComVal[194]= 1.0;

/******* initialize certain data fields*******/
alpha[ 4] = CLEAR; /* assign extended Char values... */
alpha[ 5] = START;
alpha[15] = ALPHA;
alpha[16] = M1;
alpha[17] = M_NO;
alpha[20] = ENTER;
alpha[21] = ALPHA;
alpha[22] = PRINT;
alpha[23] = STOP;
Menu[(11*ACTIONS_LIM)+18].index = 0; /* clear action cnt...diagnostics */
ComVal[24] = ComVal[194]; /* set temp var...for demo mode */

InitSerial(); /* for LapPad and RF-Link and Serial Printer */

/* LOAD NETWORX INFO... */
Upload Network(99);
Upload Network(8);

/* display version notice... */
VersionLapPad();
sprintf(Menu[(8*ACTIONS_LIM)+2].text+12,
        "SCM-%.21f MTR-%.21f LCC-%.21f",VersionNo,MTR_VERSION,CTR_VERSION);

/* init menus... */
SetProdCatsTempLabels(); /* assign labels according to temp codes... */
SetCurProdTempLabels(); /* assign labels for current product category */
SetFactoryLabels(); /* turn on and off line-labels...factory setup */
SetSystemLabels(); /* turn on and offline-labels...system setup */
CreateModelNo();

/* MAIN LOOP... */
Main Loop();

/* done!...so do exiting procedures... */
```

- 70 -

```
close_al(LAP_PORT);
/*StopMouse();*/
close_al(RF_PORT);
close_al(PRINT_PORT);

/* diagnostic purposes...save system info... */
Menu[(11*ACTIONS_LIM)+19].index = Menu_No;
Menu[(11*ACTIONS_LIM)+20].index = Action_No;

}
Save_RAM(0);

} /* end main() */

*/
void Main_Loop()
{
        for (;;)
        {
        /* enable or disable preset lines... */
        if (ComVal[46] > 0.0)
                act_val = (char)1;
        else
                act_val = (char)0;
        Menu[(1*ACTIONS_LIM)+8].active = act_val;
        Menu[(2*ACTIONS_LIM)+17].active = act_val;
        Menu[(31*ACTIONS_LIM)+2].active = act_val;

if(ComVal[47] > 0.0)
                act_val = (char)1;
        else
                act_val = (char)0;
        Menu[(1*ACTIONS_LIM)+9] .active = act_val;
        Menu[(2*ACTIONS_LIM)+18].active = act_val;
        Menu[(31*ACTIONS_LIM)+3].active = act_val;

if (ComVal[8] > 0.0)
                act_val = (char)1;
        else
                act_val = (char)0;
        Menu[(1*ACTIONS_LIM)+10].active = act_val;
        Menu[(2*ACTIONS_LIM)+19].active = act_val;
        Menu[(31*ACTIONS_LIM)+4].active = act_val;

if (Menu_No == 24)      /* misc. trans. menu.. second line */
                Draw_Menu(22,19,0);
        else if (Menu_No == 31) /* preset menu second line */
                Draw_Menu(6,17,0);
        else
        Draw_Menu(11,(int)(ProdCat+3),0); /* draw product code and desc...second
line...*/

/* clear one-time flag... */
        ComVal[98] = 0.0;

key_hit = Menu_Control();

if (key_hit == 0xff)
                break;
        else if ((key_hit == 0xfe) 11 (ComVal[215] == 1.0))
        {
                Menu_No = -1; /* diag. purposes... */ if (Prover() == 0xff)
                        break;

Menu_No = 1;
        Action_No = 0;
        }
        else
```

- 71 -

```
        {
                key_hit = Menu Action(key_hit);

if (key_hit == 0xff)
                        break;

else if ((key_hit == 0xfe) | (ComVal[215] == 1.0))

Menu No = -1; /* dial. purposes... */ if (Prover() == 0xff)

break;

Menu No = 1;
                        Action No = 0;
                }
        }
} /* end for (.. */

} /* end Main Loop() */

/*
========================================================================
* Function Menu Control()
*
*       Menu Control Function...
*
* -----------------------------------------------
*/
uchar Menu Control()
{
static uchar row=0,col=0;

for (;;)
{
        Draw Menu(Menu No,ActionNo,0);

ch= Get Key(&row,&col,0);

/* any key EXCEPT print will CLEAN UP from delivery...and CANCEL reprinting of
        ticket */ if (ch != PRINT)
        {
                if (clean_up)
                {
                        CleanUpAfterDelivery();
                        cleanup = 0;
                }
                reprint_ok=0;
        }
        if (!reprint_ok && remote_message)
        {
                Menu No = (char)20;
                Action No= remote_message;
                remote message=(char)0;
                continue;
        }
        if((ch == 0xff) |(ch == 0xfe))
                break;
        else if (ComVal[215] == 1.0)
                break;
        else if (ch == '-')
        {
                if ((Menu No == 11) && (Action No == 1)) /* audit trail "menu" */
                {
                        ComVal[121] -= 1.0;
                        if (ComVal[121]<1.0]
                                ComVal[121]= 1000.0;
}
```

```
DecrMenu();
        }
        else if (ch=="")
        {
                if ((Menu No==11) && (Action No == 1)) /* audit trail "menu" */
                {
                        ComVal[121]+=1.0;
                        if (ComVal[121] > 1000.0)
                                ComVal[121]= 1.0;

}
                IncrMenu();
        }
        else /* go process current action... */
        {
                /* diagnostic purposes...save system info... */
Menu[(11*ACTIONS_LIM)+17].index = ch;
                break;
        }
}/* end for... */ return(ch);

} /* end Menu Control() */

*==============================================================================
* Function Menu Control()
*
*       Menu Control Function...
*
* -----------------------------------------------------
*/
uchar Menu Action(uchar key_hit)
{
static char it_exists,incr_menu,ret,i,j;
static int line;
static double save_old, val;

/* first check for reprint of delivery ticket... */
if ((Menu No == 1) && (key hit == PRINT) && reprint_ok)
{
        Deliver Print();
        return(key hit); /* return here 'cause of reprint ok flag... */
} incr_menu=0;

if ((key_hit == M1) && (Menu No != 24) && (Menu No != 31))
{
        Menu No = 1;
        Action No = 0;
}
else if ((key_hit == M_NO) && (Menu No != 24) && (Menu No != 31))
}
        Menu No = 0;
        Action No = 0;
        val = Get Value(Menu No,ActionNo,&key_hit,1,1);

if (key_hit == 0xff)

/*M102*/else if ((val == 102.0)&&(ComVal[203] == 1.0)) /* ...if multi-product */   {
                if(KeyCheck((char)val))
                {
                        /* do product block copy from current to others... */
                        for (i=0; i < 10;i++)
                        {
                                if (i == ProdCat)
```

- 73 -

```
                                continue;
                        for (j=0;j< PROD_VARS;j++)
                                Val[i][j] = Val[ProdCat][j];
                }

Action No = 17; /* display finish notice... */
        }
        else
                Action No = 0;

Menu No= 1;
}
/*M99*/else if (val == 99.0)
        {
                /* do back door enterance...clear totalizer key... */
                ComVal[126] = 0.0; /* clear key val... */
                val = Get Value(22,18,&key_hit,1,1);
                if (val == BackDoorKey())
                {
                        ComVal[23] = 0.0;
                        Menu No = 3;
                }
                else
                        Menu No= 1;
                Action No = 0;
        }
        else if ((val<0.0)|(val>20.0)|(val == 15.0)) /* no valid menu no. */
        {
                Menu No= 1;
                Action No = 0;
        }
        else
        {
                if (Key Check((char)val))
                {
                        Menu No = (char)val;

if (Menu No == 2)
                                Toggle Cylinder();
                }
                else
                        Menu No= 1;
                Action No = 0;
        } if (Menu No == 0)
                Action No= 1;

/* if ram card...save to ram card...end of shift values */
        if ((Menu No == 10) && (ComVal[199] > 0.0) && (ComVal[204] == 0.0))
                LoadRAMCard();
}
else if ((Menu No == 0) && (key_hit == ENTER))
{
        if (Key Check((char)ActionNo))
        {
        Menu No= Action No;

if (Menu No == 2)
                Toggle Cylinder();
        }
        else
                Menu No= 1;
        Action No = 0;

/* if ram card...save to ram card...end of shift values */
        if ((Menu No == 10) && (ComVal[199] > 0.0) && (ComVal[204] == 0.0))
                LoadRAMCard();
}
else if ((Menu No == 10) && (key_hit == PRINT))
{
```

```
                key_hit= Shift Print();
                Action No = 0;
        }
        else if ((Menu No == 12) && (key_hit == PRINT))
        {
                key_hit = Base Print();
                Action No = 0;
        }
        else if ((Menu No == 14) && (key_hit == PRINT))
        {
                key_hit = Discount Print();
                Action No = 0;
        }
        else if ((Menu No == 16) && (key_hit == PRINT))
        {
                key_hit= Sum Print();
                Action No = 0;
        }
        else if ((Menu No == 30) && (key_hit == PRINT))
        {
                key_hit = MiscPrint();
                Menu No= 1;
                Action No = 0;
        }
        else if ((Menu No == 7) && (key_hit == PRINT))
        {
                key_hit = DiagPrint();
                Menu No = 7;
                Action No = 0;
        }
        else if (((Menu No == 13)|(Menu No == 22)) && (key_hit == PRINT))
        {
                key_hit = Totals Print();
                Menu No = 13;
                Action No = 0;
        }
        else if (((Menu No = 8)|(Menu No == 26)|(Menu No == 27))
                    && (key_hit == PRINT))
        {
                key_hit = ID Print();
                Menu No = 8;
                Action No = 0;
        }
        else if ((key_hit == START) && (Menu No != 24] && (Menu No != 31) && (Menu No != 30))
        {
                Menu No= 1;
                if ((ComVal[216] = 0.0) && (ComVal[217] == 0.0))

Action No = 18; /* display warning...no Access Namer. */
                else
                {
                        if (ComVal[95] == 0.0) /* if NOT cylinder filling... */
                        {
                                /* first check for Exceeding Max Price/unit */
                                Val[ProdCat][1]= 1.0;
                                start_vol=0.0; /*startvolume*/
                                Deliver Compute();
                                Val[ProdCat][1] = 0.0;

ComVal[145]--ComVal[153]; /* take out misc. charges and prev.
*/
                                ComVal[145]--ComVal[144];
                                if (ComVal[145] > ComVal[35]) /* if Total for 1 unit is > than
MAX */
                                {
                                        Action No = 16; /* display warning... */
                                        ComVal[216] = 0.0;
                                        ComVal[217] = 0.0;
                                        return(key_hit); /* exceeded max so return with
message... */
                                }
```

```
                        }
                        key_hit = Deliver Fuel(0);
                }
                return(key_hit);
        }
        else if ((key_hit == START) && (Menu No == 31))
        {
                Menu No= 1;
                key hit=DeliverFuel(1);
                return(key_hit);
        }
        else if (((Menu No == 24) 11 (Menu No == 31)) && (key_hit == PRINT))
        {
                Deliver Compute();
                Deliver Print();
                Menu No= 1;
                Action No = 0;

Save RAM(0);
                return(key_hit); /* return here 'cause of reprint_ok flag... */
        }
        else if ((key_hit > 30) && (key_hit < 126))
        {
                if (Menu[(MenuNo*ACTIONS_LIM)+ActionNo].change == 0)
                        incr_menu = 0; /* do nothing... */
                else if (Menu[(MenuNo*ACTIONS_LIM)+ActionNo].places == -3)
                {                       /* PRODUCT NAMES.......... */
                        GetChar(Menu No,ActionNo,&key_hit,0,11,
                                (char)(ComVal[(Menu[(MenuNo*ACTIONS_LIM)+ActionNo].index *
                                -1)]+3.0),21,
                        Menu[(MenuNo*ACTIONS_LIM)+ActionNo].range);
                        Save RAM(0);
                        incr menu= 1;
                } else if (Menu[(MenuNo*ACTIONS_LIM)+ActionNo].places == -7)
        {
                        GetChar(Menu No,ActionNo,&key_hit,(char)0,MenuNo,ActionNo,
                                (char)(40-Menu[(MenuNo*ACTIONS_LIM)+ActionNo].range), /* begin index
*/
                        Menu[(MenuNo*ACTIONS_LIM)+ActionNo].range); /* size... */
                        Save RAM(0);

if ((Menu No == 20)&&(Action No == 20)&&RF_PORT)
                        {
                          MessageRFLink();
                          Action No= 18;
                        }
                        else
                          incr_menu= 1;
        }
        else if (((key_hit >= '0') && (key_hit <= '9')) 11 (key_hit == '.'))
        {
                if ((Menu No == 9) && (Action No == 1)) /* odometer cal. */
                        save_old=ComVal[45];

Get Value(Menu No,ActionNo,&key_hit,0,0);

if ((Menu No == 9) && (Action No = 1)) /* odometer cal. */
                        ComVal[48]*=(save_old / ComVal[45]);

/* choses an existing product code...*/
if ((Menu[(MenuNo*ACTIONS_LIM)+ActionNo].index == -99) &&
        (Menu[(MenuNo*ACTIONS_LIM)+ActionNo].change > 0))
{
        /* if single-product */
        if (ComVal[203] != 1.0)
        {
                ComVal[491 = ComVal[99]; /* assign current product code... */
                Upload Network(9); /* get current product...network */
                Download Network(7); /* ...set current product code. */
```

```
                    incr_menu= 1;
    }
else /* if multi-product... */
    {
        for (i=0,it_exists=0; i < 10;i++)
        {
            if (ComVal[99] == ComVal[49+i]) /* what was entered is valid... */
            {
                it_exists= 1;
                ProdCat= i;
                Download Network(9);
                SetCurProdTempLabels();/*assign labels for current product category
*/ if (ComVal[216] > 0.0) /* same access number...but new product code...
*/
                {
                    /* perform "copy overs"...from M12 to M2... */
                    Val[ProdCat][15] = Val[ProdCat][61];
                    Val[ProdCat][16] = Val[ProdCat][62];
                    Val[ProdCat][17] = Val[ProdCat][63];

Val[ProdCat] [18] = Val[ProdCat] [64];
                                    Val[ProdCat] [19] = Val[ProdCat] [65];
                                    Val[ProdCat] [20] = Val[ProdCat] [66];
                                    Val[ProdCat] [21] = Val[ProdCat] [67];
                                    Val[ProdCat] [22] = Val[ProdCat] [68];
                                    Val[ProdCat] [23] = Val[ProdCat] [69];
                                    Val[ProdCat] [24] = Val[ProdCat] [70];
                } break;
            } /* end if product exists... */
        } /* end for... 10 products... */ if (!it_exists) /* if not valid Product Code give warning...orign. code will be
put back in main loop... */
        {
            Menu No = 1; /* display illegal notice... */
            Action No = 20;
        }
        else
            incr_menu= 1;
    }/* end if multi-prods... */
}
else if (Menu[(MenuNo*ACTIONS_LIM)+ActionNo].change == 7)
{
    ComVal[99] = ComVal[(Menu[(MenuNo*ACTIONS_LIM)+ActionNo].index*-1)];
    Upload Network(9); /* get current product...network */
    Download Network(7); /* ...set current product code. */
    incr_menu= 1;
}
else if ((Menu No == 1)&&(Action No == 1)) /* access code...SCHEDULED */
{
    /* DE-activate account info... */
    Menu[(1*ACTIONS_LIM)+2].active = (char)0;
    Menu[(1*ACTIONS_LIM)+3].active= (char)0;
    Menu[(1*ACTIONS_LIM)+4].active = (char)0;
    Menu[(1*ACTIONS_LIM)+5].active = (char)0;
    Menu[(1*ACTIONS_LIM)+6].active = (char)0;

if (ComVal[216] = 0.0) /* zero was entered... */
    {
        Menu[(1*ACTIONS_LIM)+7].active = (char)1; /* enable unsched */
        incr_menu= 1;
    }
    else
    {
        /* scheduled so...zero un-sch. */
        ComVal[217] = 0.0;
```

```c
                        /* clear presets */
                        Val[ProdCat][3] = 0.0;
                        Val[ProdCat][4] = 0.0;
                        Val[ProdCat][5] = 0.0;
                        Val[ProdCat][6] = 0.0;

/* clear old values...misc. */
                        sprintf(Menu[(
2*ACTIONS_LIM)+16].text,"%s",Menu[(19*ACTIONS_LIM)+16].text);

sprintf(Menu[(24*ACTIONS_LIM)+18].text,"%s",Menu[(19*ACTIONS_LIM)+16] .text);

sprintf(Menu[(31*ACTIONS_LIM)+19].text,"%s",Menu[(19*ACTIONS_LIM)+16].text);
                        ComVal[153] = 0.0;
                        ComVal[154] = 0.0;
                        ComVal[155] = 0.0;
                        ComVal[144] = 0.0;
                        /* clear cylinder filling...*/
                        ComVal[95]=0.0;

if ((ret=LoadCustomer()) == 1)
                                incr_menu= 1;
                        else if (ret == 0)
                        {
                                Draw Menu(6,10,0);
                                utdelay(MESS_DEL);
                                ComVal[216] = 0.0;
                                Menu[(1*ACTIONS_LIM)+7].active = (char)1; /* enable unsched */
                        }
                        else if (ret == -1)
                        {
                                Draw Menu(15.2 ,0);
                                utdelay(MESS_DEL);
                                ComVal[216] = 0.0;
                                Menu[(1*ACTIONS_LIM)+7].active = (char)1; /* enable unsched */
                        }
                        else if (ret = -2)
                        ;
                        else if (ret == -3)
                        {
                                Draw Menu(15,0,0);
                                utdelay(MESS_DEL);
                                ComVal[216] = 0.0;
                                Menu[(1*ACTIONS_LIM)+7].active = (char)1; /* enable unsched */
                        }
                } /* end else... */
        }
        else if ((Menu No == 1) && (Action No == 7)) /* access code...UNSCHEDULED */
        }
                if (ComVal[217] == 0.0)
                {
                        /* if ram card...or rf-link */
                        if ((((ComVal[199] > 0.0)&&(ComVal[204] == 0.0))||(ComVal[209] > 0.0))
                        Menu[(1*ACTIONS_LIM)+1].active = (char)1; /* enable sched */
                        incr_menu= 1;
        }
        else
        {
/* if ramcard or rf-link */ if ((((ComVal[199] > 0.0)&&(ComVal[204] == 0.0)||(ComVal[209] > 0.0))
                {
                        ret=CheckRoom();
                        if (ret == 1)
                        ;
                        else if (ret == 0)
                        {
                                if (ComVal[209] > 0.0)
                                        Draw Menu(15,8,0);
                                else
```

- 78 -

```c
                        Draw Menu(6,11,0);
                utdelay(MESS_DEL);
                ComVal[217] = 0.0;
                goto done;
        }
        else if (ret == -1)
        {
                if (ComVal[209] > 0.0)
                        Draw Menu(15,9,0);
                else
                        Draw Menu(6,12,0);
                utdelay(MESS_DEL);
        }
        else if (ret == -2)
                goto done;
}

/* un-scheduled so...zero scheduled. */
ComVal[216] = 0.0;

/* clear presets */
Val[ProdCat][3] = 0.0;
Val[ProdCat][4] = 0.0;
Val[ProdCat][5] = 0.0;
Val[ProdCat][6] = 0.0;

/* clear old values...misc. trans. menus */
sprintf(Menu[(
2*ACTIONS_LIM)+16].text,"%s",Menu[(19*ACTIONS_LIM)+16].text);

sprintf(Menu[(24*ACTIONS_LIM)+18].text,"%s",Menu[(19*ACTIONS_LIM)+16].text);

sprintf(Menu[(31*ACTIONS_LIM)+19].text,"%s",Menu[(19*ACTIONS_LIM)+16].text);
        ComVal[153] = 0.0;
        ComVal[154] = 0.0;
        ComVal[155] = 0.0;
        ComVal[144] = 0.0;
        /* clear cylinder filling... */
        ComVal[95] = 0.0;

/* perform "copy overs"...from M12 to M2... */
        Val[ProdCat][15] = Val[ProdCat][61];
        Val[ProdCat][16] = Val[ProdCat][62];
        Val[ProdCat][17] = Val[ProdCat][63];

Val[ProdCat][18] = Val[ProdCat][64];
                Val[ProdCat][19] = Val[ProdCat][65];
                Val[ProdCat][20] = Val[ProdCat][66];
                Val[ProdCat][21] = Val[ProdCat][67];
                Val[ProdCat][22] = Val[ProdCat][68];
                Val[ProdCat][23] = Val[ProdCat][69];
                Val[ProdCat][24] = Val[ProdCat][70];
                /* more clears...M2... */
                Val[ProdCat][25] = 0.0;
                Val[ProdCat][26] = 0.0;
                Val[ProdCat][27] = 0.0;
                Val[ProdCat][28] = 0.0;
                /* DE-activate account info... */
                Menu[(1*ACTIONS_LIM)+2].active = (char)0;
                Menu[(1*ACTIONS_LIM)+3].active = (char)0;
                Menu[(1*ACTIONS_LIM)+4].active = (char)0;
                Menu[(1*ACTIONS_LIM)+5].active = (char)0;
                Menu[(1*ACTIONS_LIM)+6].active = (char)0;

/* de-activate sched... */
                Menu[(1*ACTIONS_LIM)+1].active= (char)0;

if (ComVal[11] > 0.0) /* if account setup enabled... */
                {
                        Menu No = 2;
                        Action No = 0;
```

```c
                        Toggle Cylinder();  /* set menus... */
        }
            else
                    incr_menu= 1;
    }/* end else... */
}
else if ((Menu No == 1) && (Action No == 15))  /* misc. transaction code... */
{
        /* clear old values...misc. trans. menus */
        ComVal[150] = 0.0;
        ComVal[151] = 0.0;
        ComVal[152] = 0.0;
        ComVal[153] = 0.0;
        ComVal[154] = 0.0;
        ComVal[155] = 0.0;
        ComVal[156] = 0.0;

Menu No = 30;
        Action No = 0;
}
else if ((Menu No == 2) && (Action No = 2))  /* cylinder fill...*/
{
        Toggle Cylinder();
        incr_menu= 1;
}
else if ((Menu No == 33) && (Action No == 0))  /* disable ram-card... */
{
        SetDisableRAMLabels();  /* turn on and offline-labels...ram-card */
        incr_menu= 1;
}
else if (((MenuNo==33)&&(Action No== 6))&&(ComVal[98]==1.0))
{
        if (RF_PORT)
                sprintf(cbuff,"%-5d",ReWriteRAMCard());
        else
                sprintf(cbuff,"%-5d",0);
        for (i=0;i<5;i++)
                Menu[(33 *ACTIONS_LIM)+5].text[i] = cbuff[i];
        ActionNo=5;
}
else if (((MenuNo==33)&&(Action No== 9))&&(ComVal[98]==1.0))
{
        sprintf(cbuff,"*%-5d",ReWriteRAMCard());
        for (i=0;i< 5;i++)
                Menu[(33*ACTIONS_LIM)+7].text[i] = cbuff[i];
        ActionNo=7;
}
else if (((MenuNo=16)&&(ActionNo==20))&&(ComVal[98]==1.0))
{
        /* do back door key...to allow clearing of ALL totalizers... */
        ComVal[126] = 0.0;  /* clear key val. . . */
        val = Get Value(22,18,&key_hit,1,1);
        if (key hit == 0xff)
            ;
        else if (val == BackDoorKey())
                ClearTotalizers();
        incr_menu= 1;
}
else if (Menu No == 18)
{
        if (Action No == 1)
                SetupModelNo();
        SetSystemLabels();  /* turn on and off line-labels. . .system setup */
        incr menu= 1;
}
else if ((Menu No == 19) && (Action No == 3))  /* VCF... */
{
        if (ComVal[194] == 0.0)  /* if NOT in Demo mode... */
                ComVal[208] = (double)VCF_Calculator((float)ComVal[207]);
        incr_menu=1;
```

- 80 -

```
}
else if (((MenuNo==9)&&(ActionNo==15))&&(ComVal[98]==1.0))
{
        if (ComVal[194] != 0.0) /* if NOT in Demo mode... */
                nw_startup(0);
        incr_menu= 1;
}
else if (((MenuNo==9)&&(Action No== 16))&&(ComVal [98] == 1.0))
{
        if (ComVal[194] != 0.0) /* if NOT in Demo mode... */
                nw_abort_send();
        incr_menu= 1;
}
else if (((MenuNo==20)&&(ActionNo==19))&&(ComVal[98]==1.0))
{
        /* first zero out old message lines... */
        for (line=0; line < RF_MAX;line++)
                Menu[(20*ACTIONS_LIM)+1+line].active = (char)0;
        /* zero out send message... */
        for (i=0; i < 27;i++)
                Menu[(20*ACTIONS_LIM)+20].text[13+i] = ' ';
        incr_menu= 1;
}
else if (((MenuNo==21)&&(ActionNo==19))&&(ComVal[98]==1.0))
{
        if ((ret=LoadRAMCyber()) == 1)
        {
                /* download to the Meter, across the NETWORK, the prover data... */
                Draw Menu(12,15,0);
                Save RAM(99);
                Menu No= 3;
                Action No= 1;
                return(key_hit);
        }
        else if (ret == -1) /* no ram card found... */
        {
                Draw Menu(10,2,0);
                utdelay(MESS_DEL);
        }
        else       /* wrong data... */
        {
                Menu No= 15;
                Action No= 5;
        }
}
else if (((MenuNo==21)&&(ActionNo==20))&&(ComVal[98]==1.0))
{
        if (SaveRAMCyber() == 1)
        {
                Menu No= 3;
                Action No= 1;
        }
        else       /* no ram card found... */
        {
                Draw Menu(10,2,0);
                utdelay(MESS_DEL);
        }
}
else
        incr_menu= 1;

Save RAM(Menu[(MenuNo*ACTIONS_LIM)+ActionNo].change);

} /* end if NUMBER entered */

} /* end else...of key hits */

/** increment menu pointer **/
if (incr menu)
        IncrMenu();
done:
```

- 81 -

```
        /* diagnostics...action count */
Menu[(11*ACTIONS_LIM)+18].index+= 1;

return(key_hit);

} /* end Menu Action() */
```

What is claimed is:

1. A system for liquid registration and control, comprising:
   a solid state pulser for sensing the flow of a liquid through a passage and for providing a series of pulses forming a liquid flow rate signal indicative of a rate of said liquid flow, a frequency of said pulses being indicative of said liquid flow rate;
   temperature sensing means for detecting a temperature of said liquid and for providing a temperature signal indicative of said temperature;
   meter dedicated processor means responsive to said liquid flow rate signal, said temperature signal and a selected correction factor for modifying, on a pulse-by-pulse basis, a liquid delivery value indicative of an amount of liquid flowing through said passage in a non-linear fashion using a multi-factor polynomial, said meter dedicated processor means comprising:
      quadrature pulse detection means for detecting the flow of said liquid in each of two directions and for increasing a liquid delivery value when flow in a first one of said directions is detected and for decreasing said liquid delivery value when flow in a second one of said directions is detected, and
      temperature volume correction means for adjusting said liquid flow rate signal responsive to said temperature signal;
   local control console means for displaying said liquid delivery value; and
   system bus means for conveying said liquid delivery value from said meter dedicated processor means to said local control console means, said system bus means including data network means for detecting and correcting network errors, performing network addressing, setting packet control parameters, and performing automatic retries.

2. The system of claim 1, wherein said temperature volume correction means comprises:
   correction factor selecting means for selecting a correction factor from a plurality of correction factors responsive to said temperature signal; and
   liquid flow rate signal adjustment means for adjusting said liquid flow rate signal according to said correction factor.

3. The system of claim 2, wherein said liquid flow rate signal comprises a pulse train and said liquid flow rate signal adjustment means adjusts said liquid flow rate signal by altering a time duration between consecutive pulses in said pulse train.

4. The system of claim 2, wherein said local control console means comprises correction factor generation means for generating said plurality of correction factors and for providing said plurality of correction factors to said meter dedicated processor means.

5. The system of claim 1, wherein said local control console means comprises:
   selection means for receiving an operator input and for providing a signal indicative of a type of value to be displayed; and
   display means for selectively displaying a value representing liquid flow during a continuous delivery period and liquid flow during a cumulative period responsive to said selection means.

6. The system of claim 1, wherein said system bus means comprises a fiber optic network.

7. The system of claim 1, wherein said system bus means is further for conveying equipment-independent messages generated by one of said means to another of said means.

8. The system of claim 7, wherein said messages include at least one of volume data messages, temperature data messages, and status messages.

9. The system of claim 1, further comprising:
   printer means for printing information generated by at least one of said meter dedicated processor means and said local command console means, said printer means being connected to said system bus means.

10. The system of claim 1, further comprising:
    valve control means for controlling said liquid flow through said passage, said valve control means being responsive to said local control console means.

11. The system of claim 10, wherein said local control console means comprises preset means for terminating said liquid flow when said liquid delivery value equals a predetermined amount.

12. The system of claim 10, wherein:
    said system further comprises pressure detection means connected to said meter dedicated processor means for indicating a pressure of said liquid flowing in said passage; and
    said local control console means comprises means for actuating said valve control means to terminate said liquid flow when said indicated pressure is less than a predetermined level.

13. The system of claim 1, further comprising RAM card interface means for storing data generated by said meter dedicated processor means and said local control console means.

14. The system of claim 1, further comprising radio link means for exchanging data generated by said meter dedicated processor means and said local control console means with a base station.

* * * * *